(12) United States Patent
Choi et al.

(10) Patent No.: US 12,671,839 B2
(45) Date of Patent: Jun. 30, 2026

(54) VIDEO DECODING METHOD USING RESIDUAL INFORMATION IN VIDEO CODING SYSTEM, AND APPARATUS THEREOF

(71) Applicant: Rosedale Dynamics LLC, Wilmington, DE (US)

(72) Inventors: Jungah Choi, Seoul (KR); Sunmi Yoo, Seoul (KR); Jin Heo, Seoul (KR); Jangwon Choi, Seoul (KR); Ling Li, Seoul (KR); Seunghwan Kim, Seoul (KR); Jaehyun Lim, Seoul (KR)

(73) Assignee: Rosedale Dynamics LLC, Wilmington, DE (US)

( * ) Notice: Subject to any disclaimer, the term of this patent is extended or adjusted under 35 U.S.C. 154(b) by 0 days.

(21) Appl. No.: 19/025,129

(22) Filed: Jan. 16, 2025

(65) Prior Publication Data
US 2025/0240454 A1    Jul. 24, 2025

Related U.S. Application Data

(63) Continuation of application No. 18/957,652, filed on Nov. 22, 2024, which is a continuation of application No. 18/374,648, filed on Sep. 28, 2023, now Pat. No. 12,155,864, which is a continuation of application No. 17/562,227, filed on Dec. 27, 2021, now Pat. No. 11,778,232, which is a continuation of application No. 17/368,005, filed on Jul. 6, 2021, now Pat. No.
(Continued)

(51) Int. Cl.
*H04N 19/60* (2014.01)
*H04N 19/132* (2014.01)

*H04N 19/176* (2014.01)
*H04N 19/184* (2014.01)
*H04N 19/70* (2014.01)
*H04N 19/137* (2014.01)

(52) U.S. Cl.
CPC .......... *H04N 19/60* (2014.11); *H04N 19/132* (2014.11); *H04N 19/176* (2014.11); *H04N 19/184* (2014.11); *H04N 19/70* (2014.11); *H04N 19/137* (2014.11)

(58) Field of Classification Search
CPC ..................................................... H04N 19/60
USPC ....................................... 375/240.01–240.29
See application file for complete search history.

(56) References Cited

U.S. PATENT DOCUMENTS

| | | | |
|---|---|---|---|
| 10,419,763 B2 * | 9/2019 | Huang | ................ H04N 19/196 |
| 11,240,533 B2 | 2/2022 | Choi et al. | |
| 11,778,232 B2 | 10/2023 | Choi et al. | |

(Continued)

*Primary Examiner* — Leron Beck
(74) *Attorney, Agent, or Firm* — Fish & Richardson P.C.

(57) ABSTRACT

A video decoding method performed by a decoding apparatus according to the present document comprises the steps of: receiving a bit stream including residual information of a current block; deriving a specific number of the number of context encoding bins for context syntax elements for a current sub-block of the current block; decoding the context syntax elements for the current sub-block included in the residual information on the basis of the specific number; deriving transform coefficients for the current sub-block on the basis of the decoded context syntax elements; deriving residual samples for the current block on the basis of the transform coefficients; and generating a reconstructed picture on the basis of the residual samples.

20 Claims, 23 Drawing Sheets

Related U.S. Application Data 11,240,533, which is a continuation of application No. PCT/KR2020/000671, filed on Jan. 14, 2020.

(60) Provisional application No. 62/792,339, filed on Jan. 14, 2019.

(56) References Cited

U.S. PATENT DOCUMENTS

| | | | | |
|---|---|---|---|---|
| 12,155,864 | B2 | 11/2024 | Choi et al. | |
| 2006/0126744 | A1* | 6/2006 | Peng | H03M 7/4006 |
| | | | | 375/E7.199 |
| 2010/0027680 | A1* | 2/2010 | Segall | H04N 19/43 |
| | | | | 375/240.03 |
| 2013/0128966 | A1* | 5/2013 | Gao | H04N 19/157 |
| | | | | 375/240.12 |
| 2013/0188683 | A1* | 7/2013 | Kim | H04N 19/157 |
| | | | | 375/E7.126 |
| 2013/0188699 | A1* | 7/2013 | Joshi | H04N 19/42 |
| | | | | 375/240.12 |
| 2014/0146894 | A1* | 5/2014 | Yu | H04N 19/625 |
| | | | | 375/240.18 |
| 2015/0016537 | A1* | 1/2015 | Karczewicz | H04N 19/176 |
| | | | | 375/240.18 |
| 2016/0234498 | A1* | 8/2016 | Misra | H04N 19/46 |
| 2016/0353113 | A1* | 12/2016 | Zhang | H04N 19/91 |
| 2018/0084284 | A1* | 3/2018 | Rosewarne | H04N 19/124 |
| 2019/0208225 | A1* | 7/2019 | Chen | H04N 19/176 |
| 2020/0036969 | A1* | 1/2020 | Sarwer | H04N 19/70 |
| 2020/0112746 | A1* | 4/2020 | Tsukuba | H04N 19/124 |
| 2020/0177882 | A1* | 6/2020 | Yoo | H04N 19/18 |
| 2020/0382813 | A1* | 12/2020 | Karczewicz | H04N 19/176 |
| 2021/0337235 | A1 | 10/2021 | Choi et al. | |
| 2022/0124370 | A1 | 4/2022 | Choi et al. | |
| 2024/0146964 | A1 | 5/2024 | Choi et al. | |
| 2025/0088667 | A1 | 3/2025 | Choi et al. | |

* cited by examiner

FIG. 2

FIG. 9
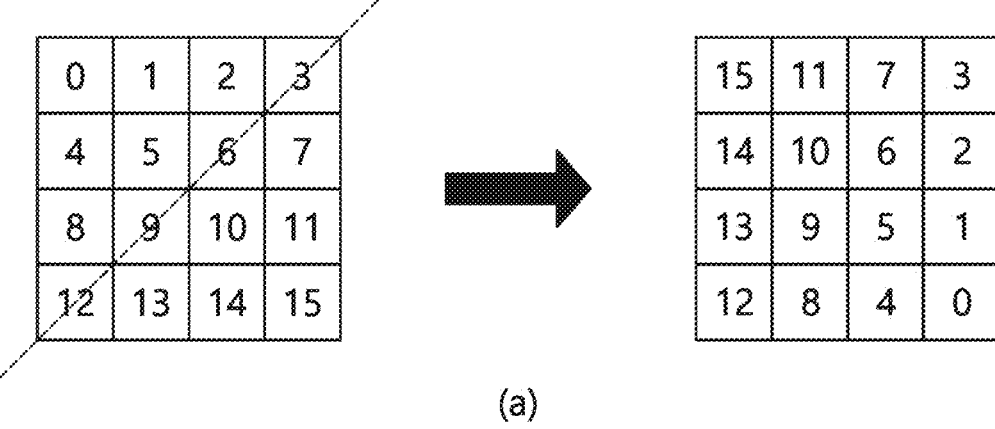
(a)
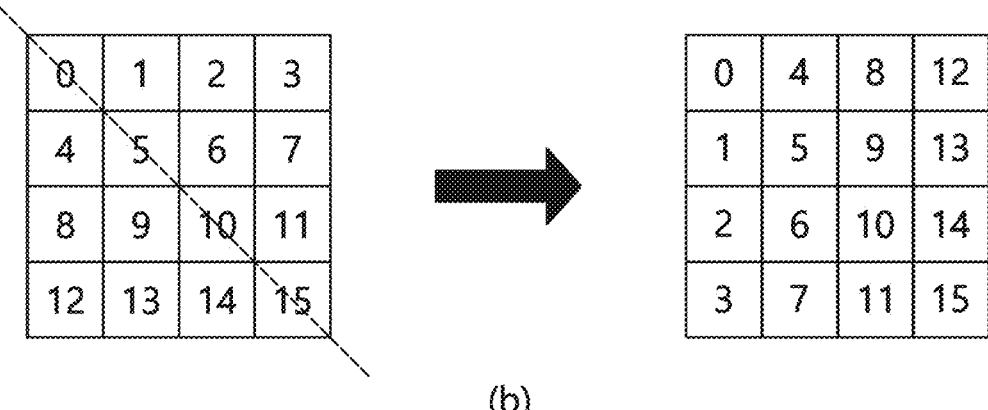
(b)

(a)

(b)

FIG. 11
| 0 | 1 | 2 | 3 |
|---|---|---|---|
| 4 | 5 | 6 | 7 |
| 8 | 9 | 10 | 11 |
| 12 | 13 | 14 | 15 |
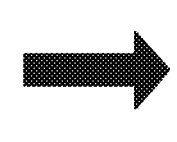
| 15 | 14 | 11 | 10 |
|---|---|---|---|
| 13 | 9 | 7 | 6 |
| 5 | 12 | 8 | 4 |
| 3 | 2 | 1 | 0 |
(a)
| 0 | 1 | 2 | 3 |
|---|---|---|---|
| 4 | 5 | 6 | 7 |
| 8 | 9 | 10 | 11 |
| 12 | 13 | 14 | 15 |
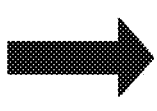
| 15 | 11 | 14 | 10 |
|---|---|---|---|
| 7 | 6 | 13 | 9 |
| 5 | 3 | 2 | 1 |
| 12 | 8 | 4 | 0 |
(b)

FIG. 12
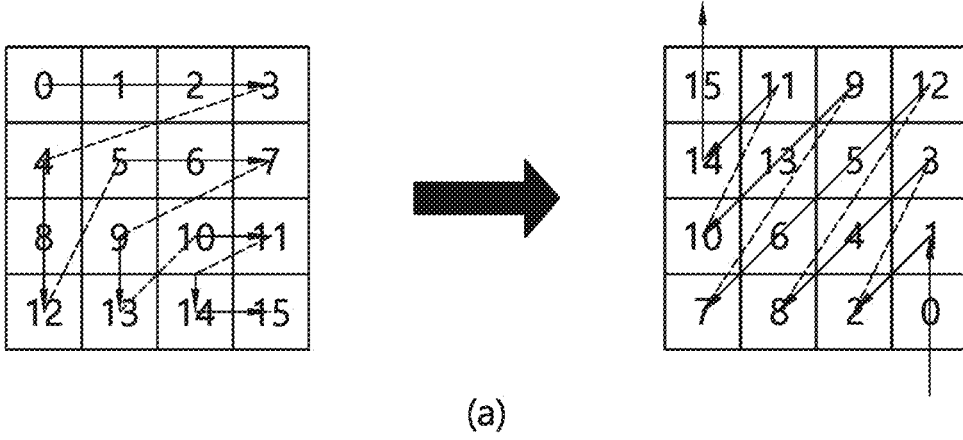
(a)
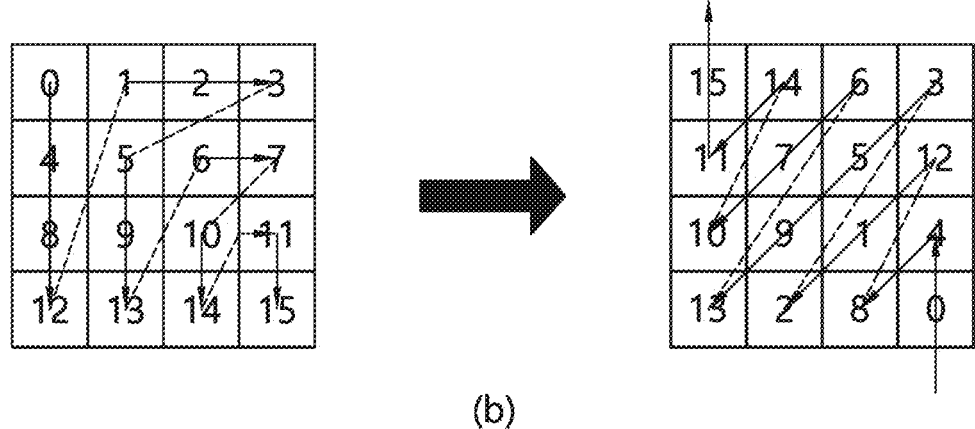
(b)

FIG. 13
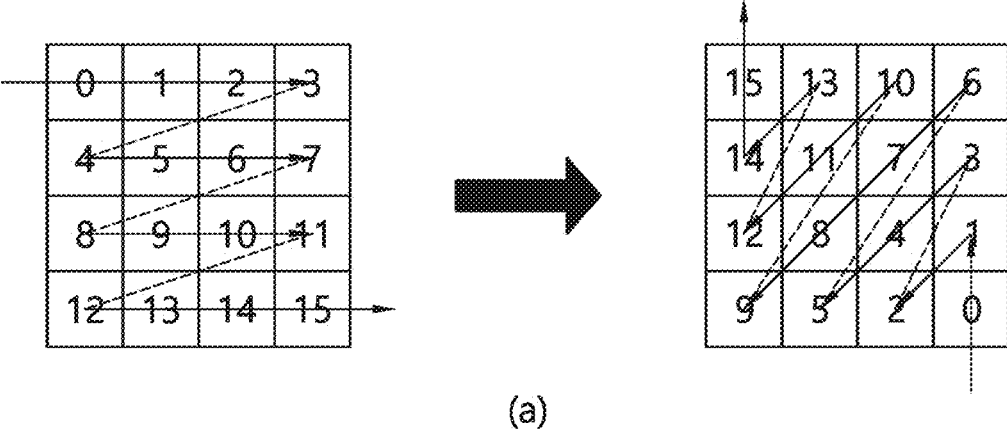
(a)
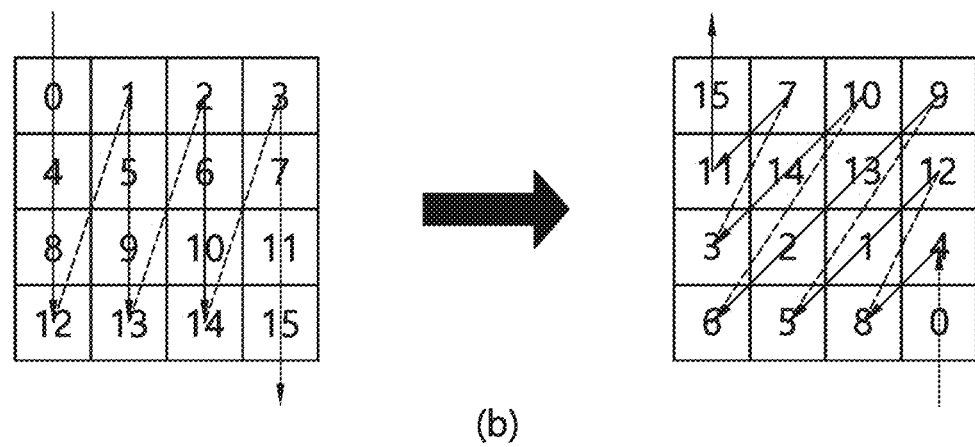
(b)

FIG. 14B
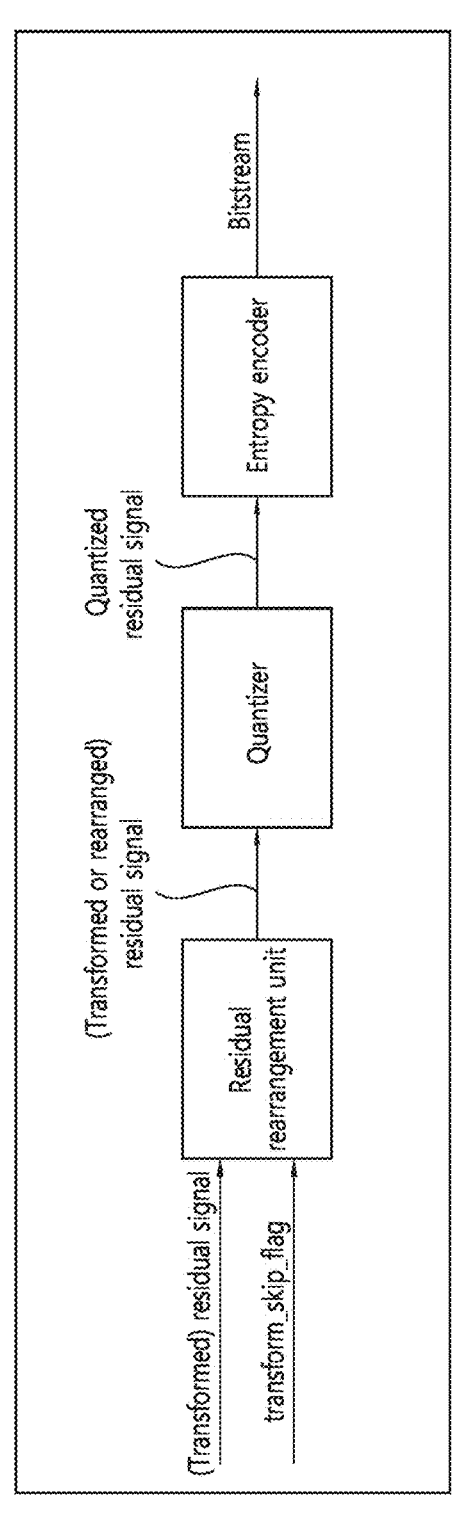
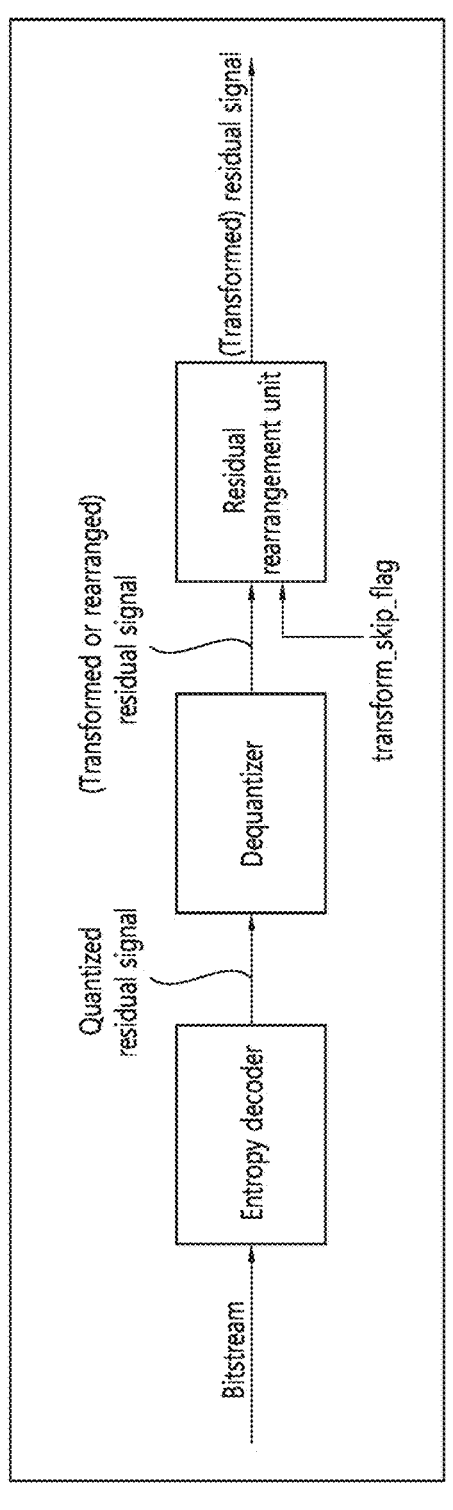

FIG. 17

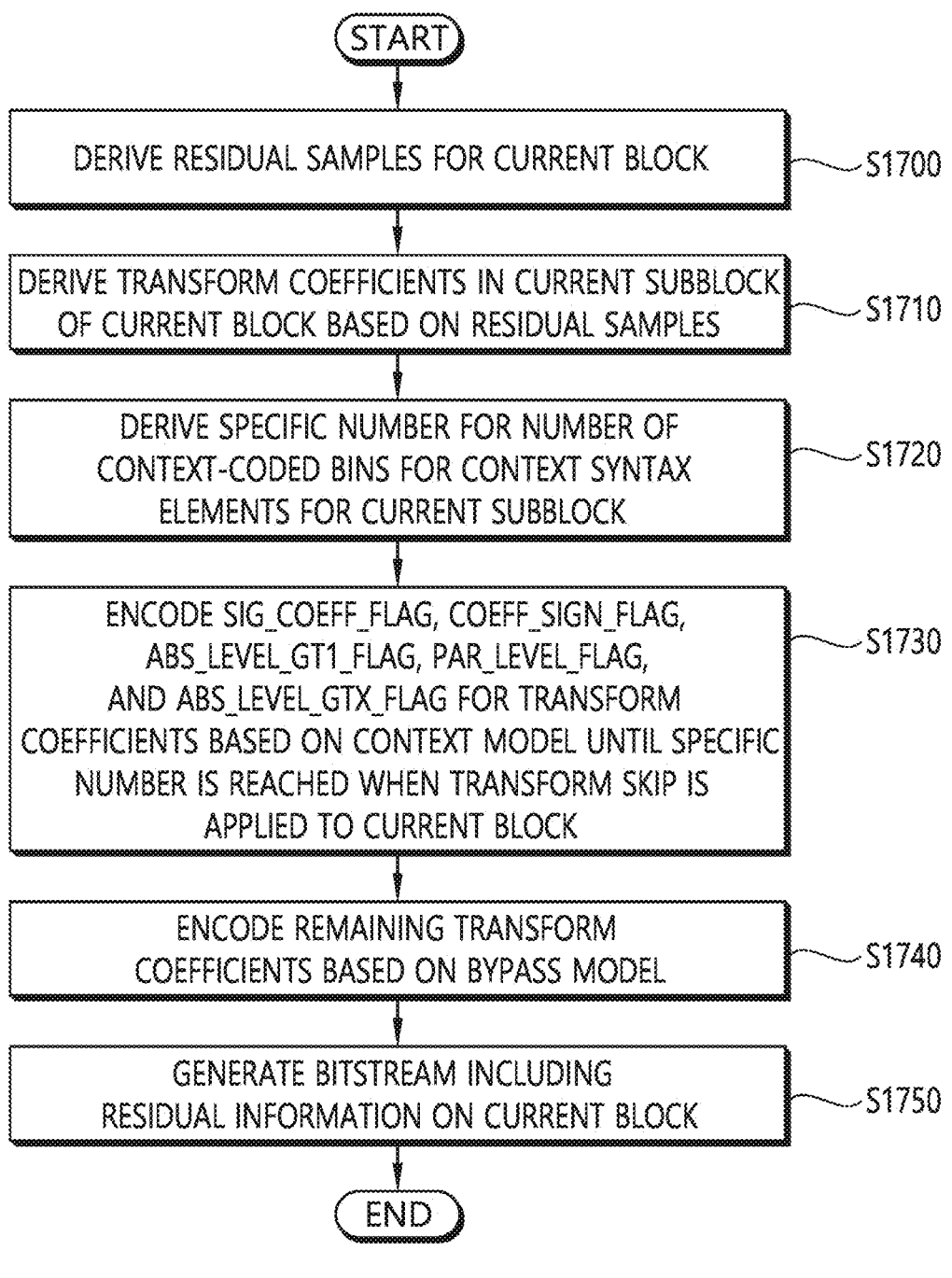

START

DERIVE RESIDUAL SAMPLES FOR CURRENT BLOCK —— S1700

DERIVE TRANSFORM COEFFICIENTS IN CURRENT SUBBLOCK OF CURRENT BLOCK BASED ON RESIDUAL SAMPLES —— S1710

DERIVE SPECIFIC NUMBER FOR NUMBER OF CONTEXT-CODED BINS FOR CONTEXT SYNTAX ELEMENTS FOR CURRENT SUBBLOCK —— S1720

ENCODE SIG_COEFF_FLAG, COEFF_SIGN_FLAG, ABS_LEVEL_GT1_FLAG, PAR_LEVEL_FLAG, AND ABS_LEVEL_GTX_FLAG FOR TRANSFORM COEFFICIENTS BASED ON CONTEXT MODEL UNTIL SPECIFIC NUMBER IS REACHED WHEN TRANSFORM SKIP IS APPLIED TO CURRENT BLOCK —— S1730

ENCODE REMAINING TRANSFORM COEFFICIENTS BASED ON BYPASS MODEL —— S1740

GENERATE BITSTREAM INCLUDING RESIDUAL INFORMATION ON CURRENT BLOCK —— S1750

END

FIG. 19

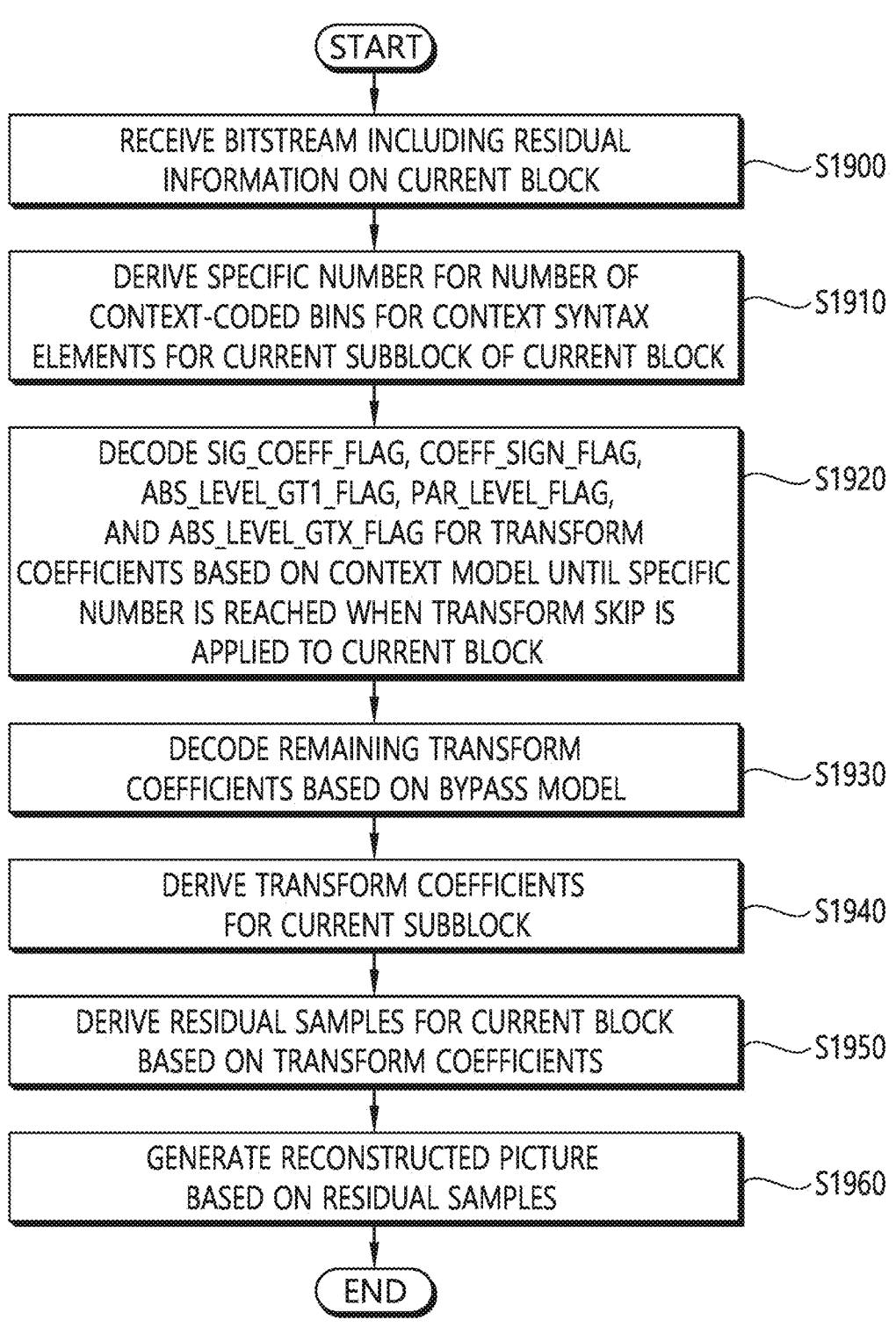

START

RECEIVE BITSTREAM INCLUDING RESIDUAL INFORMATION ON CURRENT BLOCK — S1900

DERIVE SPECIFIC NUMBER FOR NUMBER OF CONTEXT-CODED BINS FOR CONTEXT SYNTAX ELEMENTS FOR CURRENT SUBBLOCK OF CURRENT BLOCK — S1910

DECODE SIG_COEFF_FLAG, COEFF_SIGN_FLAG, ABS_LEVEL_GT1_FLAG, PAR_LEVEL_FLAG, AND ABS_LEVEL_GTX_FLAG FOR TRANSFORM COEFFICIENTS BASED ON CONTEXT MODEL UNTIL SPECIFIC NUMBER IS REACHED WHEN TRANSFORM SKIP IS APPLIED TO CURRENT BLOCK — S1920

DECODE REMAINING TRANSFORM COEFFICIENTS BASED ON BYPASS MODEL — S1930

DERIVE TRANSFORM COEFFICIENTS FOR CURRENT SUBBLOCK — S1940

DERIVE RESIDUAL SAMPLES FOR CURRENT BLOCK BASED ON TRANSFORM COEFFICIENTS — S1950

GENERATE RECONSTRUCTED PICTURE BASED ON RESIDUAL SAMPLES — S1960

END

VIDEO DECODING METHOD USING RESIDUAL INFORMATION IN VIDEO CODING SYSTEM, AND APPARATUS THEREOF

CROSS-REFERENCE TO RELATED APPLICATIONS

This application is a continuation of, and claims priority to, U.S. patent application Ser. No. 18/957,652, filed Nov. 22, 2024, which is a continuation of U.S. patent application Ser. No. 18/374,648, filed Sep. 28, 2023, now U.S. Pat. No. 12,155,864, which is a continuation of U.S. patent application Ser. No. 17/562,227, filed Dec. 27, 2021, now U.S. Pat. No. 11,778,232, which is a continuation of U.S. patent application Ser. No. 17/368,005, filed, Jul. 6, 2021, now U.S. Pat. No. 11,240,533, which is a continuation of International Application No. PCT/KR2020/000671, with an international filing date of Jan. 14, 2020, which claims the benefit of U.S. Provisional Patent Application No. 62/792,339, filed on Jan. 14, 2019, the entire contents of each of which are incorporated herein by reference.

BACKGROUND

Technical Field

The present disclosure relates to an image coding technique and, more particularly, to an image decoding method for coding residual information including syntax elements for a transform coefficient of a residual in an image coding system and an apparatus therefor.

Related Art

In recent years, the demand for high-resolution and high-quality images, such as high-definition (HD) and ultra-high-definition (UHD) images, has been increasing in various fields. As image data has higher resolution and higher quality, the amount of transmitted information or bits increases compared to conventional image data. Therefore, when image data is transmitted using a medium such as a conventional wired/wireless broadband line or image data is stored using an existing storage medium, transmission and storage costs are increased.

Accordingly, a high-efficiency image compression technique is required to effectively transmit or store and reproduce information on high-resolution and high-quality images.

SUMMARY

A technical aspect of the present disclosure is to provide a method and an apparatus for increasing image coding efficiency.

Another technical aspect of the present disclosure is to provide a method and an apparatus for increasing residual coding efficiency.

Still another technical aspect of the present disclosure is to provide a method and an apparatus for adjusting the number of context-coded bins for a current subblock considering the total number of context-coded bins for context syntax elements when coding residual information.

According to an embodiment of the present disclosure, there is provided an image decoding method performed by a decoding apparatus. The method includes receiving a bitstream including residual information on a current block, deriving a specific number for a number of context-coded bins for context syntax elements for a current subblock of the current block, decoding the context syntax elements for the current subblock included in the residual information based on the specific number, deriving transform coefficients for the current subblock based on the decoded context syntax elements, deriving residual samples for the current block based on the transform coefficients; and generating a reconstructed picture based on the residual samples, wherein, when a transform skip is applied to the current block, a significant coefficient flag relating to whether a transform coefficient is a non-zero transform coefficient, a sign flag relating to a sign of the transform coefficient, a first transform coefficient level flag relating to whether a transform coefficient level is greater than a first threshold, a parity level flag relating to a parity of the transform coefficient level of the transform coefficient, and a second transform coefficient level flag relating to whether the transform coefficient level of the transform coefficient is greater than a second threshold are decoded based on a context model until the specific number is reached.

According to another embodiment of the present disclosure, there is provided a decoding apparatus for performing image decoding. The decoding apparatus includes an entropy decoder to receive a bitstream including residual information on a current block, to derive a specific number for a number of context-coded bins for context syntax elements for a current subblock of the current block, to decode the context syntax elements for the current subblock included in the residual information based on the specific number, and to derive transform coefficients for the current subblock based on the decoded context syntax elements, an inverse transformer to derive residual samples for the current block based on the transform coefficients, and an adder to generate a reconstructed picture based on the residual samples, wherein, when a transform skip is applied to the current block, a significant coefficient flag relating to whether a transform coefficient is a non-zero transform coefficient, a sign flag relating to a sign of the transform coefficient, a first transform coefficient level flag relating to whether a transform coefficient level is greater than a first threshold, a parity level flag relating to a parity of the transform coefficient level of the transform coefficient, and a second transform coefficient level flag relating to whether the transform coefficient level of the transform coefficient is greater than a second threshold are decoded based on a context model until the specific number is reached.

According to still another embodiment of the present disclosure, there is provided an image encoding method performed by an encoding apparatus. The method may include deriving residual samples for a current block, deriving transform coefficients in a current subblock of the current block based on the residual samples, deriving a specific number for a number of context-coded bins for context syntax elements for the current subblock, encoding the context syntax elements based on the specific number, and generating a bitstream including residual information on the current block including the encoded context syntax elements, wherein, based on a transform skip being applied to the current block, a significant coefficient flag relating to whether a transform coefficient is a non-zero transform coefficient, a sign flag relating to a sign of the transform coefficient, a first transform coefficient level flag relating to whether a transform coefficient level is greater than a first threshold, a parity level flag relating to a parity of the transform coefficient level of the transform coefficient, and a second transform coefficient level flag relating to whether the transform coefficient level of the transform coefficient is greater than a second threshold are decoded based on a context model until the specific number is reached.

According to yet another embodiment of the present disclosure, there is provided a video encoding apparatus. The encoding apparatus includes a subtractor to derive residual samples for a current block, a transformer to derive transform coefficients in a current subblock of the current block based on the residual samples, and an entropy encoder to derive a specific number for a number of context-coded bins for context syntax elements for the current subblock, to encode the context syntax elements based on the specific number, and to generate a bitstream including residual information on the current block including the encoded context syntax elements, wherein, based on a transform skip being applied to the current block, a significant coefficient flag relating to whether a transform coefficient is a non-zero transform coefficient, a sign flag relating to a sign of the transform coefficient, a first transform coefficient level flag relating to whether a transform coefficient level is greater than a first threshold, a parity level flag relating to a parity of the transform coefficient level of the transform coefficient, and a second transform coefficient level flag relating to whether the transform coefficient level of the transform coefficient is greater than a second threshold are decoded based on a context model until the specific number is reached.

According to still another embodiment of the present disclosure, there may be provided a digital storage medium that stores image data including encoded image information and a bitstream generated according to an image encoding method performed by an encoding apparatus.

According to yet another embodiment of the present disclosure, there may be provided a digital storage medium that stores image data including encoded image information and a bitstream to cause a decoding apparatus to perform the image decoding method.

According to the present disclosure, it is possible to increase overall image/video compression efficiency.

According to the present disclosure, it is possible to increase the efficiency of residual coding.

According to the present disclosure, the total number of context-coded bins for context syntax elements for transform coefficients in a current block, which is included in residual information, may be limited to a predetermined specific number or less, thereby reducing data coded based on context.

According to the present disclosure, the number of context-coded bins for a current subblock may be adjusted considering the total number of context-coded bins for context syntax elements rather than considering coding of each context syntax element, thus reducing the complexity of residual coding and improving overall coding efficiency.

BRIEF DESCRIPTION OF THE DRAWINGS

FIG. 2 schematically illustrates the configuration of a video/image encoding apparatus to which embodiments of the present disclosure are applicable.

FIG. 9 illustrates residual coefficients of a current block to which a rearrangement method of mirroring is applied.

FIG. 11 illustrates residual coefficients of a current block to which an embodiment of dividing layers based on the distance to a reference sample and performing rearrangement at positions according to an inverse raster order is applied.

FIG. 12 illustrates residual coefficients of a current block to which an embodiment of dividing layers based on the distance to a reference sample and performing rearrangement at positions according to a diagonal scan order is applied.

FIG. 13 illustrates residual coefficients of a current block to which the foregoing embodiment of dividing layers based on the distance to a specific reference sample and performing rearrangement at positions according to a diagonal scan order is applied.

FIG. 14A and FIG. 14B illustrate an embodiment of determining whether to apply a rearrangement method based on a transform skip flag for a current block and an encoding apparatus and a decoding apparatus performing the embodiment.

FIG. 17 schematically illustrates an image encoding method by an encoding apparatus according to the present disclosure.

FIG. 19 schematically illustrates an image decoding method by a decoding apparatus according to the present disclosure.

DESCRIPTION OF EXEMPLARY EMBODIMENTS

Figure 1:
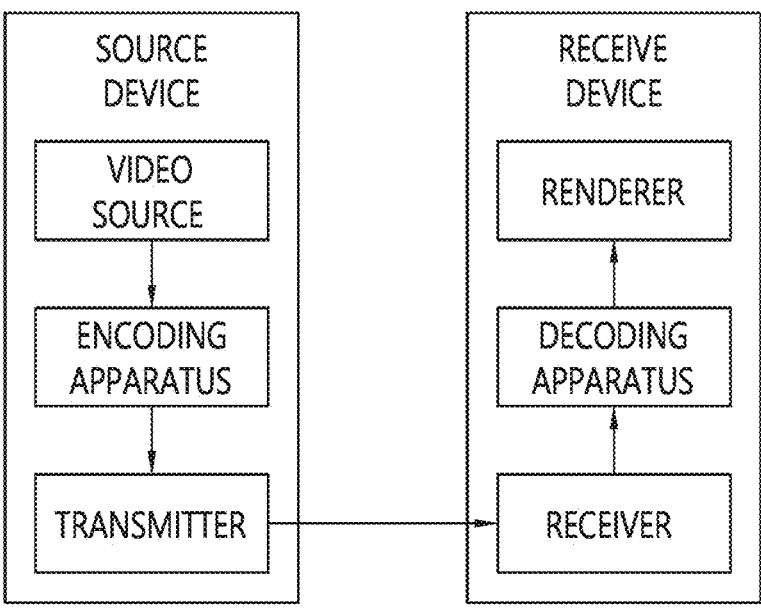
FIG. 1 schematically illustrates an example of a video/image coding system to which embodiments of the present disclosure are applicable.

While the present disclosure may be susceptible to various modifications and include various embodiments, specific embodiments thereof have been shown in the drawings by way of example and will now be described in detail. However, this is not intended to limit embodiments of the present disclosure to the specific embodiments disclosed herein. The terminology used herein is for the purpose of describing specific embodiments only, and is not intended to limit technical idea of the present document. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present document as long as they do not depart from the essence of the present document.

Hereinafter, exemplary embodiments of the present disclosure will be described in detail with reference to the accompanying drawings. In addition, like reference numerals are used to indicate like elements throughout the drawings, and redundant descriptions of like elements will be omitted.

FIG. 1 schematically illustrates an example of a video/image coding system to which embodiments of the present disclosure are applicable.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, a method/embodiment disclosed in this document may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

This document suggests various embodiments of video/image coding, and the above embodiments may also be performed in combination with each other unless otherwise specified.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture (a brick may represent a rectangular region of CTU rows within a tile in a picture). A tile may be partitioned into a multiple bricks, each of which may be constructed with one or more CTU rows within the tile (A tile may be partitioned into multiple bricks, each of which consisting of one or more CTU rows within the tile). A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture (A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture). A tile is a particular tile column and a rectangular region of CTUs within a particular tile column (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice may include an integer number of bricks of a picture, and the integer number of bricks may be included in a single NAL unit (A slice includes an integer number of bricks of a picture that may be exclusively contained in a single NAL unit). A slice may be constructed with multiple complete tiles, or may be a consecutive sequence of complete bricks of one tile (A slice may consists of either a number of complete tiles or only a consecutive sequence of complete bricks of one tile). In this document, a tile group and a slice may be used in place of each other. For example, in this document, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb and er) blocks. The unit may be used interchangeably with terms such as block or area in some cases. In a general case, an M×N block may include samples (or sample arrays) or a set (or array) of transform coefficients of M columns and N rows.

In this document, the symbol "/" and "," should be interpreted as "and/or." For example, the expression "A/B" is interpreted as "A and/or B", and the expression "A, B" is interpreted as "A and/or B." Additionally, the expression "A/B/C" means "at least one of A, B, and/or C." Further, the expression "A, B, C" also means "at least one of A, B, and/or C." (In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C.")

Additionally, in the present document, the term "or" should be interpreted as "and/or." For example, the expression "A or B" may mean 1) only "A", 2) only "B", and/or 3) "both A and B." In other words, the term "or" in the present document may mean "additionally or alternatively." (Further, in the document, the term "or" should be interpreted to indicate "and/or." For instance, the expression "A or B" may include 1) only A, 2) only B, and/or 3) both A and B. In other words, the term "or" in this document should be interpreted to indicate "additionally or alternatively.")

Figure 2:
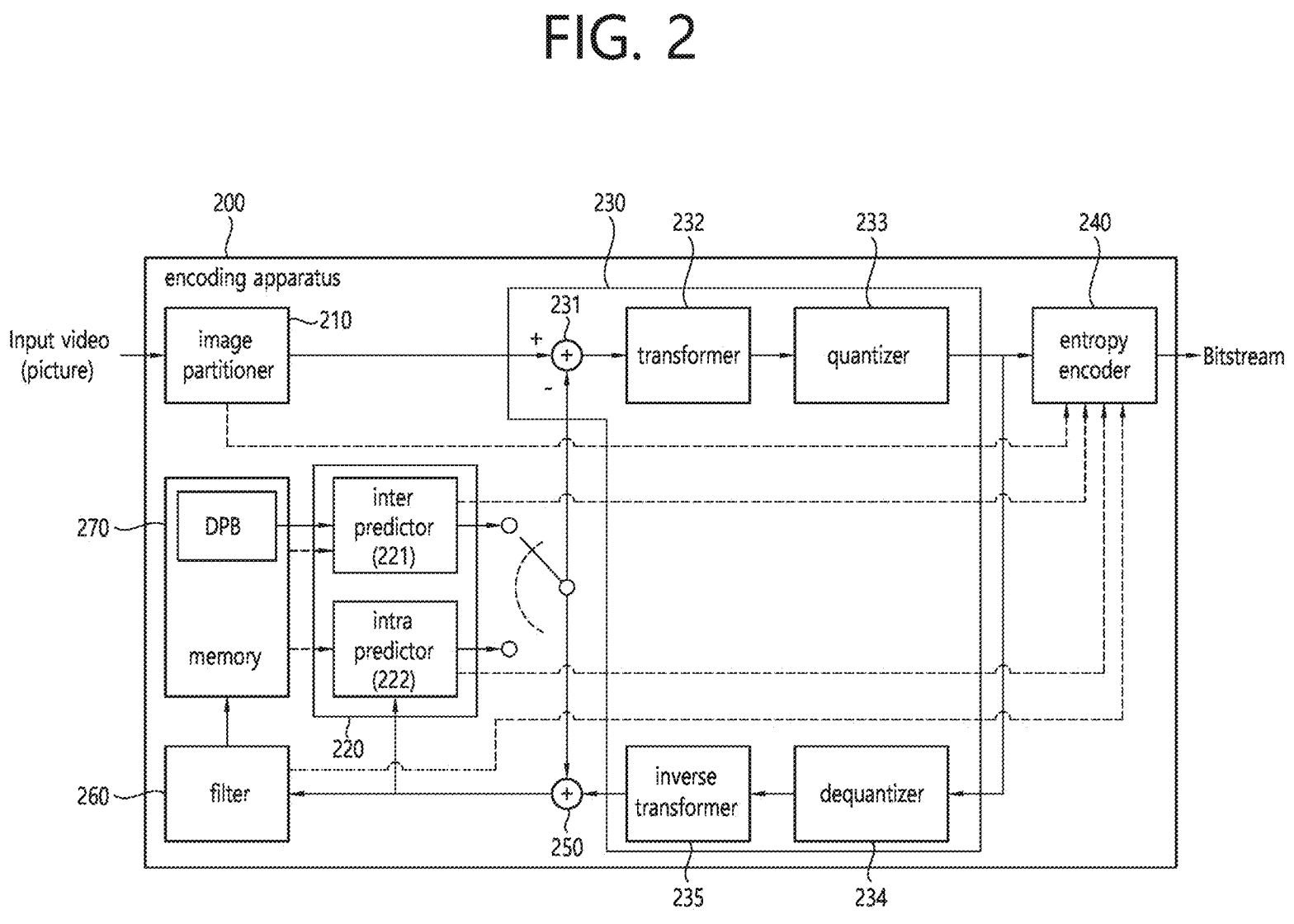

FIG. 2 schematically illustrates the configuration of a video/image encoding apparatus to which embodiments of the present disclosure are applicable. Hereinafter, a video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (LO prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 232 may generate transform coefficients by applying the transform technique to the residual signal. For example, the transform technique may include at least one of a discrete cosine transform (DCT), a discrete sine transform (DST), a Karhunen-Loeve transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in this document may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus 300, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
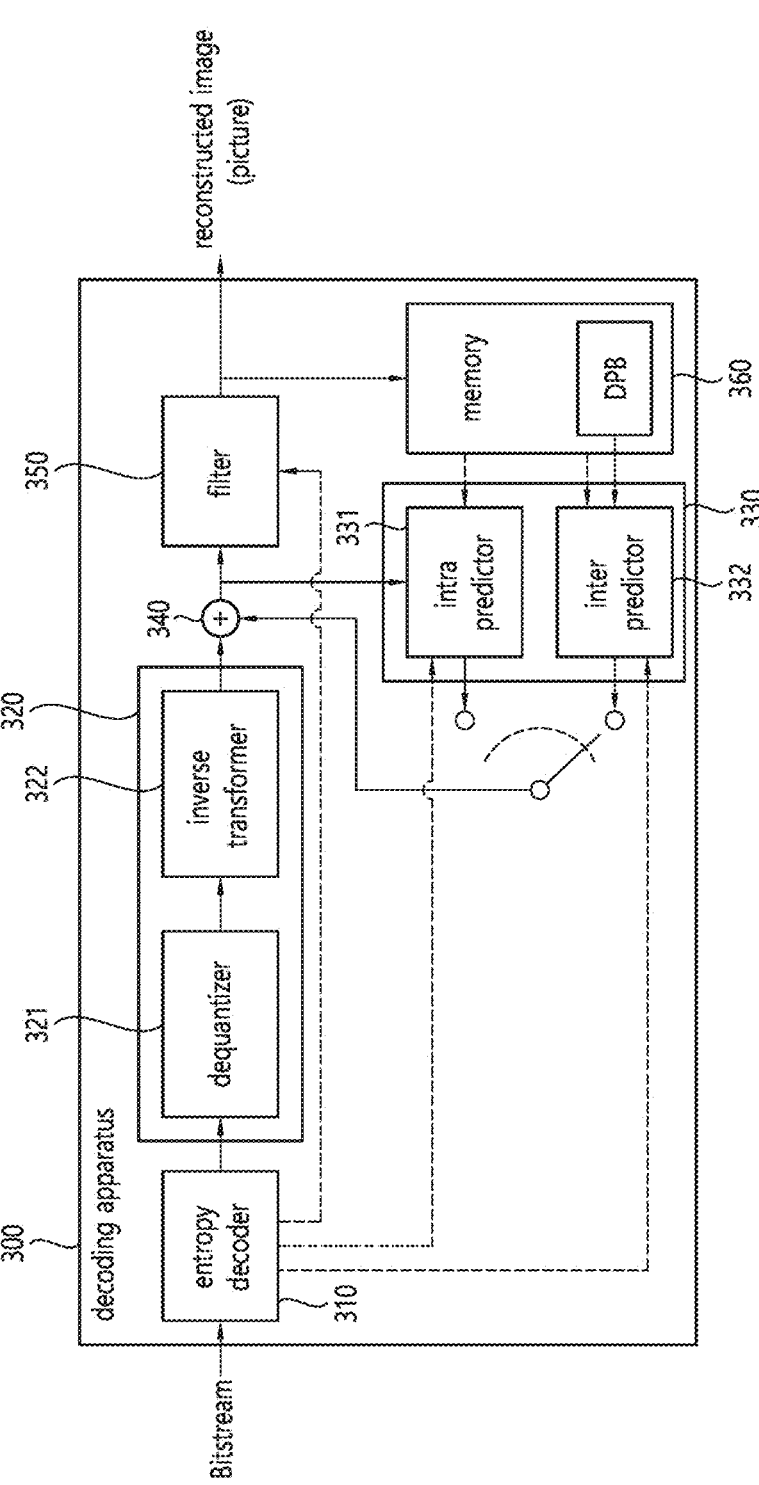
FIG. 3 schematically illustrates the configuration of a video/image decoding apparatus to which embodiments of the present disclosure are applicable.

FIG. 3 schematically illustrates the configuration of a video/image decoding apparatus to which embodiments of the present disclosure are applicable.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in this document may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to this document may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (LO prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present specification, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

As described above, the encoding apparatus may perform various encoding methods, such as exponential Golomb coding, context-adaptive variable length coding (CAVLC), and context-adaptive binary arithmetic coding (CABAC). In addition, the decoding apparatus may decode information in a bitstream based on a coding method, such as exponential Golomb coding, CAVLC, or CABAC, and may output the value of a syntax element necessary for image reconstruction and quantized values of a transform coefficient regarding a residual.

For example, the foregoing coding methods may be performed as described below.

Figure 4:
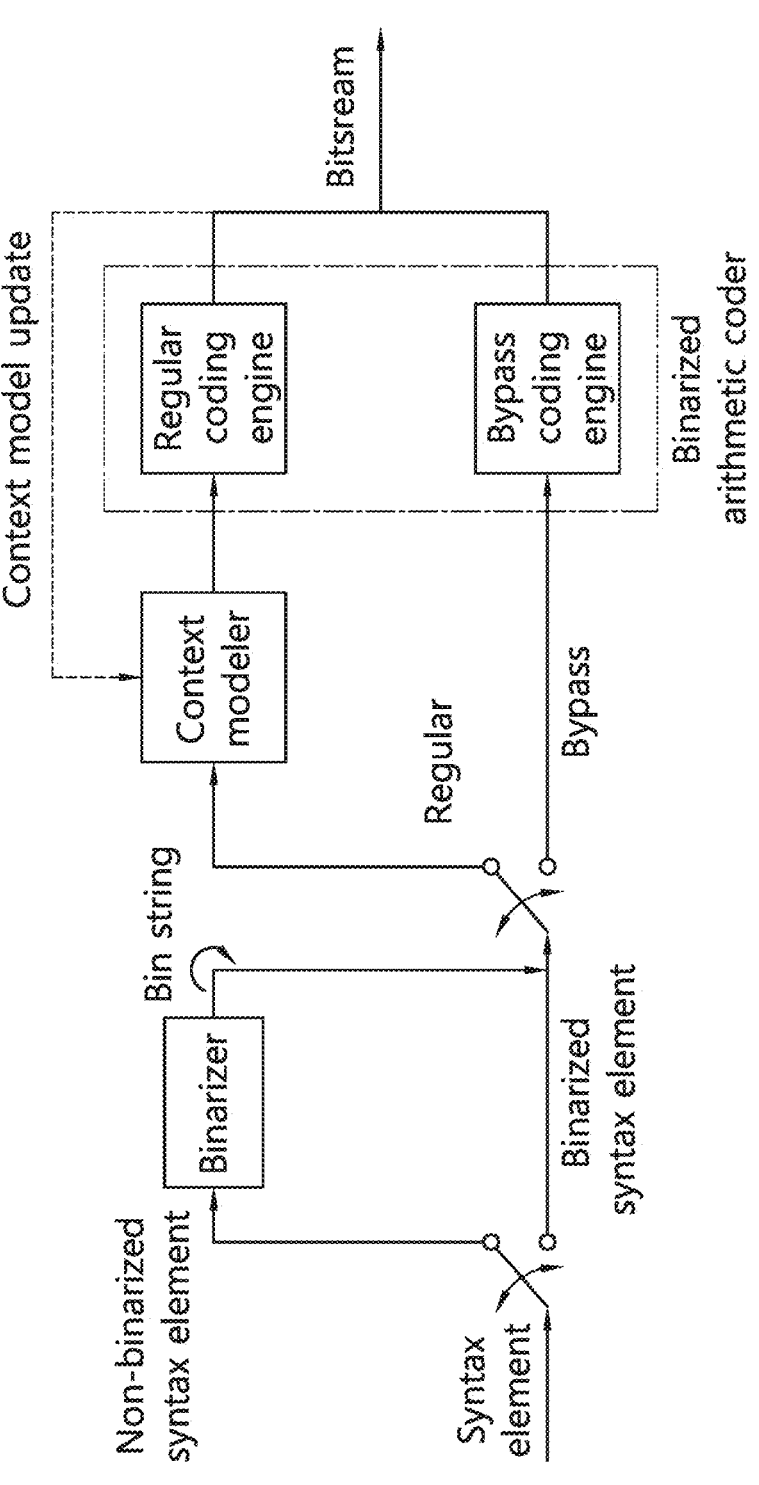
FIG. 4 illustrates context-adaptive binary arithmetic coding (CABAC) for encoding a syntax element.

FIG. 4 illustrates context-adaptive binary arithmetic coding (CABAC) for encoding a syntax element. For example, in an encoding process of CABAC, when an input signal is a syntax element rather than a binary value, an encoding apparatus may convert the input signal into a binary value by binarizing the value of the input signal. When the input signal is already a binary value (i.e., the value of the input signal is a binary value), the input signal may be bypassed without binarization. Here, each binary 0 or 1 forming the binary value may be referred to as a bin. For example, when a binary string resulting from the binarization is 110, each of 1, 1, and 0 is called one bin. The bin(s) for one syntax element may indicate the value of the syntax element.

The binarized bins of the syntax element may be input to a regular coding engine or a bypass coding engine. The regular coding engine of the encoding apparatus may assign a context model that reflects a probability value for the bins and may encode the bins based on the assigned context model. The regular coding engine of the encoding apparatus may encode on each bin and may then update the context model for the bin. These encoded bins may be referred to as context-coded bins.

When the binarized bins of the syntax element are input to the bypass coding engine, the bins may be coded as follows. For example, the bypass coding engine of the encoding apparatus omits a procedure of estimating a probability for the input bins and a procedure of updating a probability model applied to the bins after encoding. When bypass encoding is applied, the encoding apparatus may encode the input bits by applying a uniform probability distribution instead of assigning a context model, thus increasing encoding speed. These coded bins may be referred to as bypass bins.

Entropy decoding may be performed by the same process as entropy encoding described above in reverse order.

For example, when the syntax element is decoded based on a context model, the decoding apparatus may receive a bin corresponding to the syntax element through the bitstream, may determine the context model using the syntax element and decoding information on a block to be decoded or a neighboring block or information on a symbol/bin decoded in a previous step, and may derive the value of the syntax element by predicting the probability of the received bin occurring and performing arithmetic decoding of the bin according to the determined context model. Subsequently, a context model for a bin to be subsequently decoded may be updated to the determined context model.

Further, for example, when the syntax element is subjected to bypass decoding, the decoding apparatus may receive the bin corresponding to the syntax element through the bitstream and may decode the input bin by applying a uniform probability distribution. In this case, the decoding apparatus may omit the procedure of deriving the context model for the syntax element and the procedure of updating the context model applied to the bin after decoding.

As described above, residual samples may be derived as quantized transform coefficients through transform and quantization processes. The quantized transform coefficients may also be referred to as transform coefficients. In this case, the transform coefficients within a block may be signaled in the form of residual information. The residual information may include a residual coding syntax. That is, the encoding apparatus may construct the residual coding syntax with the residual information, may encode the residual coding syntax, and may output residual coding syntax in the form of a bitstream, and the decoding apparatus may decode the residual coding syntax from the bitstream and may derive residual (quantized) transform coefficients. As described below, the residual coding syntax may include syntax elements indicating whether a transform is applied to the block, the position of the last significant transform coefficient in the block, whether there is a significant transform coefficient in a subblock, the size/code of a significant transform coefficient, and the like.

For example, the (quantized) transform coefficients (i.e., the residual information) may be encoded and/or decoded based on syntax elements, such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, abs_level_gt1_flag, abs_level_gt3_flag, abs_remainder, coeff_sign_flag, and mts_idx. The syntax elements related to residual data encoding/decoding may be illustrated in the following table.

TABLE 1

| | Descriptor |
|---|---|
| residual_coding( x0, y0, log2TbWidth, log2TbHeight, cIdx ) { | |
|   if( transform_skip_enabled_flag && ( cIdx ! = 0 \|\| tu_mts_flag[ x0 ][ y0 ] = = 0 ) && | |
|     ( log2TbWidth <= 2 ) && ( log2TbHeight <= 2 ) ) | |
|     transform_skip_flag[ x0 ][ y0 ][ cIdx ] | ae(v) |
|   last_sig_coeff_x_prefix | ae(v) |
|   last_sig_coeff_y_prefix | ae(v) |

TABLE 1-continued

|  | Descriptor |
|---|---|

```
if( last_sig_coeff_x_prefix > 3 )
    last_sig_coeff_x_suffix                                                    ae(v)
if( last_sig_coeff_y_prefix > 3 )
    last_sig_coeff_y_suffix                                                    ae(v)
log2SbSize = ( Min( log2TbWidth, log2TbHeight ) < 2 ? 1 : 2 )
numSbCoeff = 1 << ( log2SbSize << 1 )
lastScanPos = numSbCoeff
lastSubBlock = ( 1 << ( log2TbWidth + log2TbHeight − 2 * log2SbSize ) ) − 1
do {
    if( lastScanPos = = 0 ) {
        lastScanPos = numSbCoeff
        lastSubBlock− −
    }
    lastScanPos
    xS = DiagScanOrder[ log2TbWidth − log2SbSize ][ log2TbHeight − log2SbSize ]
                [ lastSubBlock ][ 0 ]
    yS = DiagScanOrder[ log2TbWidth − log2SbSize ][ log2TbHeight − log2SbSize ]
                [ lastSubBlock ][ 1 ]
    xC = ( xS << log2SbSize ) +
        DiagScanOrder[ log2SbSize ][ log2SbSize ][ lastScanPos ][ 0 ]
    yC = ( yS << log2SbSize ) +
        DiagScanOrder[ log2SbSize ][ log2SbSize ][ lastScanPos ][ 1 ]
} while( ( xC != LastSignificantCoeffX ) ( yC != LastSignificantCoeffY ) )
numSigCoeff = 0
QState = 0
for( i = lastSubBlock; i >= 0; i− − ) {
    startQStateSb = QState
    xS = DiagScanOrder[ log2TbWidth log2SbSize ][ log2TbHeight log2SbSize ]
                [ lastSubBlock ][ 0 ]
    yS = DiagScanOrder[ log2TbWidth − log2SbSize ][ log2TbHeight − log2SbSize ]
                [ lastSubBlock ][ 1 ]
    inferSbDcSigCoeffFlag = 0
            if( ( i < lastSubBlock ) && ( i > 0 ) ) {
                coded_sub_block_flag[ xS ][ yS ]                              ae(v)
                inferSbDcSigCoeffFlag = 1
            }
            firstSigScanPosSb = numSbCoeff
            lastSigScanPosSb = −1
            remBinsPass1 = ( log2SbSize < 2 ? 6 : 28 )
            remBinsPass2 = ( log2SbSize < 2 ? 2 : 4 )
            firstPosMode0 = ( i = = lastSubBlock ? lastScanPos 1 : numSbCoeff 1 )
            firstPosMode1 = −1
            firstPosMode2 = −1
            for( n = ( i = = firstPosMode0; n >= 0 && remBinsPass1 >= 3; n− − ) {
                xC = ( xS << log2SbSize ) + DiagScanOrder[ log2SbSize ][ log2SbSize ][ n ][ 0 ]
                yC = ( yS << log2SbSize ) + DiagScanOrder[ log2SbSize ][ log2SbSize ][ n ][ 1 ]
                if( coded_sub_block_flag[ xS ][ yS ] && ( n > 0 || !inferSbDcSigCoeffFlag ) ) {
                    sig_coeff_flag[ xC ][ yC ]                               ae(v)
                    remBinsPass1− −
                    if( sig_coeff_flag[ xC ][ yC ] )
                        inferSbDcSigCoeffFlag = 0
                }
                if( sig_coeff_flag[ xC ][ yC ] ) {
                    numSigCoeff++
                    abs_level_gt1_flag[ n ]                                  ae(v)
                    remBinsPass1
                    if( abs_level_gt1_flag[ n ] ) {
                        par_level_flag[ n ]                                  ae(v)
                        remBinsPass1− −
                        if( remBinsPass2 > 0 ) {
                            remBinsPass2− −
                            if( remBinsPass2 = = 0 )
                                firstPosMode1 = n 1
                        }
                    }
                    if( lastSigScanPosSb = = −1 )
                        lastSigScanPosSb = n
                    firstSigScanPosSb = n
                }
                AbsLevelPass1[ xC ][ yC ] =
                        sig_coeff_flag[ xC ][ yC ] + par_level_flag[ n ] + abs_level_gt1_flag[ n ]
                if( dep_quant_enabled_flag )
                    QState = QStateTransTable[ QState ][ AbsLevelPass1[ xC ][ yC ] & 1 ]
                if( remBinsPass1 < 3 )
                    firstPosMode2 = n − 1
            }
```

TABLE 1-continued

| | Descriptor |
|---|---|

```
      if( firstPosMode1 < firstPosMode2 )
         firstPosMode1 − firstPosMode2
      for( n = numSbCoeff − 1; n >= firstPosMode2; n− − )
         if( abs_level_gt1_flag[ n ] )
            abs_level_gt3_flag[ n ]                                              ae(v)
      for( n = numSbCoeff − 1; n >= firstPosMode1; n− − ) {
         xC = ( xS << log2SbSize ) + DiagScanOrder[ log2SbSize ][ log2SbSize ][ n ][ 0 ]
         yC = ( yS << log2SbSize ) + DiagScanOrder[ log2SbSize ][ log2SbSize ][ n ][ 1 ]
         if( abs_level_gt3_flag[ n ] )
            abs_remainder[ n ]                                                   ae(v)
         AbsLevel[ xC ][ yC ] = AbsLevelPass1[ xC ][ yC ] +
                        2 * ( abs_level_gt3_flag[ n ] + abs_remainder[ n ] )
      }
      for( n = firstPosMode1; n > firstPosMode2; n− − ) {
         xC = ( xS << log2SbSize ) + DiagScanOrder[ log2SbSize ][ log2SbSize ][ n ][ 0 ]
         yC = ( yS << log2SbSize ) + DiagScanOrder[ log2SbSize ][ log2SbSize ][ n ][ 1 ]
         if( abs_level_gt1_flag[ n ] )
            abs_remainder[ n ]                                                   ae(v)
         AbsLevel[ xC ][ yC ] = AbsLevelPass1[ xC ][ yC ] + 2 * abs_remainder[ n ]
      }
      for( n = firstPosMode2; n >= 0; n ) {
         xC = ( xS << log2SbSize ) + DiagScanOrder[ log2SbSize ][ log2SbSize ][ n ][ 0 ]
         yC = ( yS << log2SbSize ) + DiagScanOrder[ log2SbSize ][ log2SbSize ][ n ][ 1 ]
         dec_abs_level[ n ]                                                      ae(v)
         if(AbsLevel[ xC ][ yC ] > 0 )
            firstSigScanPosSb = n
         if( dep_quant_enabled_flag )
            QState = QStateTransTable[ QState ][ AbsLevel[ xC ][ yC ] & 1 ]
      }
      if( dep_quant_enabled_flag || !sign_data_hiding_enabled_flag )
         signHidden = 0
      else
         signHidden = ( lastSigScanPosSb firstSigScanPosSb > 3 ? 1 : 0 )
      for( n = numSbCoeff − 1; n >− 0; n− − ) {
         xC = ( xS << log2SbSize ) + DiagScanOrder[ log2SbSize ][ log2SbSize ][ n ][ 0 ]
         yC = ( yS << log2SbSize ) + DiagScanOrder[ log2SbSize ][ log2SbSize ][ n ][ 1 ]
         if( sig_coeff_flag[ xC ][ yC ] &&
            ( !signHidden || ( n != firstSigScanPosSb ) ) )
            coeff_sign_flag[ n ]                                                 ae(v)
      }
      if( dep_quant_enabled_flag ) {
         QState = startQStateSb
         for( n = numSbCoeff 1; n >= 0; n ) {
            xC = ( xS << log2SbSize ) +
               DiagScanOrder[ log2SbSize ][ log2SbSize ][ n ][ 0 ]
            yC = ( yS << log2SbSize ) +
               DiagScanOrder[ log2SbSize ][ log2SbSize ][ n ][ 1 ]
            if( sig_coeff_flag[ xC ][ yC ] )
               TransCoeffLevel[ x0 ][ y0 ][ cIdx ][ xC ][ yC ] =
                  ( 2 * AbsLevel[ xC ][ yC ] − ( QState > 1 ? 1 : 0 ) ) *
                  ( 1 − 2 * coeff_sign_flag[ n ] )
            QState = QStateTransTable[ QState ][ par_level_flag[ n ] ]
      } else {
         sumAbsLevel = 0
         for( n = numSbCoeff − 1; n >= 0; n− − ) {
            xC = ( xS << log2SbSize ) +
               DiagScanOrder[ log2SbSize ][ log2SbSize ][ n ][ 0 ]
            yC = ( yS << log2SbSize ) +
               DiagScanOrder[ log2SbSize ][ log2SbSize ][ n ][ 1 ]
            if( sig_coeff_flag[ xC ][ yC ] ) {
               TransCoeffLevel[ x0 ][ y0 ][ cIdx ][ xC ][ yC ] =
                  AbsLevel[ xC ][ yC ] * ( 1 − 2 * coeff_sign_flag[ n ] )
               if( signHidden ) {
                  sumAbsLevel += AbsLevel[ xC ][ yC ]
                  if( ( n = = firstSigScanPosSb ) && ( sumAbsLevel % 2 ) = = 1 ) )
                     TransCoeffLevel[ x0 ][ y0 ][ cIdx ][ xC ][ yC ] =
                        TransCoeffLevel[ x0 ][ y0 ][ cIdx ][ xC ][ yC ]
               }
            }
         }
      }
   }
   if( tu_mts_flag[ x0 ][ y0 ] && ( cIdx = = 0 ) )
      mts_idx[ x0 ][ y0 ][ cIdx ]                                                ae(v)
}
``` transform_skip_flag indicates whether a transform is skipped with respect to an associated block. transform_skip_flag may be a syntax element of a transform skip flag. The associated block may be a coding block (CB) or a transform block (TB). Regarding transformation (and quantization) and residual coding procedures, a CB and a TB may be interchangeably used. For example, as described above, residual samples may be derived for a CB, and (quantized) transform coefficients may be derived through transformation and quantization of the residual samples. Further, information (e.g., syntax elements) efficiently indicating the position, size, sign, and the like of the (quantized) transform coefficients may be generated and signaled through a residual coding procedure. The quantized transform coefficients may be simply referred to as transform coefficients. Generally, when a CB is not larger than a maximum TB, the size of the CB may be the same as the size of the TB, in which case a target block to be subjected to transformation (and quantization) and residual coding may be referred to as a CB or a TB. However, when a CB is greater than a maximum TB, a target block to be subjected to transformation (and quantization) and residual coding may be referred to as a TB. Hereinafter, although syntax elements related to residual coding are described as being signaled by a unit of a transform block (TB), which is for illustration, a TB may be interchangeably used with a coding block (CB).

In an embodiment, the encoding apparatus may encode (x, y) position information on the last non-zero transform coefficient in a transform block based on syntax elements last_sig_coeff_x_prefix, last_sig_coeff_y_prefix, last_sig_coeff_x_suffix, and last_sig_coeff_y_suffix. Specifically, last_sig_coeff_x_prefix indicates a prefix of a column position of the last significant coefficient in a scan order in the transform block, last_sig_coeff_y_prefix indicates a prefix of a row position of the last significant coefficient in the scan order in the transform block, last_sig_coeff_x_suffix indicates a suffix of the column position of the last significant coefficient in the scan order in the transform block, and last_sig_coeff_y_suffix indicates a suffix of the row position of the last significant coefficient in the scan order in the transform block. Here, the significant coefficient may refer to the non-zero coefficient. Further, the scan order may be a right upward diagonal scan order. Alternatively, the scan order may be a horizontal scan order or a vertical scan order. The scan order may be determined based on whether inter/inter prediction is applied to a target block (CB or CB including a TB) and/or a specific intra/inter prediction mode.

Next, the encoding apparatus may partition the transform block into 4×4 subblocks and may then indicate whether a non-zero coefficient exists in a current subblock using a 1-bit syntax element coded_sub_block_flag for each 4×4 subblock.

When the value of coded_sub_block_flag is 0, there is no more information to be transmitted, and thus the encoding apparatus may end an encoding process for the current subblock. However, when the value of coded_sub_block_flag is 1, the encoding apparatus may continue the encoding process for sig_coeff_flag. Since a subblock including the last non-zero coefficient does not require encoding of coded_sub_block_flag and a subblock including DC information on the transform block is highly likely to include a non-zero coefficient, coded_sub_block_flag may be assumed to be 1 without being coded.

When the value of coded_sub_block_flag is 1 and thus it is determined that a non-zero coefficient exists in the current subblock, the encoding apparatus may encode sig_coeff_flag having a binary value according to the inverse scan order.

The encoding apparatus may encode the 1-bit syntax element sig_coeff_flag for each transform coefficient according to the scan order. When the value of a transform coefficient at a current scanning position is not 0, the value of sig_coeff_flag may be 1. Here, in the subblock including the last non-zero coefficient, sig_coeff_flag does not need to be encoded for the last non-zero coefficient, and thus an encoding process for the subblock may be omitted. Level information encoding may be performed only when sig_coeff_flag is 1, and four syntax elements may be used in a level information encoding process. Specifically, each sig_coeff_flag[xC][yC] may indicate whether the level (value) of a transform coefficient at each transform coefficient position (xC, yC) in the current TB is non-zero. In an embodiment, sig_coeff_flag may be an example of a syntax element of a significant coefficient flag indicating whether a quantized transform coefficient is a non-zero significant coefficient.

A level value remaining after encoding of sig_coeff_flag may be derived according to the following equation. That is, a syntax element remAbsLevel indicating a level value to be encoded may be derived according to the following equation.

$$remAbsLevel = |coeff| - 1 \qquad \text{[Equation 1]}$$

Here, coeff denotes an actual transform coefficient value.

Further, abs_level_gt1_flag may indicate whether remAbsLevel' at a scanning position (n) is greater than 1. For example, when the value of abs_level_gt1_flag is 0, the absolute value of a transform coefficient at the position may be 1. When the value of the abs_level_gt1_flag is 1, remAbsLevel indicating the level value to be encoded may be derived according to the following equation.

$$remAbsLevel = remAbsLevel - 1 \qquad \text{[Equation 2]}$$

The value of the least significant coefficient (LSB) of remAbsLevel illustrated in Equation 2 may be encoded through par_level_flag according to in Equation 3.

$$par\_level\_flag = remAbsLevel \,\&1 \qquad \text{[Equation 3]}$$

Here, par_level_flag[n] may indicate the parity of a transform coefficient level (value) at the scanning position n.

The transform coefficient level value remAbsLevel to be encoded after encoding par_leve_flag may be updated according to the following equation.

$$remAbsLevel' = remAbsLevel >> 1 \qquad \text{[Equation 4]}$$

abs_level_gt3_flag may indicate whether remAbsLevel' at the scanning position n is greater than 3. abs_remainder may be encoded only when rem_abs_gt3_flag is 1. A relationship between coeff, which is an actual transform coefficient value, and each syntax element may be expressed by the following equation.

23

$$|coeff| = \text{sig\_coeff\_flag} + \text{abs\_level\_gt1\_flag} + \qquad \text{[Equation 5]}$$
$$\text{par\_level\_flag} + 2 * (\text{abs\_level\_gt3\_flag} + \text{abs\_remainder})$$

The following table shows examples related to Equation 5.

TABLE 2

| |coeff| | sig_coeff_flag | abs_level_gt1_flag | par_level_flag | abs_level_gt3_flag | abs_remainder/ dec_abs_level |
|---|---|---|---|---|---|
| 0 | 0 | | | | |
| 1 | 1 | 0 | | | |
| 2 | 1 | 1 | 0 | | |
| 3 | 1 | 1 | 1 | 0 | |
| 4 | 1 | 1 | 0 | 1 | 0 |
| 5 | 1 | 1 | 1 | 1 | 0 |
| 6 | 1 | 1 | 0 | 1 | 1 |
| 7 | 1 | 1 | 1 | 1 | 1 |
| 8 | 1 | 1 | 0 | 1 | 2 |
| 9 | 1 | 1 | 1 | 1 | 2 |
| 10 | 1 | 1 | 0 | 1 | 3 |
| 11 | 1 | 1 | 1 | 1 | 3 |
| . . . | . . . | . . . | . . . | | |

|coeff| indicates a transform coefficient level (value) and may be expressed as AbsLevel for a transform coefficient. The sign of each coefficient may be encoded using a 1-bit symbol coeff_sign_flag.

dec_abs_level may indicate an intermediate value coded with a Golomb-Rice code at the scanning position n. dec_abs_level may be signaled for a scanning position that satisfies a condition disclosed in Table 2, in which case the absolute value AbsLevel (i.e., |coeff|) of the transform coefficient may be derived as one of 0, dec_abs_level+1, and dec_abs+ depending on a condition.

coeff_sign_flag may indicate the sign of the transform coefficient level at the scanning position n. That is, coeff_sign_flag may indicate the sign of the transform coefficient at the scanning position n.

mts_idx may indicate transform kernels applied to residual samples in the current transform block in a horizontal direction and a vertical direction.

Figure 5:
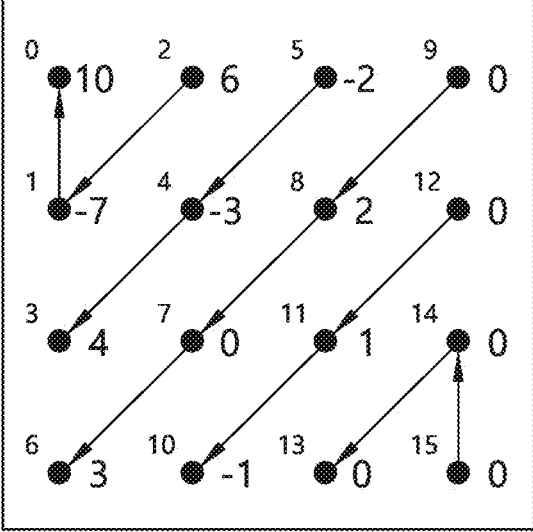
FIG. 5 illustrates an example of transform coefficients in a 4×4 block.

FIG. 5 illustrates an example of transform coefficients in a 4×4 block.

The 4×4 block of FIG. 5 shows an example of quantized coefficients. The block shown in FIG. 5 may be a 4×4 transform block or a 4×4 subblock of an 8×8, 16×16, 32×32, or 64×64 transform block. The 4×4 block of FIG. 5 may represent a luma block or a chroma block.

For example, the result of encoding coefficients scanned in an antidiagonal order of FIG. 5 may be shown in the following table.

24

In Table 3, scan_pos indicates the position of a coefficient according to antidiagonal scanning. scan_pos 15 may be a transform coefficient scanned first, that is, on the bottom-right corner, in the 4×4 block, and scan_pos 0 may be a transform coefficient scanned last, that is, on the top-left corner. In an embodiment, scan_pos may be referred to as a scanning position. For example, scan_pos 0 may be referred to as scanning position 0.

CABAC provides high performance but has poor through-put. This is due to a regular coding engine of CABAC, and regular encoding (i.e., encoding through the regular coding engine of CABAC) exhibits high data dependency because using a probability state and range updated through encoding of a previous bin, and may take a substantial time to read the probability range and to determine a current state. The poor throughput of CABAC may be solved by limiting the number of context-coded bins. For example, as shown in Table 1, the sum of bins used to express sig_coeff_flag, abs_level_gt1_flag, and par_level_flag may be limited to a number according to the size of a corresponding block. Specifically, when the block is a 4×4 block, the sum of bins for sig_coeff_flag, abs_level_gt1_flag, and par_level_flag may be limited to 28, and when the block is a 2×2 block, the sum of bins for sig_coeff_flag, abs_level_gt1_flag, and par_level_flag may be limited to 6. The limited number of bins may be expressed as remBinsPass1. Further, the number of context-coded bins for abs_level_gt3_flag may be limited to a number according to the size of a corresponding block. For example, when the block is a 4×4 block, the number of bins for abs_level_gt3_flag may be limited to 4, and when the block is a 2×2 block, the number of bins for abs_level_gt3_flag may be limited to 2. The limited number of bins for abs_level_gt3_flag may be expressed as remBinsPass2. In this case, when all of the limited number of context-coded bins are used to encode a context element, an encoding apparatus may binarize remaining coefficients

TABLE 3

| | scan_pos | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| coefficients | 0 | 0 | 0 | 0 | 1 | −1 | 0 | 2 | 0 | 3 | −2 | −3 | 4 | 6 | −7 | 10 |
| sig_coeff_flag | 0 | 0 | 0 | 0 | 1 | 1 | 0 | 1 | 0 | 1 | 1 | 1 | 1 | 1 | | |
| abs_level_gt1_flag | | | | | 0 | 0 | | 1 | | 1 | 1 | 1 | 1 | 1 | | |
| par_level_flag | | | | | | | | 0 | | 1 | 0 | 1 | 0 | 0 | | |
| abs_level_gt3_flag | | | | | | | | | | | | | 1 | 1 | | |
| abs_remainder | | | | | | | | | | | | | 0 | 1 | | |
| dec_abs_level | | | | | | | | | | | | | | | 7 | 10 |
| coeff_sign_flag | 0 | 0 | 0 | 0 | 0 | 1 | 0 | 0 | 0 | 0 | 1 | 1 | 0 | 0 | 1 | 0 | through a binarization method for the coefficients, which will be described later, rather than using CABAC and may perform bypass encoding thereon.

As described above, when an input signal is a syntax element rather than a binary value, the encoding apparatus may convert the input signal into a binary value by binarizing the value of the input signal. A decoding apparatus may decode the syntax element to derive a binarized value (i.e., a binarized bin) of the syntax element and may debinarize the binarized value to derive the value of the syntax element. The binarization process may be performed using a truncated Rice (TR) binarization process, a kth order Exp-Golomb (EGk) binarization process, or a fixed-length (FL) binarization process, which will be described later. The debinarization process may be performed based on the TR binarization process, the EGk binarization process, or the FL binarization process, thereby deriving the value of the syntax element.

For example, the TR binarization process may be performed as follows.

Input to the TR binarization process may be a request for TR binarization and cMax and cRiceParam for the syntax element. Output of the TR binarization process may be TR binarization associating a value symbolVal with a corresponding bin string.

Specifically, for example, when there is a suffix bin string for the syntax element, a TR bin string for the syntax element may be a concatenation of a prefix bin string and the suffix bin string, and when there is no suffix bin string, the TR bin string for the syntax element may be the prefix bin string. For example, the prefix bin string may be derived as follows.

The prefix value of symbolVal for the syntax element may be derived according to the following equation.

$$prefixVal = symbolVal >> cRiceParam \qquad \text{[Equation 6]}$$

Here, prefixVal may denote the prefix value of symbolVal. A prefix (i.e., the prefix bin string) of the TR bin string of the syntax element may be derived as follows.

For example, when prefixVal is less than cMax>>cRiceParam, the prefix bin string may be a bit string having a length of prefixVal+1 indexed by binIdx. That is, when prefixVal is less than cMax>>cRiceParam, the prefix bin string may be a bit string of prefixVal+1 bit indicated by binIdx. A bin for binIdx less than prefixVal may be equal to 1. A bin for binIdx equal to prefixVal may be equal to 0.

For example, a bin string derived by unary binarization of prefixVal may be as shown in the following table.

TABLE 4

| prefixVal | Bin string | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| . . . | | | | | | |
| binIdx | 0 | 1 | 2 | 3 | 4 | 5 |

When prefixVal is not less than cMax>>cRiceParam, the prefix bin string may be a bit string having a length of cMax>>cRiceParam and including all bins equal to 1.

When cMax is greater than symbolVal and cRiceParam is greater than 0, a suffix bin string of the TR bin string may exist. For example, the suffix bin string may be derived as follows.

The suffix value of symbolVal for the syntax element may be derived according to the following equation.

$$suffixVal = symbolVal - ((prefixVal) << cRiceParam) \qquad \text{[Equation 7]}$$

Here, suffixVal may denote the suffix value of symbolVal.

A suffix (i.e., the suffix bin string) of the TR bin string may be derived based on an FL binarization process for suffixVal with a cMax value equal to (1<<cRiceParam)−1.

When the value of cRiceParam as an input parameter is 0, the TR binarization may be exactly a truncated unary binarization and may always use a cMax value equal to the largest possible value of the syntax element to be decoded.

Further, for example, the EGk binarization process may be performed as follows. A syntax element coded as ue(v) may be an Exp-Golomb-coded syntax element.

In one example, a 0th order Exp-Golomb (EG0) binarization process may be performed as follows.

A parsing process for the syntax element may start with reading bits starting at a current position in the bitstream and including a first non-zero bit and counting the number of leading bits that are equal to 0. This process may be specified as follows.

TABLE 5 leadingZeroBits = −1
for( b = 0; !b; leadingZeroBits++ )
    b = read_bits( 1 )

A variable codeNum may be derived as follows $$codeNum = 2^{leadingZeroBits} - 1 + read\_bits(leadingZeroBits) \qquad \text{[Equation 8]}$$

Here, a value returned from read_bits(leadingZeroBits), that is, a value indicated by read_bits(leadingZeroBits), may be interpreted as a binary representation of an unsigned integer with a most significant bit written first.

The structure of an Exp-Golomb code in which the bit string is separated into "prefix" and "suffix" bits may be as illustrated in the following table.

TABLE 6

| Bit string form | Range of codeNum |
|---|---|
| 1 | 0 |
| 0 1 $x_0$ | 1 . . . 2 |
| 0 0 1 $x_1$ $x_0$ | 3 . . . 6 |
| 0 0 0 1 $x_2$ $x_1$ $x_0$ | 7 . . . 14 |
| 0 0 0 0 1 $x_3$ $x_2$ $x_1$ $x_0$ | 15 . . . 30 |
| 0 0 0 0 0 1 $x_4$ $x_3$ $x_2$ $x_1$ $x_0$ | 31 . . . 62 |
| . . . | . . . |

A "prefix" bit may be a bit parsed as specified above for computation of leadingZeroBits and may be denoted by 0 or 1 in the bit string in Table 6. That is, a bit string starting with 0 or 1 in Table 6 may denote a prefix bit string. A "suffix" bit may be a bit parsed in computation of codeNum and may be denoted by xi in Table 6. That is, a bit string starting with xi in Table 6 may denote a suffix bit string. Here, i may be a value ranging from 0 to LeadingZeroBits−1. Further, each xi may be equal to 0 or 1.

A bit string allocated to codeNum may be as illustrated in the following table.

TABLE 7

| Bit string | codeNum |
|---|---|
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| . . . | . . . |

When a descriptor of the syntax element is ue(v), that is, when the syntax element is coded as ue(v), the value of the syntax element may be equal to codeNum.

In addition, for example, the EGk binarization process may be performed as follows.

Input to the EGk binarization process may be a request for EGk binarization. Output of the EGk binarization process may be EGk binarization associating a value symbolVal with a corresponding bin string.

The bit string of the EGk binarization process for symbolVal may be derived as follows.

TABLE 8

```
absV = Abs( symbolVal )
stopLoop = 0
do
    if( absV >= ( 1 << k ) ) {
        put( 1 )
        absV = absV − ( 1 << k )
        k++
    } else {
        put( 0 )
        while( k− − )
            put( ( absV >> k ) & 1 )
        stopLoop = 1
    }
while( !stopLoop )
```

Referring to Table 8, a binary value X may be added to the end of the bin string through each call of put(X). Here, X may be equal to 0 or 1.

In addition, for example, the FL binarization process may be performed as follows.

Input to the FL binarization process may be a request for FL binarization and cMax for the syntax element. Output of the FL binarization process may be FL binarization associating a value symbolVal with a corresponding bin string.

FL binarization may be constructed using a bit string having the number of bits corresponding to a fixed length of the symbol value symbolVal. Here, the fixed-length bit may be an unsigned integer bit string. That is, a bit string for the symbol value symbolVal may be derived through FL binarization, and the bit length (i.e., the number of bits) of the bit string may be a fixed length.

For example, the fixed length may be derived as follows.

$$fixedlength = \text{Ceil}(\text{Log2}(cMax + 1)) \qquad \text{[Equation 9]}$$

28

Indexing of bins for FL binarization may be performed using a value increasing from the most significant bit to the least significant bit. For example, a bin index related to the most significant bit may be binIdx=0.

For example, a binarization process for the syntax element abs_remainder of the residual information may be performed as follows.

Inputs to the binarization process for abs_remainder and dec_abs_level may be a request for binarization of a syntax element abs_remainder[n] or a syntax element dec_abs_level[n], a color component cIdx, a luma position (x0, y0), a current coefficient scanning position (xC, yC), log 2TbWidth, which is the binary logarithm of the width of the transform block, and log 2TbHeight, which is the binary logarithm of the height of the transform block. The luma position (x0, y0) may refer to the top-left sample of the current luma transform block relative to the top-left luma sample of the picture.

Output of the binarization process for abs_remainder (or dec_abs_level) may be binarization of abs_remainder (or the dec_abs_level) (i.e., a binarized bin string of abs_remainder (or dec_abs_level)). Available bin strings for abs_remainder (or dec_abs_level) may be derived through the binarization process.

cRiceParam, a Rice parameter for abs_remainder (or dec_abs_level), may be derived by a Rice parameter derivation process performed with the color component cIdx, the luma position (x0, y0), the current coefficient scanning position (xC, yC), and log 2TbHeight, which is the binary logarithm of the height of the transform block as inputs. A detailed description of the Rice parameter derivation process will be described later.

For example, cMax for abs_remainder (or dec_abs_level) may be derived based on the Rice parameter cRiceParam. cMax may be derived as follows.

$$cMax = (cRiceParam == 1 ? 6 : 7) << cRiceParam \qquad \text{[Equation 10]}$$

Referring to Equation 10, when the value of cRiceParam is 1, cMax may be derived as 6<<cRiceParam, and when the value of cRiceParam is not 1, cMax may be derived as 7<<cRiceParam.

The binarization of abs_remainder (or dec_abs_level), that is, the bin string of the abs_remainder (or dec_abs_level), may be a concatenation of a prefix bin string and a suffix bin string when the suffix bin string is present. When there is no suffix bin string, the bin string of abs_remainder (or dec_abs_level) may be the prefix bin string.

For example, the prefix bin string may be derived as follows.

The prefix value of abs_remainder, prefixVal, may be derived as follows.

$$prefixVal = \text{Min}(cMax, abs\_remainder[n]) \qquad \text{[Equation 11]}$$

The prefix of the bin string of abs_remainder (i.e., the prefix bin string) may be derived through a TR binarization process for prefixVal with cMax and cRiceParam as inputs.

When the prefix bin string is equal to a bit string including all bits equal to 1 and having a bit length of 4, a suffix bin string of the bin string of abs_remainder may exist and may be derived as follows.

The suffix value of abs_remainder, suffixVal, may be derived as follows.

$$suffixVal = abs\_remainder[n]cMax \qquad \text{[Equation 12]}$$

The suffix bin string of the bin string of abs_remainder may be derived through an EGk binarization process for suffixVal with k set to cRiceParam+1.

The foregoing Rice parameter derivation process may be as follows.

Inputs to the Rice parameter derivation process may be the color component index cIdx, the luma position (x0, y0), the current coefficient scanning position (xC, yC), the binary logarithm of the width of the transform block, which is log 2TbWidth, and the binary logarithm of the height of the transform block, which is log 2TbHeight. The luma position (x0, y0) may refer to the top-left sample of the current luma transform block relative to the top-left luma sample of the picture. Output of the Rice parameter derivation process may be the rice parameter, cRiceParam.

For example, given the syntax elements sig_coeff_flag[x][y] and array AbsLevel[x][C] for the transform block with the component index cIdx and the top-left luma position (x0, y0), a variable locSumAbs may be derived as a pseudo code specified in the following table.

TABLE 9

```
locSumAbs = 0
if( xC < (1 << log2TbWidth) − 1 ) {
    locSumAbs += AbsLevel[ xC + 1 ][ yC ] − sig_coeff_flag[ xC + 1 ][ yC ]
    if( xC < (1 << log2TbWidth) − 2 )
        locSumAbs += AbsLevel[ xC + 2 ][ yC ] − sig_coeff_flag[ xC + 2 ][ yC ]
    if( yC < (1 << log2TbHeight) − 1 )
        locSumAbs += AbsLevel[ xC + 1 ][ yC + 1] − sig_coeff_flag[ xC + 1 ][ yC + 1 ]
}
if( yC < (1 << log2TbHeight) − 1 ) {
    locSumAbs += AbsLevel[ xC ][ yC + 1 ] − sig_coeff_flag[ xC ][ yC + 1 ]
    if( yC < (1 << log2TbHeight) − 2 )
        locSumAbsPass1 += AbsLevelPass1 [ xC ][ yC + 2 ] − sig_coeff_flag[ xC ][ yC + 2 ]
}
```

The Rice parameter, cRiceParam, may be derived as follows.

For example, when locSumAbs is less than 12, cRiceParam may be set to 0. Otherwise, when locSumAbs is less than 25 (i.e., when locSumAbs is equal to or greater than 12 and is less than 25), cRiceParam may be set to 1. Otherwise, (i.e., when locSumAbs is equal to or greater than 25), cRiceParam may be set to 2.

Unlike the foregoing embodiment of transmitting the syntax elements, a method of signaling tu_mts_idx may be proposed.

Specifically, the proposed method of signaling tu_mts_idx may be compared with an existing method of signaling tu_mts_idx according to VVC Draft 3 as follows.

TABLE 10

| WC Draft 3 | Proposed |
|---|---|
| transform_unit( ) | transform_unit( ) |
|   tu_cbf_luma |   tu_cbf_luma |
| ... | |
|   if( ... tu_cbf_luma && |   if( ... tu_cbf_luma && |
|     ( tbWidth <= 32 ) && |     ( tbWidth <= 32 ) && |
|     ( tbHeight <= 32 ) ... ) |     ( tbHeight <= 32 ) ... ) |
|     tu_mts_flag |     tu_mts_idx |
| residual_coding( cIdx ) | |

TABLE 10-continued

| WC Draft 3 | Proposed |
|---|---|
| | if( ( cIdx ! = 0 ǁ !tu_mts_flag ) && |
| |   ( log2TbWidth <= 2 ) && |
| |   ( log2TbHeight <= 2 ) ) |
| |   transform_skip_flag[ cIdx ] |
| | ... /* coefficient parsing */ ... |
| | if( tu_mts_flag && cIdx = = 0 ) |
| |   mts_idx |

As illustrated in Table 10, according to the existing method, an MTS flag for the current block may be parsed, followed by parsing a transform skip flag and then coding an MTS index. Here, the MTS index may be coded by fixed-length binarization, and a fixed bit length for the MTS index may be 2.

However, according to the proposed method, the MTS index may be coded without separately parsing the transform skip flag and the MTS flag, and truncated unary binarization may be used for coding the MTS index. Here, the MTS index may indicate whether a transform is applied to residual information on the current block and may indicate whether the MTS is applied. That is, the proposed method may propose signaling the transform skip flag, the MTS flag, and the MTS index as one syntax element. In the proposed method, a first bin of the MTS index may indicate whether the transform is applied to the residual information on the current block, and a second bin of the MTS index may indicate whether the MTS is applied and an applied transform kernel.

Semantics and a binarization value indicated by the value of the MTS index in the proposed method may be as illustrated in the following table.

TABLE 11

| | | | binarization | | |
|---|---|---|---|---|---|
| | transform type | | MTS & TS | MTS | TS |
| tu_mts_idx | horizontal | vertical | enabled | enabled | enabled |
| 0 | DCT-II | DCT-II | 0 | 0 | 0 |
| 1 | SKIP | SKIP | 10 | — | 1 |
| 2 | DST-VII | DST-VII | 110 | 10 | — |
| 3 | DCT-VIII | DST-VII | 1110 | 110 | — |
| 4 | DST-VII | DCT-VIII | 11110 | 1110 | — |
| 5 | DCT-VIII | DCT-VIII | 11111 | 1111 | — |

For example, when the value of the MTS index is 0, the MTS index may indicate that a transform is applied to the current block, that no MTS is applied, and that a horizontal transform kernel type and a vertical transform kernel type are DCT-2. When the value of the MTS index is 1, the MTS index may indicate that no transform is applied to the current block (i.e., may also indicate that no MTS is applied and may not indicate a transform kernel type). When the value of the MTS index is 2, the MTS index may indicate that a transform and an MTS are applied to the current block and that a horizontal transform kernel type and a vertical transform kernel type are DST-7. When the value of the MTS index is 3, the MTS index may indicate that a transform and an MTS are applied to the current block and that a horizontal transform kernel type is DCT-8 and a vertical transform kernel type is DST-7. When the value of the MTS index is 4, the MTS index may indicate that a transform and an MTS are applied to the current block and that a horizontal transform kernel type is DST-7 and a vertical transform kernel type is DCT-8. When the value of the MTS index is 5, the MTS index may indicate that a transform and an MTS are applied to the current block and that a horizontal transform kernel type and a vertical transform kernel type are DCT-8.

In an alternative example, semantics and a binarization value indicated by the value of the MTS index may be as illustrated in the following table.

TABLE 12

| | | | binarization | | |
|---|---|---|---|---|---|
| | transform type | | MTS & TS | MTS | TS |
| tu_mts_idx | horizontal | vertical | enabled | enabled | enabled |
| 0 | SKIP | SKIP | 0 | — | 0 |
| 1 | DCT-II | DCT-II | 10 | 0 | 1 |
| 2 | DST-VII | DST-VII | 110 | 10 | — |
| 3 | OCT-VIII | DST-VII | 1110 | 110 | — |
| 4 | DST-VII | OCT-VIII | 11110 | 1110 | — |
| 5 | OCT-VIII | OCT-VIII | 11111 | 1111 | — |

For example, when the value of the MTS index is 0, the MTS index may indicate that no transform is applied to the current block (i.e., may also indicate that no MTS is applied and may not indicate a transform kernel type). When the value of the MTS index is 1, the MTS index may indicate that a transform is applied to the current block, that no MTS is applied thereto, and that a horizontal transform kernel type and a vertical transform kernel type are DCT-2. When the value of the MTS index is 2, the MTS index may indicate that a transform and a MTS are applied to the current block and that a horizontal transform kernel type and a vertical transform kernel type are DST-7. When the value of the MTS index is 3, the MTS index may indicate that a transform and a MTS are applied to the current block and that a horizontal transform kernel type is DCT-8 and a vertical transform kernel type is DST-7. When the value of the MTS index is 4, the MTS index may indicate that a transform and a MTS are applied to the current block and that a horizontal transform kernel type is DST-7, and a vertical transform kernel type is DCT-8. When the value of the MTS index is 5, the MTS index may indicate that a transform and a MTS are applied to the current block and that a horizontal transform kernel type and a vertical transform kernel type are DCT-8.

The number of context models may not be changed, and a method for designating a context index increment, ctxInc, for each bin of tu_mts_idx may be as illustrated in the following table.

TABLE 13

| Syntax | binIdx | | | | | |
|---|---|---|---|---|---|---|
| element | 0 | 1 | 2 | 3 | 4 | >=5 |
| tu_mts_idx (MTS & TS) | 0 | 1 . . . 6 (1 + cqtDepth) | 7 | 8 | 9 | na |
| tu_mts_idx (MTS) | 1 . . . 6 (1 + cqtDepth) | 7 | 8 | 9 | na | na |
| tu_mts_idx (TS) | 0 | na | na | na | na | na |

Further, the present disclosure proposes a method of modifying the following details in the existing residual coding method in order to adapt the statistics and signal characteristics of a transform skip level, which represents a quantized prediction residual (i.e., a residual in a spatial domain), to residual coding.

No last non-zero transform coefficient position: Since a residual signal (i.e., a residual sample) reflects a spatial residual after prediction and no energy compaction by a transform is performed for a transform skip, a high probability for a trailing zero or an insignificant level at the bottom right corner of a transform block may not occur anymore. Thus, in this case, signaling information on the scanning position of the last non-zero transform coefficient may be omitted. Instead, a first subblock to be coded first may be the bottom-right subblock in the transform block. The non-zero transform coefficient may also be referred to as a significant coefficient.

Subblock CBF: The absence of signaling of the information on the scanning position of the last non-zero transform coefficient requires application of a transform skip and modification of CBF signaling of a subblock with coded_sub_block_flag as follows.

Due to quantization, the aforementioned sequence of the insignificant level may still occur locally inside a transform block. Thus, the information on the scanning position of the last non-zero transform coefficient may be removed as described above, and coded_sub_block_flag may be coded for all subblocks.

coded_sub_block_flag for a subblock (top-left subblock) covering a DC frequency position may denote a special case. For example, in VVC Draft 3, coded_sub_block_flag for the top-left subblock may always be inferred to be equal to 1 without being signaled. When the scanning position of the last non-zero transform coefficient corresponds to the position of a subblock other than the top-left subblock, it may be indicated that there is at least one significant level outside the DC subblock (i.e., the top-left subblock). Consequently, the DC subblock may include only a zero/non-significant level although coded_sub_block_flag for the DC subblock is inferred to be equal to 1. As described above, when the transform skip is applied to the current block and there is no information on the scanning position of the last non-zero transform coefficient, coded_sub_block_flag for each subblock may be signaled. Here, the coded_sub_block_flag for the DC subblock may also be included except when coded_sub_block_flag for all subblocks other than the DC subblock is already equal to 0. In this case, coded_sub_block_flag for the DC subblock may be inferred to be equal to 1 (inferDcSbCbf=1). Since there needs to be at least one significant level in the DC subblock, when all sig_coeff_flag other than sig_coeff_flag for a first position of (0, 0) in the DC subblock is equal to 0, sig_coeff_flag for the first position of (0,0) may be inferred to be equal to 1, without being signaled (inferSbDcSigCoeffFlag=1).

Context modeling for coded_sub_block_flag may be changed. For example, a context model index may be calculated using the sum of coded_sub_block_flag of a right subblock of the current subblock and coded_sub_block_flag of a bottom subblock of the current subblock and a logical disjunction thereof.

sig_coeff_flag context modeling: A local template in sig_coeff_flag context modeling may be modified to include only a right position (NB0) and a lower position (NB1) of the current scanning position. A context model offset may be derived as the number of sig_coeff_flag[NB0]+sig_coeff_flag[NB1] of significant neighboring positions. Therefore, a selection of different context sets depending on a diagonal d of the current transform block may be removed. As a result, three context models and a single context model may be configured to code sig_coeff_flag flag.

abs_level_gt1_flag and par_level_flag context modeling: A single context model may be employed for abs_level_gt1_flag and par_level_flag.

abs_remainder coding: Although the empirical distribution of transform skip residual absolute levels still fits a Laplacian or geometrical distribution, instationarities greater than transform coefficient absolute levels may exist. Particularly, variance within a window of consecutive realization may be higher for residual absolute levels. Accordingly, the binarization of abs_remainder and context modeling may be modified as follows.

For example, a higher cutoff value may be used in the binarization of abs_remainder. Accordingly, a transition point from coding using sig_coeff_flag, abs_level_gt1_flag, par_level_flag, and abs_level_gt3_flag to a Rice code for abs_remainder and a dedicated context model for each bin position may yield higher compression efficiency. Increasing the cutoff may result in more "greater than X" flags (e.g., abs_level_gt5_flag, abs_level_gt7_flag, or the like) until a cutoff is reached. The cutoff may be fixed to 5 (numGt-Flags=5).

A template for deriving a Rice parameter may be modified. That is, only a right neighboring position and a bottom neighboring position of the current scanning position may be considered as the local template for sig_coeff_flag context modeling.

coeff_sign_flag context modeling: Due to instationarities inside a sequence of signs and a prediction residual being often biased, sign-related information may be coded using a context model even when the global empirical distribution is almost uniformly distributed. A single-dedicated context model may be used for coding the sign-related information, and the sign-related information may be parsed after sig_coeff_flag and may be maintained along with all context-coded bins.

Reduction of context-coded bins: Transmission of syntax elements, i.e., sig_coeff_flag, abs_level_gt1_flag and par_level_flag, for a first scanning pass may be unchanged. However, a limitation on the specific number of context-coded bins per sample (CCBs) may be removed and may be adjusted differently. A reduction of CCBs may be derived by specifying a mode with CCB>k as invalid. Here, k may be a positive integer. For example, in a regular level coding mode, k=2. The foregoing limitation may correspond to a reduction of a quantization space.

Syntax elements related to residual data coded by applying the foregoing modifications may be as illustrated in the following table.

TABLE 14

| | Descriptor |
|---|---|
| residual_ts_coding( x0, y0, log2TbWidth, log2TbHeight, cIdx ) { | |
|   log2SbSize = ( Min( log2TbWidth, log2TbHeight ) < 2 ? 1 : 2 ) | |
|   numSbCoeff = 1 << ( log2SbSize << 1 ) | |
|   lastSubBlock = ( 1 << ( log2TbWidth + log2TbHeight − 2 * log2SbSize ) ) − 1 | |
|   /* Loop over subblocks from last to the top-left (DC) subblock */ | |
|   inferDcSbCbf = 1 | |
|   for( i = lastSubBlock; i >= 0; i− − ) { | |
|     xS = | |
|   DiagScanOrder[ log2TbWidth − log2SbSize ][ log2TbHeight − log2SbSize ][ lastSubBlock ][ 0 ] | |
|     yS = | |
|   DiagScanOrder[ log2TbWidth − log2SbSize ][ log2TbHeight − log2SbSize ][ lastSubBlock ][ 1 ] | |
|     if( ( i > 0 || !inferDcSbCbf ) | |
|       coded_sub_block_flag[ xS ][ yS ] | ae(v) |
|     if( coded_sub_block_flag[ xS ][ yS ] && i > 0 ) | |
|       inferDcSbCbf = 0 | |
|     } | |
|   /* First scan pass */ | |
|   inferSbDcSigCoeffFlag = 1 | |
|   for( n = ( i = = numSbCoeff − 1; n >= 0; n− − ) { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |
|     if( coded_sub_block_flag[ xS ][ yS ] && ( n > 0 || !inferSbDcSigCoeffFlag ) ) { | |
|       sig_coeff_flag[ xC ][ yC ] | ae(v) |
|       if( sig_coeff_flag[ xC ][ yC ] ) | |
|         inferSbDcSigCoeffFlag = 0 | |
|     } | |
|     if( sig_coeff_flag[ xC ][ yC ] ) { | |
|       coeff_sign_flag[ n ] | ae(v) |
|       abs_level_gt1_flag[ n ][ 0 ] | ae(v) |
|       if( abs_level_gtX_flag[ n ][ 0 ] ) | |
|         par_level_flag[ n ] | ae(v) |
|     } | |
|     AbsLevelPassX[ xC ][ yC ] = | |
|       sig_coeff_flag[ xC ][ yC ] + par_level_flag[ n ] + abs_level_gtX_flag[ n ][ 0 ] | |
|   } | |

TABLE 14-continued

|  | Descriptor |
|---|---|

```
/* Greater than X scan passes (numGtXFlags=5) */
  for( i = 1; i <= numGtXFlags − 1 && abs_level_gtX_flag[ n ][ i − 1 ] ; i++ ) {
    for( n = numSbCoeff − 1; n >= 0; n− − ) {
      xC = ( xS << log2SbSize ) + DiagScanOrder[ log2SbSize ][ log2SbSize ][ n ][ 0 ]
      yC = ( yS << log2SbSize ) + DiagScanOrder[ log2SbSize ][ log2SbSize ][ n ][ 1 ]
      abs_level_gtX_flag[ n ][ i ]                                                      ae(v)
      AbsLevelPassX[ xC ][ yC ] + = 2 * abs_level_gtX_flag[ n ][ i ]
    }
  }
/* remainder scan pass */
  for( n = numSbCoeff − 1; n >= 0; n− − ) {
    xC = ( xS << log2SbSize ) + DiagScanOrder[ log2SbSize ][ log2SbSize ][ n ][ 0 ]
    yC = ( yS << log2SbSize ) + DiagScanOrder[ log2SbSize ][ log2SbSize ][ n ][ 1 ]
    if( abs_level_gtX_flag[ n ][ numGtXFlags − 1 ] )
      abs_remainder[ n ]                                                                ae(v)
    TransCoeffLevel[ x0 ][ y0 ][ cIdx ][ xC ][ yC ] = ( 1 − 2 * coeff_sign_flag[ n ] ) *
                      ( AbsLevelPassX[ xC ][ yC ] + abs_remainder[ n ] )
    }
  }
}
```

As illustrated in Table 1, according to the VVC standard, before encoding/decoding a residual signal (i.e., residual information), whether a transform is applied to a corresponding block may be transmitted first. That is, before residual information on a current block is parsed, a transform skip flag (i.e., transform-skip-flag) indicating whether a transform is applied may be parsed first. The transform skip flag may be referred to as a transform flag or a transform application flag.

Data is compacted by expressing a correlation between residual signals in a transformation domain and is transmitted to the decoding apparatus. However, when there is a low correlation between residual signals, data compaction may not be sufficiently achieved. In this case, a residual signal in a pixel domain (spatial domain) may be transmitted to the decoding apparatus while omitting a transform process entailing a complicated calculation process. Since the residual signal in the pixel domain, to which no transform is applied, has different characteristics (e.g., the distribution of residual signals, the absolute level of each residual signal, and the like) from a residual signal in a general transform domain, a residual signal encoding/decoding for efficiently transmitting the foregoing signal to a decoder is proposed.

Figure 6:
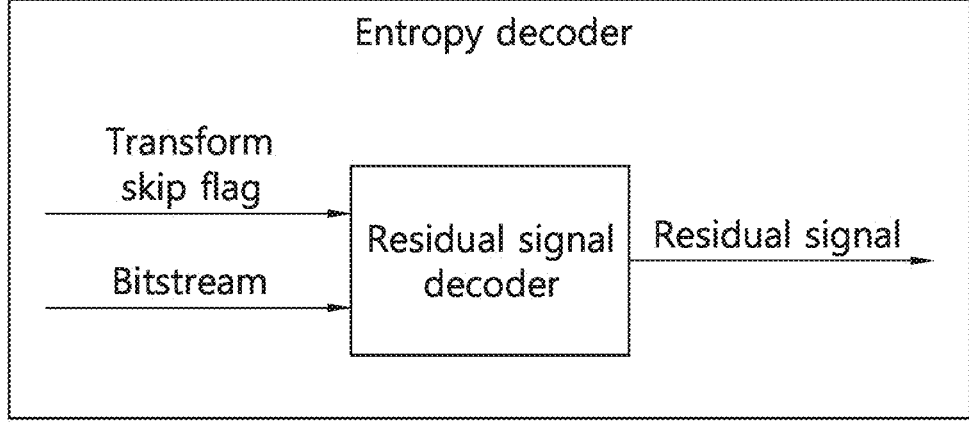
FIG. 6 illustrates a decoding apparatus for performing a proposed method for transmitting a residual signal in a pixel domain.

FIG. 6 illustrates a decoding apparatus for performing a proposed method for transmitting a residual signal in a pixel domain.

A transform skip flag may be transmitted by a unit of a transform block. Referring to Table 1 illustrated above, the transform skip flag may be parsed with respect to a limited specific block size. That is, referring to Table 1, the transform skip flag may be parsed only for a transform block having a block size equal to or less than a specific size. For example, when the size of a current transform block is a 4×4 size or less, the transform skip flag for the current transform block may be parsed.

In one example, the present disclosure proposes an embodiment of configuring various block sizes for determining whether to parse a transform skip flag. Specifically, Log 2TbWidth and log 2TbHeight may be determined on variables wN and hN, and according to an existing scheme, the wN and hN may be selected from one of the following.

wN={2, 3, 4, 5, 6}
  hN={2, 3, 4, 5, 6}

That is, wN may be one selected from among 2, 3, 4, 5, and 6, and hN may be one selected from among 2, 3, 4, 5, and 6.

A method of parsing a transform skip flag according to the present embodiment may be expressed as shown in the following table.

TABLE 15

```
if( transform_skip_enabled_flag &&
  ( cIdx ! = 0 || cu_mts_flag[ x0 ][ y0 ] = = 0 ) &&
    ( log2TbWidth <= wN ) && ( log2TbHeight <= hN ) )
    transform_skip_flag[ x0 ][ y0 ][ cIdx ]              ae(v)
```

According to the present embodiment disclosed in Table 15, when log 2TbWidth denoting the width of a current block (i.e., a current transform block) is wN or less and log 2TbHeight denoting the height of the current block is hN or less, a transform skip flag for the current block may be parsed. A method of decoding a residual signal of the current block may be determined based on the transform skip flag. According to the proposed embodiment, signals having different statistical characteristics may be efficiently processed, thereby reducing the complexity of an entropy decoding process and improving encoding efficiency.

Alternatively, referring to Table 1, an embodiment in which the transform skip flag is parsed with respect to a limited specific block size but a condition for determining whether to parse the transform skip flag is defined as the number of samples of the block rather than the width and height of the block may be proposed. That is, for example, a method of using the product of log 2TbWidth and log 2TbHeight as a condition for determining whether to parse the syntax element transform_skip_flag of the transform skip flag may be proposed.

log 2TbWidth and log 2TbHeight may be selected from among the following.

log 2TbWidth={1, 2, 3, 4, 5, 6}
  log 2TbHeight={1, 2, 3, 4, 5, 6}

That is, log 2TbWidth may be one selected from among 1, 2, 3, 4, 5, and 6, and log 2TbHeight may be one selected from among 1, 2, 3, 4, 5, and 6.

Figure 7A:
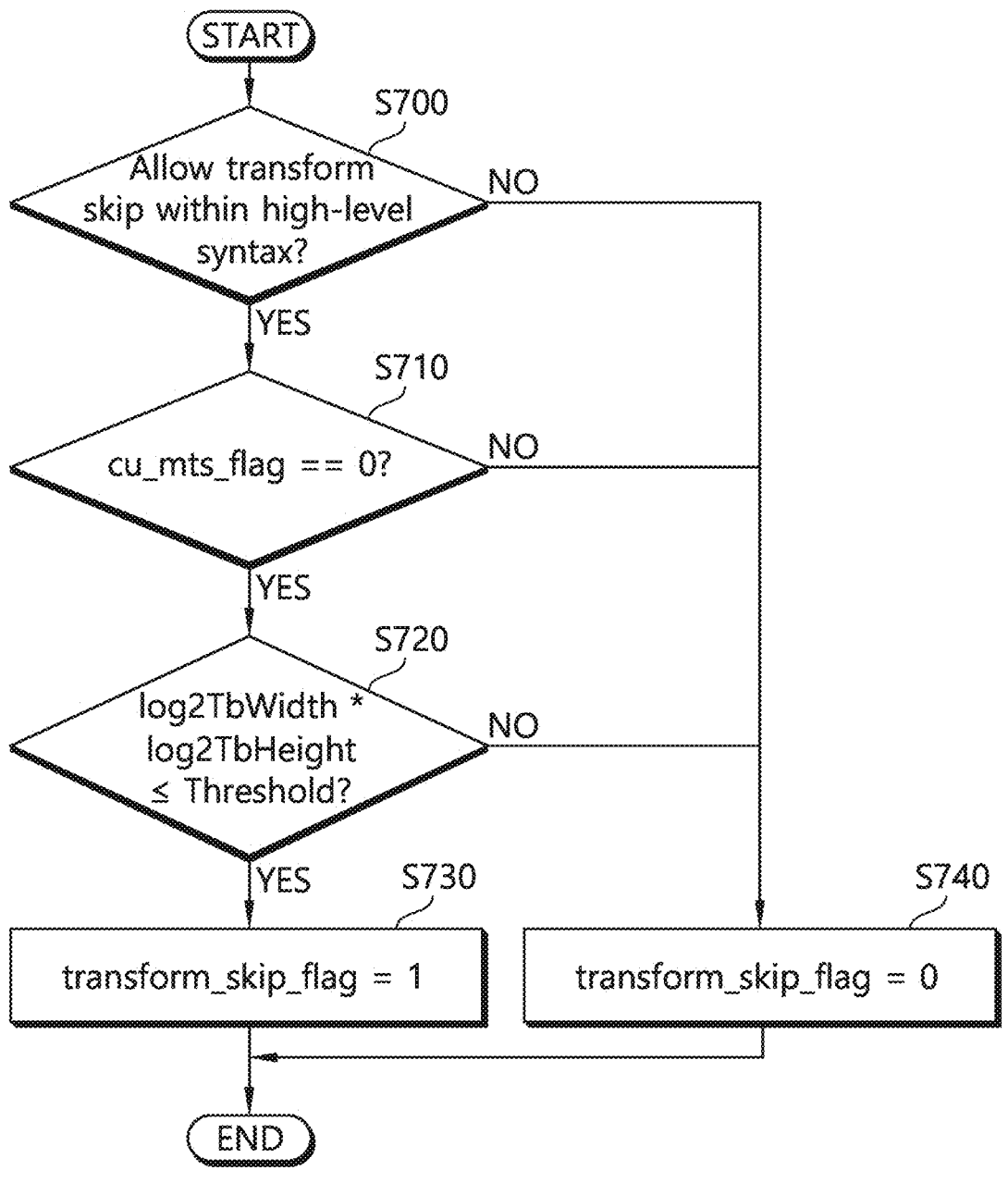
FIG. 7A and FIG. 7B illustrate an embodiment of determining whether to parse a transform skip flag based on the number of samples of a current block and a decoding apparatus performing the embodiment.
Figure 7B:
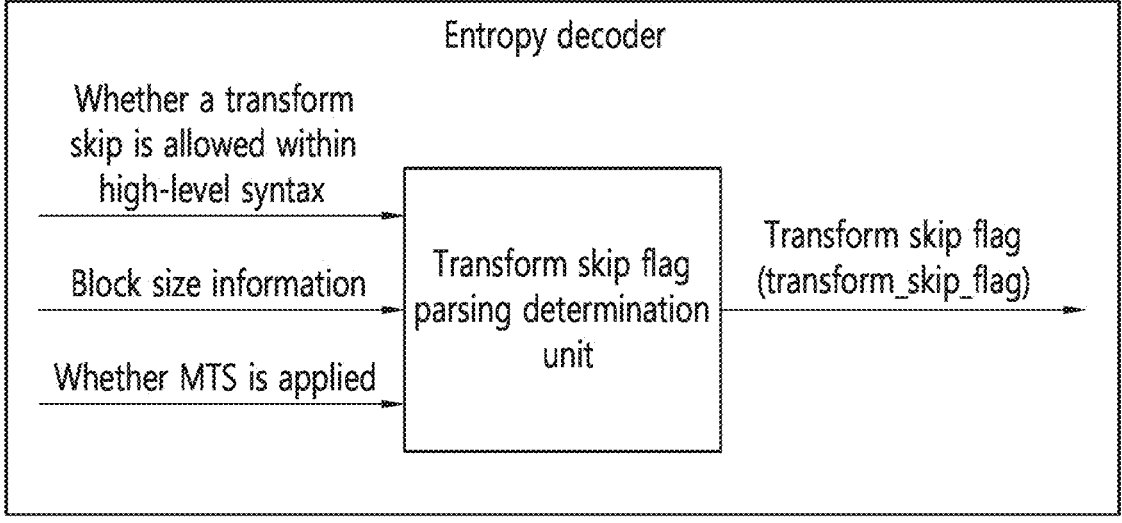

FIG. 7A and FIG. 7B illustrate an embodiment of determining whether to parse a transform skip flag based on the number of samples of a current block and a decoding apparatus performing the embodiment.

Referring to FIG. 7A, the decoding apparatus may determine whether it is allowed to determine whether to skip transformation of a current block per in a high-level syntax (S700). When it is allowed to determine whether to skip the transformation of the current block in the high-level syntax, the decoding apparatus may determine whether the value of a syntax element cu_mts_flag is 0 (S710).

When the value of cu_mts_flag is 0, the decoding apparatus may determine whether the product of log 2TbWidth and log 2TbHeight of the current block is a threshold or less (S720). That is, the decoding apparatus may determine whether the number of samples of the current block is the threshold or less.

When the product of log 2TbWidth and log 2TbHeight is the threshold or less, the decoding apparatus may parse the value of a syntax element transform_skip_flag of a transform skip flag as 1 (S730).

When the conditions of S700 to S720 are not satisfied, the decoding apparatus may derive the value of the syntax element transform_skip_flag of the transform skip flag as 0 (S740).

FIG. 7B illustrates the decoding apparatus performing an embodiment of determining whether to transform a block using the number of samples in the block. Referring to FIG. 7B, the decoding apparatus may determine whether to parse a transform skip flag for the block based on whether a transform skip is allowed in a high-level syntax, block size information, and whether an MTS is applied.

When determining whether to perform a transform based on the number of samples in a block, blocks having various shapes may be included as non-transform blocks compared to controlling whether to perform a transform based on the width and the height of a block. For example, when both log 2TbWidth and log 2TbHeight are defined as 2 in the foregoing embodiment of controlling whether to perform a transform using the width and height of the block, only a 2×4 block, a 4×2 block, and a 4×4 block may be included as non-transform blocks. However, when whether to perform a transform is controlled based on the number of samples, a 2×8 block and an 8×2 block may also be included as non-transform blocks.

A method of decoding a residual signal may be determined based on the transform skip flag. According to the proposed embodiment, signals having different statistical characteristics may be efficiently processed, thereby reducing the complexity of an entropy decoding process and improving encoding efficiency For example, an embodiment of encoding/decoding a residual signal for a current block in view of statistical characteristics in a case where no transform is applied to the residual signal may be proposed as follows.

Generally, a transform block that is transformed and quantized (i.e., transform coefficients that are transformed and quantized) has energy concentrated to a top-left portion of the transform block by the transformation and decreases in energy level toward the bottom right portion (high-frequency region) by the quantization. In view of these characteristics, a diagonal scanning technique is introduced as shown in FIG. 5 for efficient residual encoding. However, in a transform skip block, that is, a transform block including residual coefficients to which no transform is applied, energy may be evenly distributed throughout the block rather than being concentrated to the top-left portion and also has a random level. Therefore, it may be inefficient to use the diagonal scanning technique for encoding. Accordingly, the present embodiment proposes a residual scanning method suitable for the characteristics of the transform skip block. Here, the residual coefficients may refer to transform coefficients.

According to another characteristic of the transform skip block, when a prediction mode applied to the transform skip block to be currently encoded is an intra prediction mode, the size of a residual sample increases to the bottom right portion in which the distance between a prediction sample and a reference sample is large. In view of this characteristic, the present embodiment proposes a method in which residual signals are rearranged and encoded such that scanning can be performed from the top left portion of the transform block and a decoding apparatus parses the residual signals and rearranges the residual signals back to the original positions thereof. That is, the present embodiment proposes a method in which residual signals are rearranged and encoded such that a residual signal having a large size can be scanned from the top left portion of the transform block and a decoding apparatus parses the residual signals and rearranges the residual signals back to the original positions thereof. As a similar method, a method of defining a new scanning method in a process of encoding and decoding a residual signal may be considered. However, the residual rearrangement method proposed in the present embodiment makes it possible to use an existing residual encoding module without modification.

When rearranging residuals while maintaining the existing residual encoding module, a scan order from the top-left region to the bottom-right region needs to be defined.

As one illustrative rearrangement method, a method of rotating a current block by 180 degrees may be defined.

Figure 8:
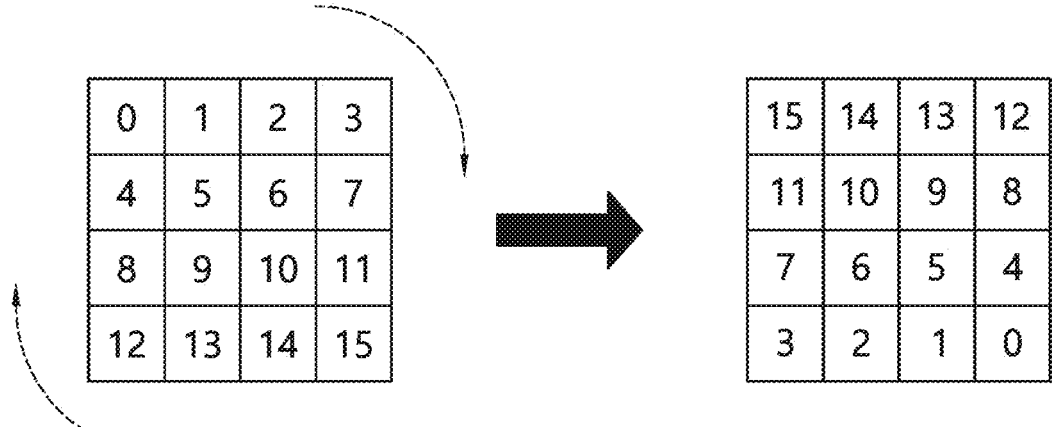
FIG. 8 illustrates residual coefficients of a current block to which a rearrangement method of 180-degree rotation is applied.

FIG. 8 illustrates residual coefficients of a current block to which a rearrangement method of 180-degree rotation is applied.

Numbers in the current block illustrated in FIG. 8 denote pixel positions in the block in a raster scan order. Referring to FIG. 8, a residual coefficient at the top-left position may be rearranged at the bottom-right position, which is a 180-degree-rotated position. Referring to FIG. 8, the residual coefficients may be rearranged at positions symmetrical with respect to the center of the transform block through the rearrangement method of 180-degree rotation. After the rearrangement, a general residual coefficient scan order is applied, and due to the rearrangement, the residual coefficient at the bottom-left position may be considered first and a residual coefficient at the top-left position may be scanned later.

As another illustrative rearrangement method, a method of mirroring a current block may be defined. Mirroring may be classified into antidiagonal mirroring and main diagonal mirroring depending on a mirroring direction.

FIG. 9 illustrates residual coefficients of a current block to which a rearrangement method of mirroring is applied. (a) of FIG. 9 illustrates an example of rearranging the residual coefficients of the current block by antidiagonal mirroring, and (b) of FIG. 9 illustrates an example of rearranging the residual coefficients of the current block by main diagonal mirroring.

Referring to (a) of FIG. 9, the residual coefficients may be rearranged at positions symmetrical with respect to a right upward diagonal of the current block through a rearrangement process using antidiagonal mirroring. Here, the right upward diagonal may refer to a diagonal in a right upward direction passing through the center of the current block. For example, a residual coefficient at the top-left position may be rearranged at an antidiagonally mirrored position, which is the bottom-right position. Further, for example, residual coefficient 1 (i.e., a residual coefficient neighboring on the right of the residual coefficient at the top-left position) may be rearranged at an antidiagonally mirrored position, which is a position that is above the bottom-right position. That is, when the width and height of the current block are 4, and the top-left sample position of the current block has an x component of 0 and a y component of 0, a residual coefficient at a position (1, 0) may be rearranged at an antidiagonally mirrored position, which is a position (3, 3).

Referring to (b) of FIG. 9, the residual coefficients may be rearranged at positions symmetrical with respect to a left upward diagonal of the current block through a rearrangement process using main diagonal mirroring. Here, the left upward diagonal may refer to a diagonal in a left upward direction passing through the center of the current block. For example, a residual coefficient at the top-right position may be rearranged at a main-diagonally mirrored position, which is the bottom-left position. Further, for example, residual coefficient 1 (i.e., a residual coefficient neighboring on the right of the residual coefficient at the top-left position) may be rearranged at a main-diagonally mirrored position, which is a position that is below the top-left position. That is, when the width and height of the current block are 4, and the top-left sample position of the current block has an x component of 0 and a y component of 0, a residual coefficient at a position (1, 0) may be rearranged at an main-diagonally mirrored position, which is a position (0, 1).

Alternatively, as another illustrative rearrangement method, a method of flipping a current block may be defined. Flipping may be classified into vertical flipping and horizontal flipping according to a dereference axis.

Figure 10:
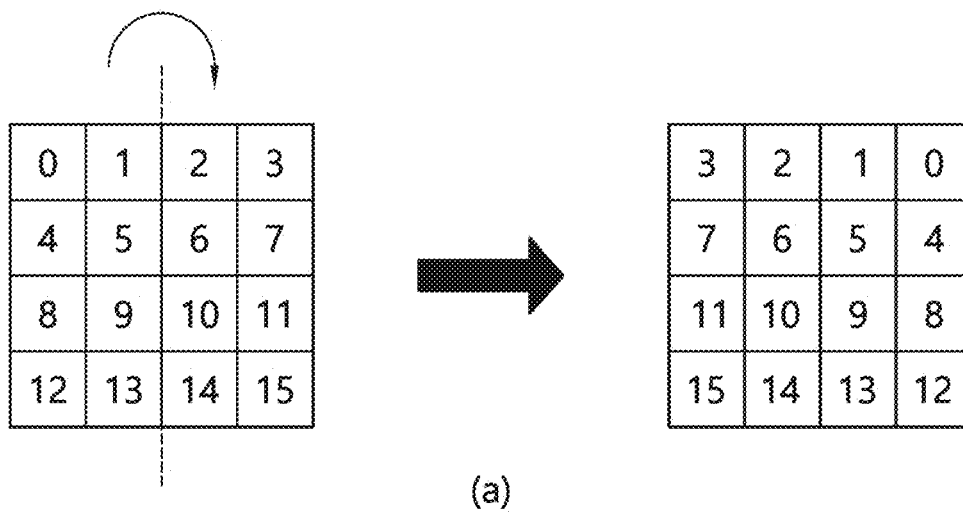
FIG. 10 illustrates residual coefficients of a current block to which a rearrangement method of flipping is applied.

FIG. 10 illustrates residual coefficients of a current block to which a rearrangement method of flipping is applied. (a) of FIG. 10 illustrates an example of rearranging the residual coefficients of the current block by vertical flipping, and (b) of FIG. 10 illustrates an example of rearranging the residual coefficients of the current block by horizontal flipping.

Referring to (a) of FIG. 10, the residual coefficients may be rearranged at positions symmetrical with respect to a vertical axis of the current block through a rearrangement process using vertical flipping. Here, the vertical axis may refer to a vertical line passing through the center of the current block. For example, a residual coefficient at the top-left position may be rearranged at a vertically flipped position, which is the top-right position. Further, for example, residual coefficient 1 (i.e., a residual coefficient neighboring on the right of the residual coefficient at the top-left position) may be rearranged at a vertically flipped position, which is a position neighboring on the left of the top-right position. That is, when the width and height of the current block are 4, and the top-left sample position of the current block has an x component of 0 and a y component of 0, a residual coefficient at a position (1, 0) may be rearranged at a vertically flipped position, which is a position (2, 0).

Referring to (b) of FIG. 10, the residual coefficients may be rearranged at positions symmetrical with respect to a horizontal axis of the current block through a rearrangement process using horizontal flipping. Here, the horizontal axis may refer to a horizontal line passing through the center of the current block. For example, a residual coefficient at the top-right position may be rearranged at a horizontally flipped position, which is the bottom-right position. Further, for example, residual coefficient 1 (i.e., a residual coefficient neighboring on the right of the residual coefficient at the top-left position) may be rearranged at a horizontally flipped position, which is a position neighboring on the right of the bottom-left position. That is, when the width and height of the current block are 4, and the top-left sample position of the current block has an x component of 0 and a y component of 0, a residual coefficient at a position (1, 0) may be rearranged at a horizontally flipped position, which is a position (1, 3).

Alternatively, as another illustrative rearrangement method, a method of rearranging residual coefficients of a current block according to the distance to a reference sample of intra prediction may be proposed. For example, layers may be defined in a TU according to the distance between a reference sample and a prediction block, and an encoding apparatus may determine whether to perform a transverse-first scan or a longitudinal-first scan on residual coefficients in each layer and may then rearrange the residual coefficients in an inverse raster order (from right to left and from bottom to top) according to the scan order. That is, layers of the current block may be defined based on the distance to a reference sample, and the encoding apparatus/decoding apparatus may determine an order in which residual coefficients in each layer are scanned as the transverse-first scan or the longitudinal-first scan and may rearrange the residual coefficients in the inverse raster order (from right to left and from bottom to top) according to the scan order. The decoding apparatus may derive the original residual coefficients by performing the foregoing rearrangement process in reverse order.

FIG. 11 illustrates residual coefficients of a current block to which the foregoing embodiment of dividing layers based on the distance to a reference sample and performing rearrangement at positions according to an inverse raster order is applied. (a) of FIG. 11 illustrates an example in which residual coefficients in each layer are rearranged in a transverse-first scan order at positions according to the inverse raster order, and (b) of FIG. 11 illustrates an example in which residual coefficients in each layer are rearranged in a longitudinal-first scan order at the positions according to the inverse raster order.

Referring to FIG. 11, layers of the current block may include a first layer adjacent to at least one reference sample, a second layer from which the distance to the closest reference sample is 1, a third layer from which the distance to the closest reference sample is 2, and a fourth layer from which the distance to the closest reference sample is 4. That is, the first layer may include residual coefficients (e.g., residual coefficients Oto 4, residual coefficient 8, and residual coefficient 12 of the current block before rearrangement illustrated in FIG. 11) adjacent to the at least one reference sample (i.e., the first layer may include residual coefficients from which the distance to the closest reference sample is 1), the second layer may include residual coefficients (e.g., residual coefficients 5 to 7, residual coefficient 9, and residual coefficient 13 of the current block before rearrangement illustrated in FIG. 11) from which the distance to the closest reference sample is 2, the third layer may include residual coefficients (e.g., residual coefficients 10, 11, and 14 of the current block before rearrangement illustrated in FIG. 11) from which the distance to the closest reference sample is 3, and the fourth layer may include a residual coefficient (e.g., residual coefficient 15 of the current block before rearrangement illustrated in FIG. 11) from which the distance to the closest reference sample is 4.

When the layers of the current block are defined as described above, an encoding apparatus may determine one of a transverse-first scan and a longitudinal-first scan as a scan method for the layers of the current block.

For example, when the transverse-first scan is determined as the scan method for the layers of the current block, the residual coefficients may be rearranged as shown in (a) of FIG. 11.

Specifically, the encoding apparatus may perform scanning in an order from the first layer to the fourth layer, in which case the encoding apparatus may scan transverse residual coefficients in each layer from a residual coefficient at the top-left position, and may scan the remaining longitudinal residual coefficients from top to bottom after scanning all of the transverse residual coefficients.

For example, transverse residual coefficients in the first layer may include residual coefficients 0 to 3, and longitudinal residual coefficients in the first layer may include residual coefficients 4, 8, and 12. The encoding apparatus/ decoding apparatus may scan the transverse residual coefficients in the first layer in a left-to-right order (scan residual coefficients 0, 1, 2, and 3 in order) and may then scan the longitudinal residual coefficients in the first layer in a top-to-bottom order (scans residual coefficients 4, 8, and 12 in order). Next, the second layer may be scanned. Transverse residual coefficients in the second layer may include residual coefficients 5 to 7, and longitudinal residual coefficients in the second layer may include residual coefficients 9 and 13. The encoding apparatus may scan the transverse residual coefficients in the second layer in the left-to-right order (scan residual coefficients 5, 6, and 7 in order) and may then scan the longitudinal residual coefficients in the second layer in the top-to-bottom order (scans residual coefficients 9 and 13 in order). Next, the third layer may be scanned. Transverse residual coefficients in the third layer may include residual coefficients 10 and 11, and a longitudinal residual coefficient in the third layer may include residual coefficient 14. The encoding apparatus may scan the transverse residual coefficients in the third layer in the left-to-right order (scan residual coefficients 10 and 11 in order) and may then scan the longitudinal residual coefficients in the third layer in the top-to-bottom order (scans residual coefficient 14). Next, the fourth layer may be scanned. A transverse residual coefficient in the fourth layer may include residual coefficient 15. The encoding apparatus may scan the transverse residual coefficient in the fourth layer in the left-to-right order (scan residual coefficient 15).

Subsequently, referring to (a) of FIG. 11, the encoding apparatus may rearrange the residual coefficients in the scan order at positions according to the inverse raster order (from right to left and from bottom to top). As described above, the scan order of the residual coefficients is an order of residual coefficients 0, 1, 2, 3, 4, 8, 12, 5, 6, 7, 9, 13, 10, 11, 14, and 15. The residual coefficients may be rearranged in the scan order at the positions according to the inverse raster order in the current block. For example, residual coefficient 0 may be rearranged at the bottom-right position, residual coefficients 1, 2, and 3 may be rearranged in a left direction of the bottom-right position, residual coefficients 4, 8, 12, and 5 may be rearranged in a right-to-left order in an upper row (i.e., a third row of the current block) of the bottom-right position, residual coefficients 6, 7, 9, and 13 may be rearranged in the right-to-left order in a second row of the current block, and residual coefficients 10, 11, 14, and 15 may be rearranged in the right-to-left order in a first row of the current block.

Further, for example, when the longitudinal-first scan is determined as the scan method for the layers of the current block, the residual coefficients may be rearranged as shown in (b) of FIG. 11.

Specifically, the encoding apparatus may perform scanning in an order from the first layer to the fourth layer, in which case the encoding apparatus may scan longitudinal residual coefficients in each layer from the residual coefficient at the top-left position, and may scan the remaining transverse residual coefficients from top to bottom after scanning all of the longitudinal residual coefficients.

For example, longitudinal residual coefficients in the first layer may include residual coefficients 0, 4, 8, and 12, and transverse residual coefficients in the first layer may include residual coefficients 1 to 3. The encoding apparatus may scan the longitudinal residual coefficients in the first layer in the top-to-bottom order (scan residual coefficients 0, 4, 8, and 12 in order) and may then scan the transverse residual coefficients in the first layer in the left-to-right order (scans residual coefficients 1, 2, and 3 in order). Next, the second layer may be scanned. Longitudinal residual coefficients in the second layer may include residual coefficients 5, 9, and 13, and transverse residual coefficients in the second layer may include residual coefficients 6 and 7. The encoding apparatus may scan the longitudinal residual coefficients in the second layer in the top-to-bottom order (scan residual coefficients 5, 9, and 13 in order) and may then scan the transverse residual coefficients in the second layer in the left-to-right order (scans residual coefficients 6 and 6 in order). Next, the third layer may be scanned. Longitudinal residual coefficients in the third layer may include residual coefficients 10 and 14, and a transverse residual coefficient in the third layer may include residual coefficient 11. The encoding apparatus may scan the longitudinal residual coefficients in the third layer in the top-to-bottom order (scan residual coefficients 10 and 14 in order) and may then scan the transverse residual coefficients in the third layer in the left-to-right order (scans residual coefficient 11). Next, the fourth layer may be scanned. A longitudinal residual coefficient in the fourth layer may include residual coefficient 15. The encoding apparatus may scan the longitudinal residual coefficient in the fourth layer in the top-to-bottom order (scan residual coefficient 15).

Subsequently, referring to (b) of FIG. 11, the encoding apparatus may rearrange the residual coefficients in the scan order at positions according to the inverse raster order (from right to left and from bottom to top). As described above, the scan order of the residual coefficients is an order of residual coefficients 0, 4, 8, 12, 1, 2, 3, 5, 9, 13, 6, 7, 10, 14, 11, and 15. The residual coefficients may be rearranged in the scan order at the positions according to the inverse raster order in the current block. For example, residual coefficient 0 may be rearranged at the bottom-right position, residual coefficients 4, 8, and 12 may be rearranged in the left direction of the bottom-right position, residual coefficients 1, 2, 3, and 5 may be rearranged in the right-to-left order in the upper row (i.e., the third row of the current block) of the bottom-right position, residual coefficients 9, 13, 6, and 7 may be rearranged in the right-to-left order in the second row of the current block, and residual coefficients 10, 14, 11, and 15 may be rearranged in the right-to-left order in the first row of the current block.

Alternatively, another embodiment of rearranging residual coefficients of a current block according to the distance to a reference sample of intra prediction may be proposed. For example, layers may be defined in a TU according to the distance between a reference sample and a prediction block, and an encoding apparatus may determine whether to perform a transverse-first scan or a longitudinal-first scan on residual coefficients in each layer and may then rearrange the residual coefficients in an diagonal scan order according to the scan order. That is, layers of the current block may be defined based on the distance to a reference sample, and the encoding apparatus may determine an order in which residual coefficients in each layer are scanned as the transverse-first scan or the longitudinal-first scan and may rearrange the residual coefficients according to the scan order at positions according to the diagonal scan order. A decoding apparatus may derive the original residual coefficients by performing the foregoing rearrangement process in reverse order.

FIG. 12 illustrates residual coefficients of a current block to which the foregoing embodiment of dividing layers based on the distance to a reference sample and performing rearrangement at positions according to a diagonal scan order is applied. (a) of FIG. 12 illustrates an example in which residual coefficients in each layer are rearranged in a transverse-first scan order at positions according to the diagonal scan order, and (b) of FIG. 12 illustrates an example in which residual coefficients in each layer are rearranged in a longitudinal-first scan order at the positions according to the diagonal scan order.

Referring to FIG. 12, layers of the current block may include a first layer adjacent to at least one reference sample, a second layer from which the distance to the closest reference sample is 1, a third layer from which the distance to the closest reference sample is 2, and a fourth layer from which the distance to the closest reference sample is 4. That is, the first layer may include residual coefficients (e.g., residual coefficients 0 to 4, residual coefficient 8, and residual coefficient 12 of the current block before rearrangement illustrated in FIG. 12) adjacent to the at least one reference sample (i.e., the first layer may include residual coefficients from which the distance to the closest reference sample is 1), the second layer may include residual coefficients (e.g., residual coefficients 5 to 7, residual coefficient 9, and residual coefficient 13 of the current block before rearrangement illustrated in FIG. 12) from which the distance to the closest reference sample is 2, the third layer may include residual coefficients (e.g., residual coefficients 10, 11, and 14 of the current block before rearrangement illustrated in FIG. 12) from which the distance to the closest reference sample is 3, and the fourth layer may include a residual coefficient (e.g., residual coefficient 15 of the current block before rearrangement illustrated in FIG. 12) from which the distance to the closest reference sample is 4.

When the layers of the current block are defined as described above, an encoding apparatus may determine one of a transverse-first scan and a longitudinal-first scan as a scan method for the layers of the current block.

For example, when the transverse-first scan is determined as the scan method for the layers of the current block, the residual coefficients may be rearranged as shown in (a) of FIG. 12.

Specifically, the encoding apparatus may perform scanning in an order from the first layer to the fourth layer, in which case the encoding apparatus may scan transverse residual coefficients in each layer from a residual coefficient at the top-left position, and may scan the remaining longitudinal residual coefficients from top to bottom after scanning all of the transverse residual coefficients.

For example, transverse residual coefficients in the first layer may include residual coefficients 0 to 3, and longitudinal residual coefficients in the first layer may include residual coefficients 4, 8, and 12. The encoding apparatus may scan the transverse residual coefficients in the first layer in a left-to-right order (scan residual coefficients 0, 1, 2, and 3 in order) and may then scan the longitudinal residual coefficients in the first layer in a top-to-bottom order (scans residual coefficients 4, 8, and 12 in order). Next, the second layer may be scanned. Transverse residual coefficients in the second layer may include residual coefficients 5 to 7, and longitudinal residual coefficients in the second layer may include residual coefficients 9 and 13. The encoding apparatus may scan the transverse residual coefficients in the second layer in the left-to-right order (scan residual coefficients 5, 6, and 7 in order) and may then scan the longitudinal residual coefficients in the second layer in the top-to-bottom order (scans residual coefficients 9 and 13 in order). Next, the third layer may be scanned. Transverse residual coefficients in the third layer may include residual coefficients 10 and 11, and a longitudinal residual coefficient in the third layer may include residual coefficient 14. The encoding apparatus may scan the transverse residual coefficients in the third layer in the left-to-right order (scan residual coefficients 10 and 11 in order) and may then scan the longitudinal residual coefficients in the third layer in the top-to-bottom order (scans residual coefficient 14). Next, the fourth layer may be scanned. A transverse residual coefficient in the fourth layer may include residual coefficient 15. The encoding apparatus may scan the transverse residual coefficient in the fourth layer in the left-to-right order (scan residual coefficient 15).

Subsequently, referring to (a) of FIG. 12, the encoding apparatus may rearrange the residual coefficients in the scan order at positions according to the diagonal scan order (from top-right to bottom-left and from bottom-right to top-left). As described above, the scan order of the residual coefficients is an order of residual coefficients 0, 1, 2, 3, 4, 8, 12, 5, 6, 7, 9, 13, 10, 11, 14, and 15. The residual coefficients may be rearranged in the scan order at the positions according to the diagonal scan order in the current block. For example, residual coefficient 0 may be rearranged at the bottom-right position on a first right upward diagonal, residual coefficients 1 and 2 may be rearranged in an upper right-to-lower left order on a second right upward diagonal (i.e., a right upward diagonal on the upper left of the first right upward diagonal) of the current block, residual coefficients 3, 4, and 8 may be rearranged in the upper right-to-lower left order on a third right upward diagonal (i.e., a right upward diagonal on the upper left of the second right upward diagonal) of the current block, residual coefficients 12, 5, 6, and 7 may be rearranged in the upper right-to-lower left order on a fourth right upward diagonal (i.e., a right upward diagonal on the upper left of the third right upward diagonal) of the current block, residual coefficients 9, 13, and 10 may be rearranged in the upper right-to-lower left order on a fifth right upward diagonal (i.e., a right upward diagonal on the upper left of the fourth right upward diagonal) of the current block, residual coefficients 11 and 14 may be rearranged in the upper right-to-lower left order on a sixth right upward diagonal (i.e., a right upward diagonal on the upper left of the fifth right upward diagonal) of the current block, and residual coefficient 15 may be rearranged in the upper right-to-lower left order on a seventh right upward diagonal (i.e., a right upward diagonal on the upper left of the sixth right upward diagonal) of the current block.

Further, for example, when the longitudinal-first scan is determined as the scan method for the layers of the current block, the residual coefficients may be rearranged as shown in (b) of FIG. 12.

Specifically, the encoding apparatus may perform scanning in an order from the first layer to the fourth layer, in which case the encoding apparatus may scan longitudinal residual coefficients in each layer from the residual coefficient at the top-left position, and may scan the remaining transverse residual coefficients from top to bottom after scanning all of the longitudinal residual coefficients.

For example, longitudinal residual coefficients in the first layer may include residual coefficients 0, 4, 8, and 12, and transverse residual coefficients in the first layer may include residual coefficients 1 to 3. The encoding apparatus may scan the longitudinal residual coefficients in the first layer in the top-to-bottom order (scan residual coefficients 0, 4, 8, and 12 in order) and may then scan the transverse residual coefficients in the first layer in the left-to-right order (scans residual coefficients 1, 2, and 3 in order). Next, the second layer may be scanned. Longitudinal residual coefficients in the second layer may include residual coefficients 5, 9, and 13, and transverse residual coefficients in the second layer may include residual coefficients 6 and 7. The encoding apparatus may scan the longitudinal residual coefficients in the second layer in the top-to-bottom order (scan residual coefficients 5, 9, and 13 in order) and may then scan the transverse residual coefficients in the second layer in the left-to-right order (scans residual coefficients 6 and 6 in order). Next, the third layer may be scanned. Longitudinal residual coefficients in the third layer may include residual coefficients 10 and 14, and a transverse residual coefficient in the third layer may include residual coefficient 11. The encoding apparatus may scan the longitudinal residual coefficients in the third layer in the top-to-bottom order (scan residual coefficients 10 and 14 in order) and may then scan the transverse residual coefficients in the third layer in the left-to-right order (scans residual coefficient 11). Next, the fourth layer may be scanned. A longitudinal residual coefficient in the fourth layer may include residual coefficient 15. The encoding apparatus may scan the longitudinal residual coefficient in the fourth layer in the top-to-bottom order (scan residual coefficient 15).

Subsequently, referring to (b) of FIG. 12, the encoding apparatus may rearrange the residual coefficients in the scan order at positions according to the diagonal scan order (from top-right to bottom-left and from bottom-right to top-left). As described above, the scan order of the residual coefficients is an order of residual coefficients 0, 4, 8, 12, 1, 2, 3, 5, 9, 13, 6, 7, 10, 14, 11, and 15. The residual coefficients may be rearranged in the scan order at the positions according to the diagonal scan order in the current block. For example, residual coefficient 0 may be rearranged at the bottom-right position on the first right upward diagonal, residual coefficients 4 and 8 may be rearranged in the upper right-to-lower left order on the second right upward diagonal (i.e., the right upward diagonal on the upper left of the first right upward diagonal) of the current block, residual coefficients 12, 1, 28 may be rearranged in the upper right-to-lower left order on the third right upward diagonal (i.e., the right upward diagonal on the upper left of the second right upward diagonal) of the current block, residual coefficients 3, 5, 9, and 13 may be rearranged in the upper right-to-lower left order on the fourth right upward diagonal (i.e., the right upward diagonal on the upper left of the third right upward diagonal) of the current block, residual coefficients 6, 7, and 10 may be rearranged in the upper right-to-lower left order on the fifth right upward diagonal (i.e., the right upward diagonal on the upper left of the fourth right upward diagonal) of the current block, residual coefficients 14 and 11 may be rearranged in the upper right-to-lower left order on the sixth right upward diagonal (i.e., the right upward diagonal on the upper left of the fifth right upward diagonal) of the current block, and residual coefficient 15 may be rearranged in the upper right-to-lower left order on the seventh right upward diagonal (i.e., the right upward diagonal on the upper left of the sixth right upward diagonal) of the current block.

Alternatively, another embodiment of rearranging residual coefficients of a current block according to the distance to a reference sample of intra prediction may be proposed. For example, a method of setting a reference sample (left reference sample or upper reference sample) serving as a reference, scanning residual coefficients by defining layers of a current block based on the distance to the set reference sample, and rearranging the residual coefficients in the scan order at positions according to a diagonal scan order may be proposed. Here, the residual coefficients in the layers defined based on the distance to the left reference sample may be scanned by a longitudinal-first scan, and the residual coefficients in the layers defined based on the distance to the upper reference sample may be scanned by a transverse-first scan.

FIG. 13 illustrates residual coefficients of a current block to which the foregoing embodiment of dividing layers based on the distance to a specific reference sample and performing rearrangement at positions according to a diagonal scan order is applied. (a) of FIG. 13 illustrates an example in which residual coefficients in layers configured based on the distance to an upper reference sample are rearranged in a transverse-first scan order at positions according to the diagonal scan order, and (b) of FIG. 13 illustrates an example in which residual coefficients in layers configured based on the distance to a left reference sample are rearranged in a longitudinal-first scan order at the positions according to the diagonal scan order. A decoding device may derive the original residual coefficient by performing the foregoing rearrangement process in reverse order.

Referring to (a) of FIG. 13, layers of the current block may include a first layer adjacent to at least one upper reference sample, a second layer from which the distance to the closest upper reference sample is 1, a third layer from which the distance to the closest upper reference sample is 2, and a fourth layer from which the distance to the closest upper reference sample is 4. That is, the first layer may include residual coefficients (e.g., residual coefficients 0 to 3 of the current block before rearrangement illustrated in (a) of FIG. 13) adjacent to the at least one upper reference sample (i.e., the first layer may include residual coefficients from which the distance to the closest upper reference sample is 1), the second layer may include residual coefficients (e.g., residual coefficients 4 to 7 of the current block before rearrangement illustrated in (a) of FIG. 13) from which the distance to the closest upper reference sample is 2, the third layer may include residual coefficients (e.g., residual coefficients 8 to 11 of the current block before rearrangement illustrated in (a) of FIG. 13) from which the distance to the closest upper reference sample is 3, and the fourth layer may include residual coefficients (e.g., residual coefficients 12 to 15 of the current block before rearrangement illustrated in (a) of FIG. 13) from which the distance to the closest upper reference sample is 4. That is, the first layer may derive from a first row of the current block, the second layer from a second row of the current block, the third layer from a third row of the current block, and the fourth layer from a fourth row of the current block.

When the layers of the current block are defined as described above, an encoding apparatus may determine a transverse-first scan as a scan method for the layers of the current block. Subsequently, the residual coefficients may be rearranged as shown in (a) of FIG. 13.

Specifically, the encoding apparatus may perform scanning in an order from the first layer to the fourth layer, and may scan residual coefficient in each layer from left to right.

For example, the encoding apparatus may scan the residual coefficients in the first layer in a left-to-right order (scan residual coefficients 0, 1, 2, and 3 in order). Next, the second layer may be scanned. The encoding apparatus may scan the residual coefficients in the second layer in the left-to-right order (scan residual coefficients 4, 5, 6, and 7 in order). Next, the third layer may be scanned. The encoding apparatus may scan the residual coefficients in the third layer in the left-to-right order (scan residual coefficients 8, 9, 10, and 11 in order). Next, the fourth layer may be scanned. The encoding apparatus may scan the residual coefficients in the fourth layer in the left-to-right order (scan residual coefficients 12, 13, 14, and 15 in order).

Subsequently, referring to (a) of FIG. 13, the encoding apparatus may rearrange the residual coefficients in the scan order at positions according to the diagonal scan order (from top-right to bottom-left and from bottom-right to top-left). As described above, the scan order of the residual coefficients is an order of residual coefficients 0, 1, 2, 3, 4, 5, 6, 7, 8, 9, 10, 11, 12, 13, 14, and 15. The residual coefficients may be rearranged in the scan order at the positions according to the diagonal scan order in the current block. For example, residual coefficient 0 may be rearranged at the bottom-right position on a first right upward diagonal, residual coefficients 1 and 2 may be rearranged in an upper right-to-lower left order on a second right upward diagonal (i.e., a right upward diagonal on the upper left of the first right upward diagonal) of the current block, residual coefficients 3, 4, and 5 may be rearranged in the upper right-to-lower left order on a third right upward diagonal (i.e., a right upward diagonal on the upper left of the second right upward diagonal) of the current block, residual coefficients 6, 7, 8, and 9 may be rearranged in the upper right-to-lower left order on a fourth right upward diagonal (i.e., a right upward diagonal on the upper left of the third right upward diagonal) of the current block, residual coefficients 10, 11, and 12 may be rearranged in the upper right-to-lower left order on a fifth right upward diagonal (i.e., a right upward diagonal on the upper left of the fourth right upward diagonal) of the current block, residual coefficients 13 and 14 may be rearranged in the upper right-to-lower left order on a sixth right upward diagonal (i.e., a right upward diagonal on the upper left of the fifth right upward diagonal) of the current block, and residual coefficient 15 may be rearranged in the upper right-to-lower left order on a seventh right upward diagonal (i.e., a right upward diagonal on the upper left of the sixth right upward diagonal) of the current block.

Referring to (b) of FIG. 13, layers of the current block may include a first layer adjacent to at least one left reference sample, a second layer from which the distance to the closest left reference sample is 1, a third layer from which the distance to the closest left reference sample is 2, and a fourth layer from which the distance to the closest left reference sample is 4. That is, the first layer may include residual coefficients (e.g., residual coefficients 0, 4, 8, and 12 of the current block before rearrangement illustrated in (b) of FIG. 13) adjacent to the at least one upper reference sample (i.e., the first layer may include residual coefficients from which the distance to the closest left reference sample is 1), the second layer may include residual coefficients (e.g., residual coefficients 1, 5, 9, and 13 of the current block before rearrangement illustrated in (b) of FIG. 13) from which the distance to the closest left reference sample is 2, the third layer may include residual coefficients (e.g., residual coefficients 2, 6, 10, and 14 of the current block before rearrangement illustrated in (b) of FIG. 13) from which the distance to the closest left reference sample is 3, and the fourth layer may include residual coefficients (e.g., residual coefficients 3, 7, 11, and 15 of the current block before rearrangement illustrated in (b) of FIG. 13) from which the distance to the closest left reference sample is 4. That is, the first layer may derive from a first column of the current block, the second layer from a second column of the current block, the third layer from a third column of the current block, and the fourth layer from a fourth column of the current block.

When the layers of the current block are defined as described above, an encoding apparatus may determine a longitudinal-first scan as a scan method for the layers of the current block. Subsequently, the residual coefficients may be rearranged as shown in (b) of FIG. 13.

Specifically, the encoding apparatus may perform scanning in an order from the first layer to the fourth layer, and may scan residual coefficient in each layer from top to bottom.

For example, the encoding apparatus may scan the residual coefficients in the first layer in a top-to-bottom order (scan residual coefficients 0, 4, 8, and 12 in order). Next, the second layer may be scanned. The encoding apparatus may scan the residual coefficients in the second layer in the top-to-bottom order (scan residual coefficients 1, 5, 9, and 13 in order). Next, the third layer may be scanned. The encoding apparatus may scan the residual coefficients in the third layer in the top-to-bottom order (scan residual coefficients 2, 6, 10, and 14 in order). Next, the fourth layer may be scanned. The encoding apparatus may scan the residual coefficients in the fourth layer in the top-to-bottom order (scan residual coefficients 3, 7, 11, and 15 in order).

Subsequently, referring to (b) of FIG. 13, the encoding apparatus may rearrange the residual coefficients in the scan order at positions according to the diagonal scan order (from top-right to bottom-left and from bottom-right to top-left). As described above, the scan order of the residual coefficients is an order of residual coefficients 0, 4, 8, 12, 1, 5, 9, 13, 2, 6, 10, 14, 3, 7, 11, and 15. The residual coefficients may be rearranged in the scan order at the positions according to the diagonal scan order in the current block. For example, residual coefficient 0 may be rearranged at the bottom-right position on a first right upward diagonal, residual coefficients 4 and 8 may be rearranged in an upper right-to-lower left order on a second right upward diagonal (i.e., a right upward diagonal on the upper left of the first right upward diagonal) of the current block, residual coefficients 12, 1, and 5 may be rearranged in the upper right-to-lower left order on a third right upward diagonal (i.e., a right upward diagonal on the upper left of the second right upward diagonal) of the current block, residual coefficients 9, 13, 2, and 6 may be rearranged in the upper right-to-lower left order on a fourth right upward diagonal (i.e., a right upward diagonal on the upper left of the third right upward diagonal) of the current block, residual coefficients 10, 14, and 3 may be rearranged in the upper right-to-lower left order on a fifth right upward diagonal (i.e., a right upward diagonal on the upper left of the fourth right upward diagonal) of the current block, residual coefficients 7 and 11 may be rearranged in the upper right-to-lower left order on a sixth right upward diagonal (i.e., a right upward diagonal on the upper left of the fifth right upward diagonal) of the current block, and residual coefficient 15 may be rearranged in the upper right-to-lower left order on a seventh right upward diagonal (i.e., a right upward diagonal on the upper left of the sixth right upward diagonal) of the current block.

For example, the foregoing rearrangement methods may be performed when no transform is applied to the residual coefficients of the current block. That is, whether to apply the rearrangement methods may be determined based on whether a transform is applied to the residual coefficients. In other words, whether to apply the rearrangement methods may be determined based on a transform skip flag for the current block.

Figure 14A:
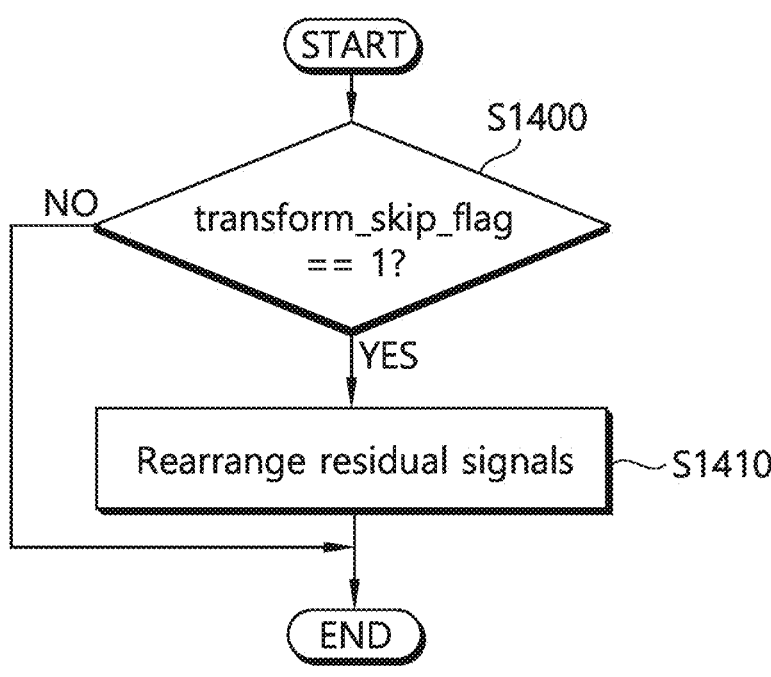

FIG. 14A and FIG. 14B illustrate an embodiment of determining whether to apply a rearrangement method based on a transform skip flag for a current block and an encoding apparatus and a decoding apparatus performing the embodiment.

Referring to FIG. 14A, the encoding apparatus and the decoding apparatus may determine whether the value of a transform skip flag for a current block is 1 (S1400). When the value of the transform skip flag is 1, the encoding apparatus and the decoding apparatus may perform a rearrangement method on residual coefficients of the current block (S1410). When the value of the transform skip flag is not 1 (i.e., when the value of the transform skip flag is 0), the encoding apparatus and the decoding apparatus may not perform a rearrangement method on the residual coefficients of the current block. The transform skip flag may indicate whether a transform is applied to the residual coefficients of the current block. That is, the transform skip flag may indicate whether the transform has been applied to the residual coefficients. A syntax element indicating the transform skip flag may be transform_skip_flag illustrated above.

FIG. 14B illustrates the encoding apparatus and the decoding apparatus that determine whether to apply the rearrangement method based on the transform skip flag for the current block and perform the rearrangement method. A residual rearranger of the encoding apparatus may determine whether to rearrange the residual coefficients based on the transform skip flag for the current block, and may rearrange the residual coefficients when the value of the transform skip value is 1. A quantizer and an entropy encoder of the encoding apparatus may perform quantization and entropy encoding on the rearranged residual coefficients to generate residual information and may output the encoded residual information through a bitstream. An entropy decoder of the decoding apparatus may receive the bitstream including the residual information on the current block and may decode the residual information to derive the quantized residual coefficients. Subsequently, a dequantizer of the decoding apparatus may dequantize (i.e., scale) the quantized residual coefficients, thereby deriving the residual coefficients. A residual rearranger of the decoding apparatus may determine whether to rearrange the residual coefficients based on the transform skip flag for the current block, and may rearrange the residual coefficients when the value of the transform skip value is 1.

Alternatively, methods of using the foregoing rearrangement methods in combination under various conditions may be proposed.

In one example, a rearrangement method or whether to perform rearrangement may be determined based on the size of the current block. Here, the size of the current block may denote the number of samples of the current block or the width and height of the current block. For example, when the number of samples of the current block is less than 64, a rearrangement method of 180-degree rotation described above may be applied to the residual coefficients of the current block, and when the number of samples of the current block is 64 or greater, a rearrangement method of mirroring described above may be applied to the residual coefficients of the current block. In another example, when the number of samples of the current block is less than 64, one of the rearrangement methods described above may be applied to the residual coefficients of the current block, and when the number of samples of the current block is 64 or greater, no rearrangement method may be applied. In one example, a process of determining a rearrangement method or whether to perform rearrangement based on the foregoing condition may be performed only when the value of the transform skip flag for the current block is 1. That is, when the value of the transform skip flag for the current block is 1, a rearrangement method or whether to perform rearrangement may be determined based on the size (number of samples or width and height) of the current block.

In an alternative example, a rearrangement method or whether to perform rearrangement may be determined based on the shape of the current block. For example, when the current block is a square block (i.e., when the width and height of the current block are the same), the rearrangement method of mirroring may be applied to the residual coefficients of the current block, and when the current block is a non-square block (i.e., when the width and height of the current block are different), the rearrangement method of 180-degree rotation may be applied to the residual coefficients of the current block. In one example, a process of determining a rearrangement method or whether to perform rearrangement based on the foregoing condition may be performed only when the value of the transform skip flag for the current block is 1. That is, when the value of the transform skip flag for the current block is 1, a rearrangement method or whether to perform rearrangement may be determined based on the shape of the current block.

In an alternative example, a rearrangement method or whether to perform rearrangement may be determined based on the ratio of the width of the current block to the height thereof. For example, when the ratio of the width of the current block to the height is 2 or greater or is ½ or less (i.e., when a value obtained by dividing the width of the current block by the height is 2 or greater or is ½ or less), the rearrangement method of mirroring may be applied to the residual coefficients of the current block, and when the ratio of the width of the current block to the height is less than 2 and is greater than ½ (i.e., the value obtained by dividing the width of the current block by the height is less than 2 and is greater than ½), the rearrangement method of 180-degree rotation may be applied to the residual coefficients of the current block. Alternatively, for example, when the ratio of the width of the current block to the height is 2 or greater or is ½ or less (i.e., when a value obtained by dividing the width of the current block by the height is 2 or greater or is ½ or less), the rearrangement method of mirroring may be applied to the residual coefficients of the current block, and when the ratio of the width of the current block to the height is less than 2 and is greater than ½ (i.e., the value obtained by dividing the width of the current block by the height is less than 2 and is greater than ½), no rearrangement method may be applied to the residual coefficients of the current block. In one example, a process of determining a rearrangement method or whether to perform rearrangement based on the foregoing condition may be performed only when the value of the transform skip flag for the current block is 1. That is, when the value of the transform skip flag for the current block is 1, a rearrangement method or whether to perform rearrangement may be determined based on the ratio of the width of the current block to the height thereof.

In an alternative example, when intra prediction is applied to the current block, a rearrangement method or whether to perform rearrangement may be determined based on an intra prediction mode for the current block. For example, when the prediction direction of the intra prediction mode for the current block is close to a horizontal direction or a vertical direction, a left reference sample or an upper reference sample is mainly used for prediction, causing prediction errors to be concentrated in one reference sample direction, and thus an embodiment of determining a rearrangement method in view of this characteristic may be proposed. For example, when the prediction direction of the intra prediction mode for the current block is the horizontal direction or the intra prediction mode for the current block is an intra prediction mode in which a left reference sample is mainly used for prediction, a rearrangement method of vertical flipping described above may be applied, and when the prediction direction of the intra prediction mode for the current block is the vertical direction or the intra prediction mode for the current block is an intra prediction mode in which an upper reference sample is mainly used for prediction, a rearrangement method of horizontal flipping described above may be applied. In one example, a process of determining a rearrangement method or whether to perform rearrangement based on the foregoing condition may be performed only when the value of the transform skip flag for the current block is 1. That is, when the value of the transform skip flag for the current block is 1, a rearrangement method or whether to perform rearrangement may be determined based on the intra prediction mode for the current block.

In an alternative example, a rearrangement method or whether to perform rearrangement may be determined based on a high-level syntax in the bitstream transmitted from the encoding apparatus. For example, a flag indicating whether to perform rearrangement may be transmitted through the high-level syntax, such as a sequence parameter set (SPS) or a picture parameter set (PPS), and whether to perform rearrangement and a rearrangement method in a subsyntax referencing the high-level syntax may be determined based on the flag. In one example, a process of determining a rearrangement method or whether to perform rearrangement based on the foregoing condition may be performed only when the value of the transform skip flag for the current block is 1. That is, when the value of the transform skip flag for the current block is 1, the flag indicating whether to perform rearrangement may be transmitted through the high-level syntax, such as the sequence parameter set (SPS) or the picture parameter set (PPS), and a rearrangement method or whether to perform rearrangement may be determined based on the flag.

In an alternative example, a rearrangement method or whether to perform rearrangement may be determined based on a prediction mode for the current block. For example, an embodiment in which a rearrangement method is used only for a residual signal of a block predicted in an intra prediction mode without using a residual rearrangement method for an inter prediction mode in which a residual signal is relatively less generated may be proposed. That is, when inter prediction is applied to the current block, no rearrangement method may be applied to the residual coefficients of the current block, and when intra prediction is applied to the current block, the rearrangement method may be applied to the residual coefficients of the current block. In one example, a process of determining a rearrangement method or whether to perform rearrangement based on the foregoing condition may be performed only when the value of the transform skip flag for the current block is 1. That is, when the value of the transform skip flag for the current block is 1, a rearrangement method or whether to perform rearrangement may be determined based on the prediction mode for the current block.

In an alternative example, a rearrangement method or whether to perform rearrangement may be determined based on whether quantization is applied. For example, no residual rearrangement method may be performed in lossless decoding in which no quantization is applied, and a residual rearrangement method may be performed in lossy decoding in which quantization is applied. That is, when no quantization is applied to the residual coefficients of the current block, no rearrangement method may be applied to the residual coefficients of the current block, when quantization is applied to the residual coefficients of the current block, the rearrangement method may be applied to the residual coefficients of the current block. In one example, a process of determining a rearrangement method or whether to perform rearrangement based on the foregoing condition may be performed only when the value of the transform skip flag for the current block is 1. That is, when the value of the transform skip flag for the current block is 1, a rearrangement method or whether to perform rearrangement may be determined based on whether quantization is applied to the residual coefficients of the current block.

Meanwhile, as described above, since a block which is not subjected to transform encoding, that is, a transform block including residual coefficients to which no transform is applied, has different characteristics of residual information from those of a block which is subjected to general transform encoding, an efficient residual data encoding method for a block which is not subjected to transform encoding is necessary.

Accordingly, the present disclosure proposes embodiments of encoding/decoding residual information for a transform skip block. Here, a transform skip flag indicating whether transform is applied may be transmitted by a unit of a transform block, and the size of a transform block is not limited in the embodiments of the present disclosure. For example, when the value of the transform skip flag is 1, a method of encoding/decoding residual information proposed in the present disclosure may be performed. When the value of the transform skip flag is 0, a method of encoding/decoding existing residual information, such as syntax elements for residual information illustrated in Table 1, may be performed.

Figure 15:
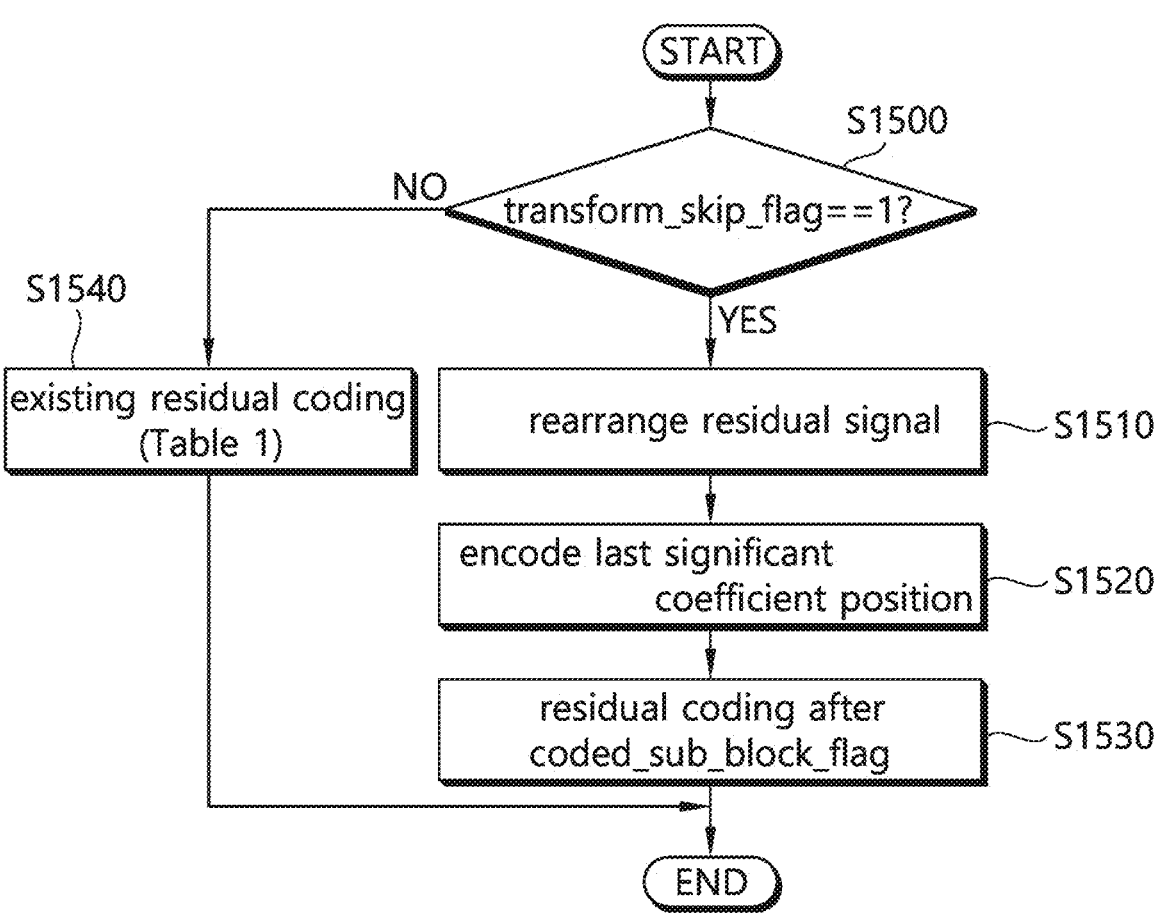
FIG. 15 illustrates an example of determining a method of coding residual information based on a transform skip flag.

FIG. 15 illustrates an example of determining a method of coding residual information based on a transform skip flag.

Referring to FIG. 15, an encoding apparatus may determine whether the value of a transform skip flag for a current block is 1 (S1500).

When the value of the transform skip flag is 1, the encoding apparatus may rearrange residual coefficients of the current block (S1510). Here, as a method for rearranging the residual coefficients, at least one of the foregoing embodiments may be used. For example, whether to rearrange the residual coefficients may be determined based on whether a prediction mode for the current block is an inter prediction mode or an intra prediction mode. Further, for example, when intra prediction is performed on the current block, a method for rearranging the residual coefficients may be selected or whether to rearrange the residual coefficients may be determined based on an intra prediction mode applied to the current block or the distance between the current block and a reference sample used for the intra prediction. In addition, for example, a method for rearranging the residual coefficients may be selected or whether to rearrange the residual coefficients may be determined based on the size of the current block (e.g., the number of samples of the current block or the width and height of the current block), the shape of the current block (e.g., whether the current block is a square block or a non-square block), the ratio of the width of the current block to the height thereof, and/or whether quantization is applied to the current block.

Subsequently, the encoding apparatus may encode information indicating the position of the last non-zero residual coefficient of the current block (S1520). A syntax element indicating the information indicating the position of the last non-zero residual coefficient may be last_sig_coeff_x_prefix, last_sig_coeff_y_prefix, last_sig_coeff_x_suffix, and last_sig_coeff_y_suffix.

Subsequently, the encoding apparatus may encode residual information on the current block after coded_sub_block_flag, that is, residual information encoded after coded_sub_block_flag (S1530). For example, the residual information may be encoded along with the syntax elements illustrated in Table 1.

When the value of the transform skip flag is 0, the encoding apparatus may encode the residual information on the current block as in the existing method (S1540). For example, the residual information encoded as in the existing method may correspond to the syntax elements illustrated in Table 1.

Unified transform type information proposed in Table 10 may be signaled. A syntax element of the transform type information may be tu_mts_idx. In this case, a method of coding the residual information may be determined based on tu_mts_idx. According to the proposed embodiment, it is possible to reduce the complexity of a process of encoding residual information for a block which is not subjected to transform encoding and to improve efficiency in encoding residual information.

Figure 16:
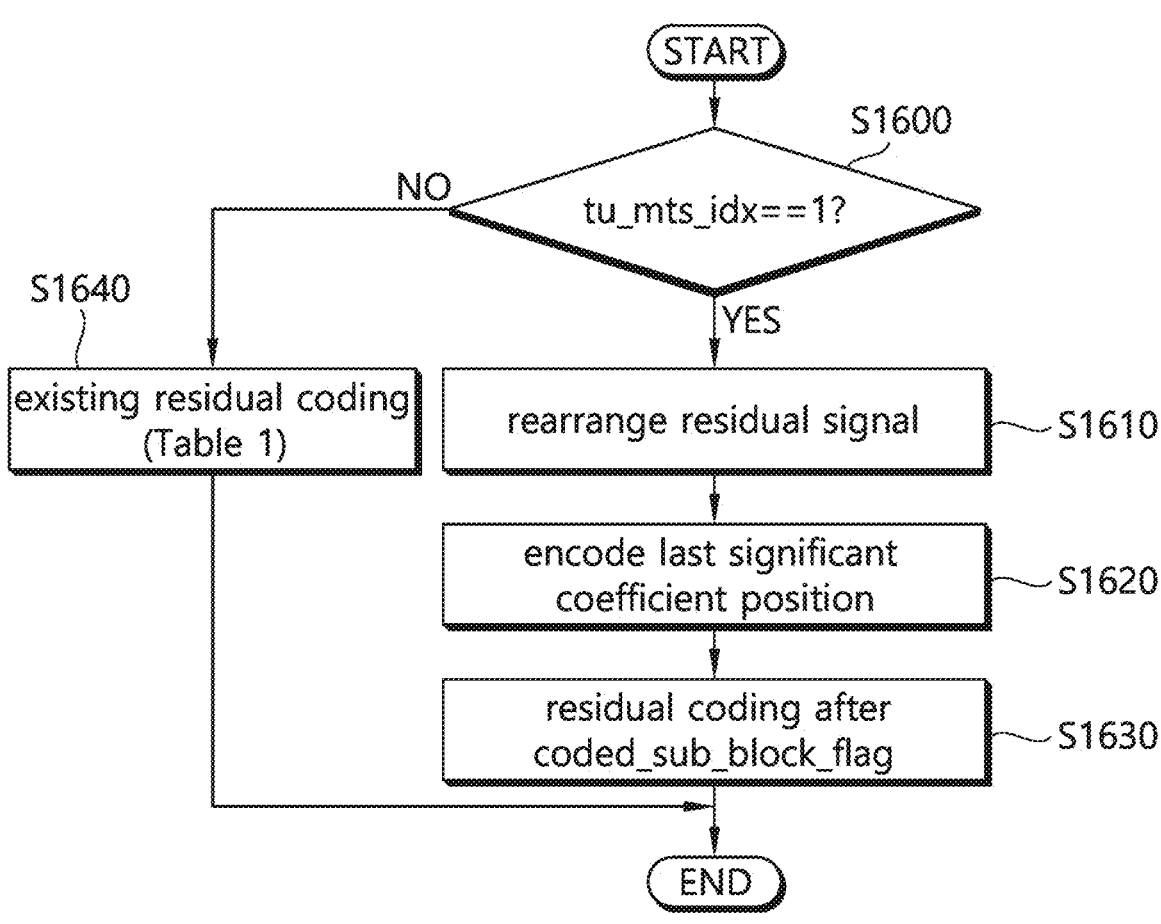
FIG. 16 illustrates an example of determining a method of coding residual information based on unified transform type information.

FIG. 16 illustrates an example of determining a method of coding residual information based on unified transform type information.

Referring to FIG. 16, an encoding apparatus may determine whether the value of unified transform type information for a current block is 1 (S1600). A syntax element of the unified transformation type information may be tu_mts_idx.

When the value of the unified transform type information is 1, the encoding apparatus may rearrange residual coefficients of the current block (S1610). Here, as a method for rearranging the residual coefficients, at least one of the foregoing embodiments may be used. For example, whether to rearrange the residual coefficients may be determined based on whether a prediction mode for the current block is an inter prediction mode or an intra prediction mode. Further, for example, when intra prediction is performed on the current block, a method for rearranging the residual coefficients may be selected or whether to rearrange the residual coefficients may be determined based on an intra prediction mode applied to the current block or the distance between the current block and a reference sample used for the intra prediction. In addition, for example, a method for rearranging the residual coefficients may be selected or whether to rearrange the residual coefficients may be determined based on the size of the current block (e.g., the number of samples of the current block or the width and height of the current block), the shape of the current block (e.g., whether the current block is a square block or a non-square block), the ratio of the width of the current block to the height thereof, and/or whether quantization is applied to the current block.

Subsequently, the encoding apparatus may encode information indicating the position of the last non-zero residual coefficient of the current block (S1620). A syntax element indicating the information indicating the position of the last non-zero residual coefficient may be last_sig_coeff_x_prefix, last_sig_coeff_y_prefix, last_sig_coeff_x_suffix, and last_sig_coeff_y_suffix.

Subsequently, the encoding apparatus may encode residual information on the current block after coded_sub_block_flag, that is, residual information encoded after coded_sub_block_flag (S1630). For example, the residual information may be encoded along with the syntax elements illustrated in Table 1.

When the value of the unified transform type information is 0, the encoding apparatus may encode the residual information on the current block as in the existing method (S1640). For example, the residual information encoded as in the existing method may correspond to the syntax elements illustrated in Table 1. Further, as illustrated in Table 10, syntax elements transform_skip_flag and/or mts_idx may be omitted. According to the proposed embodiment, it is possible to reduce the complexity of a process of encoding residual information for a block which is not subjected to transform encoding and to improve efficiency in encoding residual information.

Meanwhile, a decoding apparatus may derive the residual coefficients of the current block based on the residual information as described above, and may determine whether residual rearrangement (residual coefficient rearrangement) is applied to the current block. Whether the residual rearrangement is applied may be determined, for example, based on the value of the transform skip flag (i.e., transform_skip_flag) or the unified transform type information (i.e., tu_mts_idx) as shown in FIG. 15 or FIG. 16. When the residual rearrangement is applied to the current block, the decoding apparatus may rearrange the residual coefficients based on a residual rearrangement method determined according to the foregoing criteria, and may derive residual samples for the current block based on the rearranged residual coefficients. The residual samples may be derived from the rearranged residual coefficients, or may be derived by dequantizing the rearranged residual coefficients as necessary. Subsequently, as described above, reconstructed samples for the current block may be generated based on the residual samples and prediction samples for the current block.

As described above, in residual coding for the current block, main syntax elements of a 4×4 subblock or 2×2 subblock unit of the current block may be sig_coeff_flag, coeff_sign_flag, abs_level_gt1_flag, par_level_flag, abs_level_gtX_flag, and abs_remainder. Here, bins for sig_coeff_flag, coeff_sign_flag, abs_level_gt1_flag, par_level_flag, and abs_level_gtX_flag may be context-coded bins coded based on a regular coding engine, and a bin for abs_remainder may be a bypass bin coded based on a bypass coding engine.

The context-coded bins are coded using a probability state and range updated by processing a previous bin and thus exhibits high data dependency. That is, the context-coded bins may have difficulty in parallel processing because the next bin can be encoded/decoded after the current bin is completely encoded/decoded. Further, it may take a long time to derive a probability range and to determine a current state. Accordingly, the present disclosure proposes an embodiment of improving CABAC processing efficiency by reducing the number of context-coded bins and increasing the number of bypass bins.

According to embodiments of the present disclosure, it is possible to quickly switch from a coding process for syntax elements coded with a context-coded bin to a coding process for a syntax element abs_remainder coded based on a bypass coding engine, that is, coded with a bypass bin, and to reduce the number of context-coded bins.

In an embodiment, the present disclosure proposes a method of limiting the number of residual coefficients coded with sig_coeff_flag, coeff_sign_flag, abs_level_gt1_flag, and par_level_flag in a current subblock. That is, the present embodiment proposes a method of limiting the number of bins allocated for sig sig_coeff_flag, coeff_sign_flag, abs_level_gt1_flag, and par_level_flag to up to N. According to the present embodiment, residual coding may be performed on residual coefficients in a current subblock according to a scan order, and when the number of bins coded with sig_coeff_flag, coeff_sign_flag, abs_level_gt1_flag, and par_level_flag, that is, the number of coded context-coded bins, reaches N, if abs_level_gt1_flag is not coded in subsequent residual coding, coding abs_level_gtX_flag may not be performed either and may be switched to coding for abs_remainder. N may denote the specific number of context-coded bins. That is, when the number of context-coded bins for a syntax element(s) proposed within a predetermined region reaches a predetermined value, the remaining transform coefficient level values of corresponding transform coefficients and/or the transform coefficient values of subsequent transform coefficients may be coded with bypass-coded bins in abs_remainder. The same applies to other embodiments below.

For example, when the current subblock is a 4×4 subblock, N may be derived as one of 0 to 64. When the current subblock is a 2×2 subblock, N may be derived as one of 0 to 16. N may be selected by the encoding apparatus. Alternatively, N may be adaptively determined according to the size of the current block and/or the position of the current subblock in the current block. Alternatively, when the current subblock is a 4×4 subblock, N may be set to any one of 0 to 64. When the current subblock is a 2×2 subblock, N is may be set to any one of 0 to 16.

In an embodiment, the present disclosure proposes a method of limiting the number of residual coefficients coded with abs_level_gtX_flag in a current subblock. Referring to Table 14, up to four pieces of abs_level_gtX_flag may be derived for one residual coefficient in residual coding. That is, when the current subblock is a 4×4 subblock, up to 64 pieces of abs_level_gtX_flags may be coded for the current subblock. When the current subblock is a 2×2 subblock, up to 16 pieces of abs_level_gtX_flags may be coded for the current subblock.

Accordingly, the present embodiment proposes a method in which up to N pieces of abs_level_gtX_flag is coded in order to reduce the number of context-coded bins when performing residual coding on residual coefficients in a current subblock. That is, the present embodiment proposes a method of limiting the number of bins allocated for abs_level_gtX_flag to up to N. N may denote the maximum number of syntax elements abs_level_gtX_flag. For example, N may be selected by the encoding apparatus. Alternatively, N may be adaptively determined according to the size of the current block and/or the position of the current subblock in the current block. Alternatively, when the current subblock is a 4×4 subblock, N may be set to any one of 0 to 64. When the current subblock is a 2×2 subblock, N may be set to any one of 0 to 16. According to the present embodiment, residual coding may be performed on the residual coefficients in the current subblock according to the scan order, and when the number of syntax elements abs_level_gtX_flag reaches N, the residual coding may be subsequently switched to coding for abs_remainder. That is, residual coding may be performed on the residual coefficients in the current subblock according to the scan order, and when the number of bins coded with syntax element abs_level_gtX_flag, that is, coded context-coded bins, reaches N, the residual coding may be subsequently switched to coding for abs_remainder.

Furthermore, in an embodiment, the present disclosure may propose a method of combining the foregoing embodiment of limiting the total number of sig_coeff_flag, coeff_sign_flag, abs_level_gt1_flag, and par_level_flag with the embodiment of limiting the number of abs_level_gtX_flag. According to this embodiment, the total number of sig_coeff_flag, coeff_sign_flag, abs_level_gt1_flag, and par_level_flag for the current subblock may be limited to M, and the number of abs_level_gtX_flag may be limited to N. That is, the present embodiment proposes a method of limiting the total number of bins allocated for sig_coeff_flag, coeff_sign_flag, abs_level_gt1_flag, and par_level_flag to up to M and limiting the number of bins allocated for abs_level_gtX_flag to up to N. Here, when the current subblock is a 4×4 subblock, each M and N may be derived as one of 0 to 64. When the current subblock is a 2×2 subblock, each of M and N may be derived as one of 0 to 16.

In addition, in an embodiment, the present disclosure proposes a method of limiting the number of residual coefficients in one iteration statement rather than a plurality of iteration statements, for example, the total number of residual coefficients coded with sig_coeff_flag, coeff_sign_flag, abs_level_gt1_flag, par_level_flag, and abs_level_gtX_flag. The foregoing residual coding in Table 14 includes an iteration statement (pass 1) in which sig_coeff_flag, coeff_sign_flag, abs_level_gt1_flag, and par_level_flag are parsed and an iteration statement (pass 2) in which abs_level_gtX_flag is parsed. However, to improve encoding efficiency and to resolve structural complexity when encoding a block to which a transform skip is applied, the present embodiment proposes encoding and decoding (parsing) sig_coeff_flag, coeff_sign_flag, abs_level_gt1_flag, par_level_flag, and abs_level_gtX_flag in a single iteration statement. In a case where all the context-coded bins (sig_coeff_flag, coeff_sign_flag, abs_level_gt1_flag, par_level_flag, and abs_level_gtX_flag) are parsed in one iteration statement, a method of limiting the total number of context-coded bins to N is proposed.

For example, when the current subblock is a 4×4 subblock, N may be derived as one of 0 to 128. When the current subblock is a 2×2 subblock, N may be derived as one of 0 to 32. N may be selected by the encoding apparatus. Alternatively, N may be adaptively determined according to the size of the current block and/or the position of the current subblock in the current block. When the total number of context-coded bins reaches a preset maximum value of N, a syntax element using a context-coded bin may not be coded any more, and coding of abs_remainder coded using the bypass coding engine, that is, coded with a bypass bin, may be performed. That is, coding may be switched to coding for abs_remainder coded with a bypass bin.

According to another example, the present disclosure may limit the total number of residual coefficients coded with sig_coeff_flag, abs_level_gt1_flag, and par_level_flag, the number of residual coefficients coded with abs_level_gtX_flag, and the number of residual coefficients coded with coeff_sign_flag. The foregoing residual coding in Table 14 includes an iteration statement (pass 1) in which sig_coeff_flag, coeff_sign_flag, abs_level_gt1_flag, and par_level_flag are parsed and an iteration statement (pass 2) in which abs_level_gtX_flag is parsed. However, to improve encoding efficiency and to resolve structural complexity when encoding a block to which a transform skip is applied, the present embodiment may separate coeff_sign_flag from pass 1 and may encode and decode (parse) coeff_sign_flag before pass 1 (in pass 0) or after pass 2 (in pass 3).

According to the present embodiment, the total number of residual coefficients (the total number of context-coded bins of pass 1) coded with sig_coeff_flag, abs_level_gt1_flag, and par_level_flag for the current subblock may be limited to N, the number of residual coefficients (the total number of context-coded bins of pass 2) coded with abs_level_gtX_ flag may be limited to M, and the number of residual coefficients (the total number of context-coded bins of pass 0 or pass 3) coded with coeff_sign_flag may be limited to L.

Here, when the current subblock is a 4×4 subblock, N may be derived as one of 0 to 48, M may be derived as any one of 0 to 64, and L may be derived as one of 0 to 16. Alternatively, when the current subblock is a 2×2 subblock, N may be derived as one of 0 to 12, M may be derived as one of 0 to 16, and L may be derived as one of 0 to 4.

N, M, and L may be selected by the encoding apparatus. Alternatively, N, M, and L may be adaptively determined according to the size of the current block and/or the position of the current subblock in the current block.

According to another embodiment, the present disclosure may limit the total number of residual coefficients coded with sig_coeff_flag, abs_level_gt1_flag, par_level_flag, abs_level_gtX_flag and the number of residual coefficients coded with coeff_sign_flag. The foregoing residual coding in Table 14 includes an iteration statement (pass 1) in which sig_coeff_flag, coeff_sign_flag, abs_level_gt1_flag, and par_level_flag are parsed and an iteration statement (pass 2) in which abs_level_gtX_flag is parsed. However, to improve encoding efficiency and to resolve structural complexity when encoding a block to which a transform skip is applied, the present embodiment may parse sig_coeff_flag, abs_level_gt1_flag, par_level_flag, and abs_level_gtX_flag in a single iteration statement (pass 1) excluding coeff_sign_ flag and may encode and decode (parse) coeff_sign_flag, excluded from pass 1, before pass 1 (in pass 0') or after pass 2 (in pass 2').

According to the present embodiment, the total number of residual coefficients (the total number of context-coded bins of pass 1') coded with sig_coeff_flag, abs_level_gt1_flag, par_level_flag, and abs_level_gtX_flag for the current subblock may be limited to N, and the number of residual coefficients (the total number of context-coded bins of pass 0' or pass 2') coded with coeff_sign_flag may be limited to M.

Here, when the current subblock is a 4×4 subblock, N may be derived as one of 0 to 112, and M may be derived as any one of 0to 16. Alternatively, when the current subblock is a 2×2 subblock, N may be derived as one of 0 to 28, and M may be derived as one of 0 to 4.

N and M may be selected by the encoding apparatus. Alternatively, N and M may be adaptively determined according to the size of the current block and/or the position of the current subblock in the current block.

FIG. 17 schematically illustrates an image encoding method by an encoding apparatus according to the present disclosure. The method illustrated in FIG. 17 may be performed by the encoding apparatus illustrated in FIG. 2. Specifically, for example, S1700 of FIG. 17 may be performed by the subtractor of the encoding apparatus, S1710 may be performed by the transformer and the quantizer of the encoding apparatus, and S1720 to S1750 may be performed by the entropy encoder of the encoding apparatus. Further, although not shown, a process of deriving a prediction sample may be performed by the predictor of the encoding apparatus, a process of deriving reconstructed samples for a current block based on residual samples and prediction samples for the current block may be performed by the adder of the encoding apparatus, and a process of encoding prediction information on the current block may be performed by the entropy encoder of the encoding apparatus.

The encoding apparatus derives residual samples for a current block (S1700). The encoding apparatus may determine whether to perform inter prediction or intra prediction on the current block and may determine a specific inter prediction mode or a specific intra prediction mode based on RD cost. The encoding apparatus may derive prediction samples for the current block according to the determined mode and may derive the residual samples by subtracting the prediction samples from original samples for the current block.

The encoding apparatus derives transform coefficients in a current subblock of the current block based on the residual samples (S1710). The encoding apparatus may derive the transform coefficients based on the residual samples in the current subblock of the current block.

For example, the encoding apparatus may determine whether a transform is applied to the residual samples. When no transform is applied to the residual samples, the encoding apparatus may derive the derived residual samples as the transform coefficients. When the transform is applied to the residual samples, the encoding apparatus may derive the transform coefficients by transforming the derived residual samples. The transform coefficients may be included in the current subblock of the current block. The current subblock may be referred to as a current coefficient group (CG). The current subblock of the current block may have a 4×4 size or a 2×2 size. That is, the current subblock of the current block may include up to 16 non-zero transform coefficients or up to four non-zero transform coefficients.

The encoding apparatus may generate and encode a transform skip flag indicating whether the transform is applied to the transform coefficients of the current block. A bitstream may include the transform skip flag for the current block. The transform skip flag may indicate whether the transform is applied to the transform coefficients of the current block. That is, the transform skip flag may indicate whether the transform has been applied to the transform coefficients. A syntax element indicating the transform skip flag may be transform_skip_flag illustrated above.

When the value of the transform skip flag for the current block is 1, the encoding apparatus may rearrange the transform coefficients. In this case, the encoding apparatus may generate and encode residual information on the rearranged transform coefficients. For example, the encoding apparatus may rearrange the transform coefficients through various rearrangement methods. That is, the encoding apparatus may transfer the transform coefficients from a derived position to a different position through various rearrangement methods.

In one example, the encoding apparatus may rearrange the transform coefficients through a rearrangement method of 180-degree rotation. Specifically, for example, the encoding apparatus may rearrange the transform coefficients of the current block to symmetrical positions with respect to the center of the current block.

Alternatively, in one example, the encoding apparatus may rearrange the transform coefficients through a rearrangement method of antidiagonal mirroring. Specifically, for example, the encoding apparatus may rearrange the transform coefficients to symmetrical positions with respect to a right upward diagonal of the current block. Here, the right upward diagonal may refer to a right upward diagonal passing through the center of the current block.

Alternatively, in one example, the encoding apparatus may rearrange the transform coefficients through a rearrangement method of main diagonal mirroring. Specifically, for example, the encoding apparatus may rearrange the transform coefficients to symmetrical positions with respect to the left upward diagonal of the current block. Here, the left upward diagonal may refer to a left upward diagonal passing through the center of the current block.

Alternatively, in one example, the encoding apparatus may rearrange the transform coefficients through a rearrangement method of vertical flipping. Specifically, for example, the encoding apparatus may rearrange the transform coefficients of the current block to symmetrical positions with respect to a vertical axis of the current block. Here, the vertical axis may be a vertical line passing through the center of the current block.

Alternatively, in one example, the encoding apparatus may rearrange the transform coefficients through a rearrangement method of horizontal flipping. The encoding apparatus may rearrange the transform coefficients of the current block to symmetrical positions with respect to a horizontal axis of the current block. Here, the horizontal axis may be a horizontal line passing through the center of the current block.

Alternatively, in one example, the encoding apparatus may rearrange the transform coefficients through a method of deriving separate layers based on the distance to a reference sample of the current block and rearranging the layers according to an inverse raster order.

For example, the encoding apparatus may set layers for the current block based on distances from reference samples of the current block. Here, the reference samples may include top reference samples and left reference samples of the current block. For example, when the size of the current block is N×N and an x component of the position of a top-left sample position of the current block is 0 and the y component thereof is 0, the left reference samples may be p[−1][0] to p[−1][2N−1], and the top reference samples may be p[0][−1] to p[2N−1][−1]. When the size of the current block is N×N, the layers may include a first layer to an Nth layer. The Nth layer may be the last layer, and N may be equal to the width or the height of the current block. For example, the first layer may include positions from which the distance to the nearest reference sample is 1, a second layer may include positions having from which the distance to the nearest reference sample is 2, and the Nth layer may include positions from which the distance to the nearest reference sample is N.

Subsequently, the encoding apparatus may scan the transform coefficients in the inverse raster order. That is, the encoding apparatus may scan the transform coefficients of the current block from right to left and from bottom to top. Next, the encoding apparatus may rearrange the transform coefficients in the layers in the scan order. Here, the transform coefficients may be rearranged in an order from the first layer to the Nth layer. The transform coefficients may be rearranged based on a transverse-first scan or a longitudinal-first scan in the rearranged layers.

For example, the transform coefficients may be preferentially rearranged from right to left at lateral positions of the top-left position of the rearranged layers, and when there are longitudinal positions of the top-left position of the rearranged layers, the transform coefficients may be rearranged from top to bottom at the longitudinal positions of the top-left position of the rearranged layers after being arranged at the lateral positions. Alternatively, for example, the transform coefficients may be preferentially rearranged from top to bottom at longitudinal positions of the top-left position of the rearranged layers, and when there are lateral positions of the top-left position of the rearranged layers, the transform coefficients may be rearranged from left to right at the lateral positions of the top-left position of the rearranged layers after being arranged at the longitudinal positions.

Alternatively, in one example, the encoding apparatus may rearrange the transform coefficients through a method of deriving separate layers based on a distance to a reference sample of the current block and rearranging the layers according to a diagonal scan order.

For example, the encoding apparatus may set layers for the current block based on distances from reference samples of the current block. Here, the reference samples may include top reference samples and left reference samples of the current block. For example, when the size of the current block is N×N and an x component of the position of a top-left sample position of the current block is 0 and the y component thereof is 0, the left reference samples may be p[−1][0] to p[−1][2N−1], and the top reference samples may be p[0][−1] to p[2N−1][−1]. When the size of the current block is N×N, the layers may include a first layer to an Nth layer. The Nth layer may be the last layer, and N may be equal to the width or the height of the current block. For example, the first layer may include positions from which the distance to the nearest reference sample is 1, a second layer may include positions having from which the distance to the nearest reference sample is 2, and the Nth layer may include positions from which the distance to the nearest reference sample is N.

Subsequently, the encoding apparatus may scan the transform coefficients in the diagonal scan order. That is, the encoding apparatus may scan the transform coefficients of the current block from top right to bottom left and from bottom right to top left. Next, the encoding apparatus may rearrange the transform coefficients in the layers in the scan order. Here, the transform coefficients may be rearranged in an order from the first layer to the Nth layer. The transform coefficients may be rearranged based on a transverse-first scan or a longitudinal-first scan in the rearranged layers.

For example, the transform coefficients may be preferentially rearranged from right to left at lateral positions of the top-left position of the rearranged layers, and when there are longitudinal positions of the top-left position of the rearranged layers, the transform coefficients may be rearranged from top to bottom at the longitudinal positions of the top-left position of the rearranged layers after being arranged at the lateral positions. Alternatively, for example, the transform coefficients may be preferentially rearranged from top to bottom at longitudinal positions of the top-left position of the rearranged layers, and when there are lateral positions of the top-left position of the rearranged layers, the transform coefficients may be rearranged from left to right at the lateral positions of the top-left position of the rearranged layers after being arranged at the longitudinal positions.

Alternatively, for example, the encoding apparatus may set layers for the current block based on distances from top reference samples of the current block. For example, when the size of the current block is N×N and an x component of the position of a top-left sample position of the current block is 0 and the y component thereof is 0, the top reference samples may be p[0][−1] to p[2N−1][−1]. When the size of the current block is N×N, the layers may include a first layer to an Nth layer. The Nth layer may be the last layer, and N may be equal to the width or the height of the current block.

For example, the first layer may include positions from which the distance to the nearest top reference sample is 1, a second layer may include positions having from which the distance to the nearest top reference sample is 2, and the Nth layer may include positions from which the distance to the nearest top reference sample is N. That is, the first layer may be a first row of the current block, the second layer may be a second row of the current block, and the Nth layer may be an Nth row of the current block.

Subsequently, the encoding apparatus may scan the transform coefficients in the diagonal scan order. That is, the encoding apparatus may scan the transform coefficients of the current block from top right to bottom left and from bottom right to top left. Next, the encoding apparatus may rearrange the transform coefficients in the layers in the scan order. Here, the transform coefficients may be rearranged in an order from the first layer to the Nth layer. Rearrangement of the transform coefficients may be performed in the order from the first layer to the Nth layer, and the transform coefficients may be rearranged based from right to left at the positions of the rearranged layers.

Alternatively, for example, the encoding apparatus may set layers for the current block based on distances from left reference samples of the current block. For example, when the size of the current block is N×N and an x component of the position of a top-left sample position of the current block is 0 and the y component thereof is 0, the left reference samples may be p[−1][0] to p[−1][2N−1]. When the size of the current block is N×N, the layers may include a first layer to an Nth layer. The Nth layer may be the last layer, and N may be equal to the width or the height of the current block. For example, the first layer may include positions from which the distance to the nearest left reference sample is 1, a second layer may include positions having from which the distance to the nearest left reference sample is 2, and the Nth layer may include positions from which the distance to the nearest left reference sample is N. That is, the first layer may be a first column of the current block, the second layer may be a second column of the current block, and the Nth layer may be an Nth column of the current block.

Subsequently, the encoding apparatus may scan the transform coefficients in the diagonal scan order. That is, the encoding apparatus may scan the transform coefficients of the current block from top right to bottom left and from bottom right to top left. Next, the encoding apparatus may rearrange the transform coefficients in the layers in the scan order. Here, the transform coefficients may be rearranged in an order from the first layer to the Nth layer. Rearrangement of the transform coefficients may be performed in the order from the first layer to the Nth layer, and the transform coefficients may be rearranged based from top to bottom at the positions of the rearranged layers.

The encoding apparatus may determine whether to rearrange the transform coefficients based on various conditions. Alternatively, the encoding apparatus may derive a rearrangement method applied to the transform coefficients based on various conditions.

For example, the encoding apparatus may determine whether to rearrange the transform coefficients based on the transform skip flag for the current block. The transform skip flag may indicate whether the transform is applied to the transform coefficients. For example, when the value of the transform skip flag is 1, it may be determined to rearrange the transform coefficients. That is, when the value of the transform skip flag is 1, the encoding apparatus may rearrange the transform coefficients. When the value of the transform skip flag is 0, it may be determined not to rearrange the transform coefficients. That is, when the value of the transform skip flag is 0, the encoding apparatus may generate and encode residual information on the current block based on the transform coefficients rather than rearranging the transform coefficients.

Alternatively, in another example, whether to rearrange the transform coefficients may be determined based on the number of samples of the current block. For example, when the number of samples of the current block is less than a specific value, it may be determined to rearrange the transform coefficients. That is, when the number of samples of the current block is smaller than the specific value, the encoding apparatus may rearrange the transform coefficients. When the number of samples of the current block is the specific value or greater, it may be determined not to rearrange the transform coefficients. That is, when the number of samples of the current block is the specific value or greater, the encoding apparatus may generate and encode residual information on the current block based on the transform coefficients rather than rearranging the transform coefficients. The specific value may be 64.

Alternatively, for example, when the number of samples of the current block is less than 64, the encoding apparatus may rearrange the transform coefficients through the rearrangement method of 180-degree rotation. When the number of samples of the current block is 64 or greater, the encoding apparatus may not rearrange the transform coefficients.

Alternatively, in another example, a rearrangement method for the transform coefficients may be determined based on the number of samples of the current block.

For example, when the number of samples of the current block is less than 64, the encoding apparatus may rearrange the transform coefficients through the rearrangement method of 180-degree rotation, and when the number of samples of the current block is 64 or greater, the encoding apparatus may rearrange the transform coefficients through the rearrangement method of mirroring. Alternatively, in another example, when the number of samples of the current block is less than 64, the encoding apparatus may rearrange the transform coefficients through one of the rearrangement methods described above, and when the number of samples of the current block is 64 or greater, the encoding apparatus may not rearrange the transform coefficients.

Alternatively, in another example, whether to rearrange the transform coefficients may be determined based on the shape of the current block. For example, when the current block is a square block, it may be determined to rearrange the transform coefficients. That is, when the current block is a square block, the encoding apparatus may rearrange the transform coefficients. When the current block is a non-square block, it may be determined not to rearrange the transform coefficients. That is, when the current block is a non-square block, the encoding apparatus may generate and encode residual information on the current block based on the transform coefficients rather than rearranging the transform coefficients.

Alternatively, in another example, a rearrangement method for the transform coefficients may be determined based on the shape of the current block. For example, when the current block is a square block, the encoding apparatus may rearrange the transform coefficients through the rearrangement method of mirroring, and when the current block is a non-square block, the encoding apparatus may rearrange the transform coefficients through the rearrangement method of 180-degree rotation.

Alternatively, in another example, whether to rearrange the transform coefficients may be determined based on the ratio of the width of the current block to the height thereof. For example, when the ratio of the width of the current block to the height is 2 or greater or is ½ or less (i.e., when a value obtained by dividing the width of the current block by the height is 2 or greater or is ½ or less), the encoding apparatus may rearrange the transform coefficients through the rearrangement method of mirroring, and when the ratio of the width of the current block to the height is less than 2 and is greater than ½ (i.e., the value obtained by dividing the width of the current block by the height is less than 2 and is greater than ½), the encoding apparatus may generate and encode residual information on the current block based on the transform coefficients rather than rearranging the transform coefficients.

Alternatively, in another example, a rearrangement method for the transform coefficients may be determined based on the ratio of the width of the current block to the height thereof. For example, when the ratio of the width of the current block to the height is 2 or greater or is ½ or less (i.e., when a value obtained by dividing the width of the current block by the height is 2 or greater or is ½ or less), the encoding apparatus may rearrange the transform coefficients through the rearrangement method of mirroring, and when the ratio of the width of the current block to the height is less than 2 and is greater than ½ (i.e., the value obtained by dividing the width of the current block by the height is less than 2 and is greater than ½), the encoding apparatus may rearrange the transform coefficients through the rearrangement method of 180-degree rotation.

Alternatively, in another example, whether to rearrange the transform coefficients may be determined based on an intra prediction mode for the current block. For example, when the prediction direction of the intra prediction mode for the current block is a horizontal direction or the intra prediction mode for the current block is an intra prediction mode in which prediction is performed mainly using a left reference sample, the encoding apparatus may rearrange the transform coefficients through the rearrangement method vertical flipping, and in other cases, the encoding apparatus may generate and encode residual information on the current block based on the transform coefficients rather than rearranging the transform coefficients. Alternatively, for example, when the prediction direction of the intra prediction mode for the current block is a vertical direction or the intra prediction mode for the current block is an intra prediction mode in which prediction is performed mainly using a top reference sample, the encoding apparatus may rearrange the transform coefficients through the rearrangement method vertical flipping, and in other cases, the encoding apparatus may generate and encode residual information on the current block based on the transform coefficients rather than rearranging the transform coefficients.

Alternatively, in another example, a rearrangement method for the transform coefficients may be determined based on an intra prediction mode for the current block. For example, when the prediction direction of the intra prediction mode for the current block is a horizontal direction or the intra prediction mode for the current block is an intra prediction mode in which prediction is performed mainly using a left reference sample, the encoding apparatus may rearrange the transform coefficients through the rearrangement method vertical flipping, and when the prediction direction of the intra prediction mode for the current block is a vertical direction or the intra prediction mode for the current block is an intra prediction mode in which prediction is performed mainly using a top reference sample, the encoding apparatus may rearrange the transform coefficients through the rearrangement method vertical flipping.

Alternatively, in another example, whether to rearrange the transform coefficients may be determined based on a flag indicating whether to rearrange the transform coefficients, which is signaled through a high-level syntax. For example, the encoding apparatus may signal the flag indicating whether to rearrange the transform coefficients through a sequence parameter set (SPS) or a picture parameter set (PPS) and may determine whether to rearrange the transform coefficients based on the flag.

Alternatively, in another example, a rearrangement method for the transform coefficients may be determined based on information indicating the rearrangement method for the transform coefficients, which is signaled through a high-level syntax. For example, the encoding apparatus may signal the information indicating the rearrangement method for the transform coefficients through a sequence parameter set (SPS) or a picture parameter set (PPS) and may determine whether to rearrange the transform coefficients based on the information.

Alternatively, in another example, whether to rearrange the transform coefficients may be determined based on a prediction mode for the current block. For example, when the prediction mode for the current block is intra prediction, it may be determined to rearrange the transform coefficients. That is, when the prediction mode for the current block is intra prediction, the encoding apparatus may rearrange the transform coefficients. When the prediction mode for the current block is inter prediction, it may be determined not to rearrange the transform coefficients. That is, when the prediction mode for the current block is inter prediction, the encoding apparatus may generate and encode residual information on the current block based on the transform coefficients rather than rearranging the transform coefficients.

Alternatively, in another example, whether to rearrange the transform coefficients may be determined based on whether the transform coefficients are quantized. For example, when quantization has been applied to the transform coefficients, it may be determined to rearrange the transform coefficients. That is, when quantization has been applied to the transform coefficients, the encoding apparatus may rearrange the transform coefficients. When no quantization has been applied to the transform coefficients, it may be determined not to rearrange the transform coefficients. That is, when no quantization has been applied to the transform coefficients, the encoding apparatus may not rearrange the transform coefficients.

The encoding apparatus derives a specific number for the number of context-coded bins for context syntax elements for the current subblock (S1720). Here, the specific number may be the foregoing maximum value, and the maximum value may be the maximum value of the total number of context-coded bins for the context syntax elements for the transform coefficients related to the current subblock of the current block.

For example, the specific number may be derived by a unit of a transform block.

For example, the specific number may be set to an arbitrary value. When the size of the current subblock is 4×4, the specific number may be derived as one value of 0 to 64, and when the size of the current subblock is 2×2, the specific number may be derived as one value of 0 to 16. For example, the specific number may be set to 4.

Alternatively, for example, the specific number may be derived based on the size of the current block (or the current subblock in the current block). When the size of the current block (or the current subblock in the current block) is 4×4, the derived specific number may be derived as one value of 0 to 64, and when the current block (or the current subblock in the current block) is 2×2, the derived specific number may be derived as one value of 0 to 16.

Alternatively, for example, the specific number may be derived based on the size of the current block and the position of the current subblock.

Alternatively, for example, the specific number may be derived based on position information indicating the position of the last non-zero transform coefficient of the current block. For example, the position of the last non-zero transform coefficient may be derived based on the position information, and the length from the position of the starting transform coefficient in the scan order of the current block to the position of the last non-zero transform coefficient may be derived. The specific number may be derived based on the length. For example, the specific number may be derived as a value obtained by multiplying the length by 1.75. The length may correspond to the number of samples of the current block. That is, the length may be the number of samples of the current block. For example, when a transform coefficient having a value of 0 is not included in a transform coefficient array of the current block, the length may be the number of samples of the current block. That is, the specific number may be derived based on the number of samples of the current block. For example, the specific number may be derived as a value obtained by multiplying the number of samples of the current block by 1.75.

The encoding apparatus may encode the context syntax elements based on the specific number and, more specifically, may encode the different context syntax elements based on the specific number according to whether a transform skip is applied to the current block. For example, when the transform skip is applied to the current block, the encoding apparatus may encode preset context syntax elements, for example, sig_coeff_flag, coeff_sign_flag, par_level_flag, abs_level_gt1_flag, and abs_level_gtx_flag, based on a context model until the specific number for the transform coefficients arrives. (S1730). Subsequently, the encoding apparatus may encode remaining transform coefficients based on a bypass model (S1740).

For example, when the transform skip is applied to the current block, the encoding apparatus may encode the context syntax elements of a transform coefficient for the current subblock of the current block based on context. The context syntax elements may include a significant coefficient flag indicating whether the transform coefficient is a non-zero transform coefficient, a sign flag indicating the sign of the transform coefficient, a first transform coefficient level flag indicating whether the level of the transform coefficient is greater than a first threshold, a parity level flag indicating the parity of the transform coefficient level of the transform coefficient, and a second transform coefficient level flag indicating whether the transform coefficient level of the transform coefficient is greater than a second threshold. The significant coefficient flag may be sig_coeff_flag, the sign flag may be coeff_sign_flag, the first transform coefficient level flag may be abs_level_gt1_flag or abs_level_gtx_flag, the parity level flag may be par_level_flag, and the second transform coefficient level flag may be abs_level_gt3_flag or abs_level_gtx_flag. For example, when the second transform coefficient level flag is expressed as abs_level_gtx_flag, the flag may be encoded according to a certain iteration statement, and thus the second transform coefficient level flag is not a single value but may be a third transform coefficient level, a fourth transform coefficient level, a fifth transform coefficient level, or the like, which is different from the second transform coefficient level.

Alternatively, when the transform skip is not applied to the current block, the encoding apparatus may encode the context syntax elements of a transform coefficient for the current subblock of the current block based on context.

For example, the context syntax elements may include a significant coefficient flag indicating whether the transform coefficient is a non-zero transform coefficients, a first transform coefficient level flag indicating whether the level of the transform coefficient is greater than a first threshold, a parity level flag indicating the parity of the transform coefficient level of the transform coefficient, and a second transform coefficient level flag indicating whether the transform coefficient level of the transform coefficient is greater than a second threshold. The first transform coefficient level flag may be abs_level_gt1_flag or abs_level_gtx_flag, the parity level flag may be par_level_flag, and the second transform coefficient level flag may be abs_level_gt3_flag or abs_level_gtx_flag. For example, when the second transform coefficient level flag is expressed as abs_level_gtx_flag, the flag may be encoded according to a certain iteration statement, and thus the second transform coefficient level flag is not a single value but may be a third transform coefficient level, a fourth transform coefficient level, a fifth transform coefficient level, or the like, which is different from the second transform coefficient level.

Specifically, when the total number of context-coded bins of context syntax elements for transform coefficients preceding a transform coefficient in the scan order among the transform coefficients for the current subblock reaches the specific number (i.e., is the specific number or greater), signaling of context syntax elements for the transform coefficient may be omitted (i.e., the context syntax elements for the transform coefficient may not be signaled), and a bypass syntax element that is bypass-coded for the transform coefficient may be encoded. That is, the value of the transform coefficient may be coded based on the bypass syntax element that is bypass-coded.

For example, when the total number of context-coded bins for context syntax elements of transform coefficient 0 to transform coefficient n of the current subblock reaches the specific number, signaling of context syntax elements for transform coefficient n+1 of the current subblock may be omitted, and a bypass syntax element for the n+1th transform coefficient included in the residual information may be encoded. That is, the value of transform coefficient n+1 may be encoded based on the value of the bypass syntax element.

That is, for example, when the transform skip is applied to the current block, if the total number of context-coded bins for significant coefficient flags, sign flags, first transform coefficient level flags, parity level flags, and second transform coefficient level flags for transform coefficient 0 to transform coefficient n determined by the scan order among the transform coefficients for the current subblock reaches the specific number (i.e., is the specific number or greater), signaling of a significant coefficient flag, a sign flag, a first transform coefficient level flag, a parity level flag, and a second transform coefficient level flag for transform coefficient n+1 determined by the scan order may be omitted, and a bypass syntax element that is bypass-coded for quantized transform coefficient n+1 may be encoded. Here, the bypass syntax element may include abs_remainder of the absolute value of the remainder of a transform coefficient level coded at a predetermined scanning position.

In summary, in coding the transform coefficients, the abs_remainder of the absolute value of the remainder of the transform coefficient level may refer to (1) a remaining value after coding, such as significant coefficient flags, sign flags, first transform coefficient level flags, parity level flags, a second transform coefficient level flag, a third transform coefficient level, and a fifth transform coefficient level, according to a level value when the total number of context-coded bins does not reach the specific number, or (2) the absolute value of an actual transform coefficient when the total number of context-coded bins reaches the specific number.

Alternatively, for example, when the transform skip is not applied to the current block, if the total number of context-coded bins for significant coefficient flags, first transform coefficient level flags, parity level flags, and second transform coefficient level flags for transform coefficient 0 to transform coefficient n determined by the scan order among the transform coefficients for the current subblock reaches the specific number (i.e., is the specific number or greater), signaling of a significant coefficient flag, a first transform coefficient level flag, a parity level flag, and a second transform coefficient level flag for transform coefficient n+1 determined by the scan order may be omitted, and a bypass syntax element that is bypass-coded for quantized transform coefficient n+1 may be encoded. Here, the bypass syntax element may include abs_remainder of the absolute value of the remainder of a transform coefficient level coded at a predetermined scanning position and dec_abs_level indicating an intermediate value coded with a Golomb-Rice code at a scanning position.

The encoding apparatus generates a bitstream including the residual information on the current block including the encoded context syntax elements and bypass syntax elements (S1750). For example, the encoding apparatus may output image information including the residual information as a bitstream.

For example, the residual information may include syntax elements, such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, abs_level_gt1_flag, par_level_flag, abs_level_gtX_flag, abs_remainder, coeff_sign_flag, dec_abs_level, and/or mts_idx.

Specifically, for example, the residual information may include the transform skip flag for the current block. The transform skip flag may indicate whether the transform is applied to the transform coefficients of the current block. That is, the transform skip flag may indicate whether the transform has been applied to the transform coefficients. The syntax element indicating the transform skip flag may be transform_skip_flag described above.

Further, for example, the residual information may include the position information indicating the position of the last non-zero transform coefficient in the transform coefficient array of the current block. That is, the residual information may include the position information indicating the position of the last non-zero transform coefficient in the scan order of the current block. The position information may include information indicating a prefix of a column position of the last non-zero coefficient, information indicating a prefix of a row position of the last non-zero coefficient, information indicating a suffix of the column position of the last non-zero coefficient, and information indicating a suffix of the row position of the last non-zero coefficient. Syntax elements for the position information may be last_sig_coeff_x_prefix, last_sig_coeff_y_prefix, last_sig_coeff_x_suffix, and last_sig_coeff_y_suffix. The non-zero transform coefficient may also be referred to as a significant coefficient.

In addition, for example, the residual information may include context syntax elements coded based on the context of a transform coefficient in the current subblock of the current block. The context syntax elements may include a significant coefficient flag indicating whether the transform coefficient is a non-zero transform coefficient, a first transform coefficient level flag indicating whether the level of the transform coefficient is greater than a first threshold, a parity level flag indicating the parity of the transform coefficient level of the transform coefficient, and a second transform coefficient level flag indicating whether the transform coefficient level of the transform coefficient is greater than a second threshold. The significant coefficient flag may be sig_coeff_flag, the first transform coefficient level flag may be abs_level_gt1_flag, the parity level flag may be par_level_flag, and the second transform coefficient level flag may be abs_level_gt3_flag or abs_level_gtx_flag.

Alternatively, for example, the context syntax elements may include a significant coefficient flag indicating whether the transform coefficient is a non-zero transform coefficient, a sign flag indicating the sign of the transform coefficient, a first transform coefficient level flag indicating whether the level of the transform coefficient is greater than a first threshold, and a parity level flag indicating the parity of the transform coefficient level of the transform coefficient. The significant coefficient flag may be sig_coeff_flag, the sign flag may be coeff_sign_flag, the first transform coefficient level flag may be abs_level_gt1_flag, and the parity level flag may be par_level_flag.

Furthermore, for example, the residual information may include a bypass syntax element coded based on a bypass for a transform coefficient in the current subblock of the current block. The bypass syntax element may include coefficient value-related information on the value of the transform coefficient. The coefficient value-related information may be abs_remainder and/or dec_abs_level.

The bitstream may include prediction information on the current block. The prediction information may include information on an inter prediction mode or an intra prediction mode performed on the current block. The encoding apparatus may generate and encode the prediction information on the current block.

The bitstream may be transmitted to a decoding apparatus through a network or a (digital) storage medium. The network may include a broadcast network and/or a communication network, and the digital storage medium may include various storage media, such as a USB, an SD, a CD, a DVD, a Blu-ray, an HDD, and an SSD.

Figure 18:
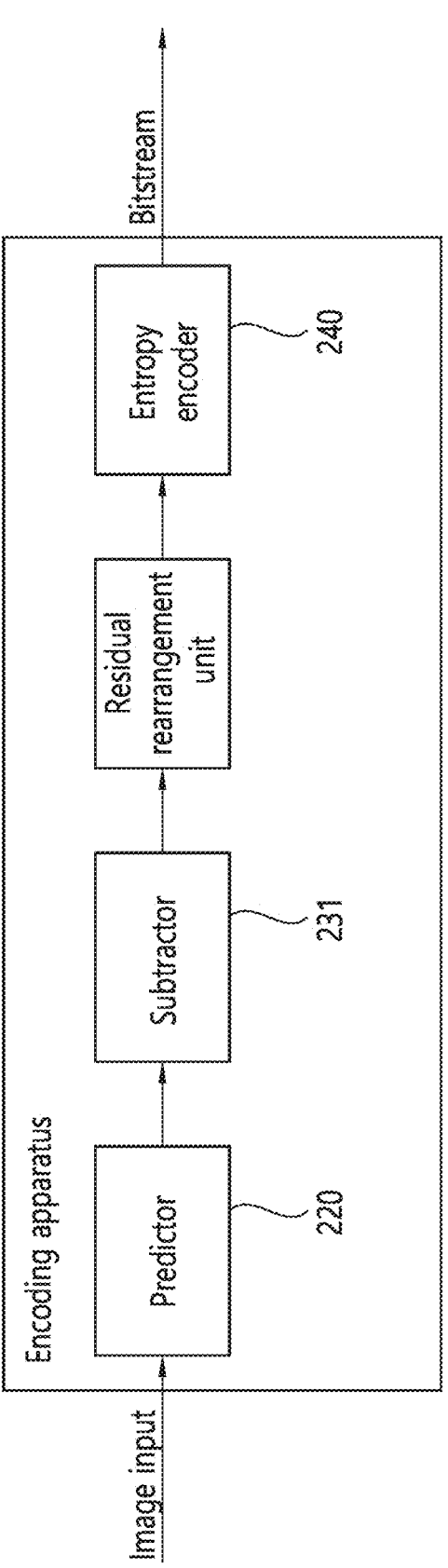
FIG. 18 schematically illustrates an encoding apparatus that performs an image encoding method according to the present disclosure.

FIG. 18 schematically illustrates an encoding apparatus that performs an image encoding method according to the present disclosure. The method illustrated in FIG. 17 may be performed by the encoding apparatus illustrated in FIG. 18. Specifically, for example, a subtractor of the encoding apparatus of FIG. 18 may perform S1700 of FIG. 17, a residual rearranger of the encoding apparatus of FIG. 18 may perform S1710 of FIG. 17, and an entropy encoder of the encoding apparatus of FIG. 18 may perform S1720 to S1750. Further, although not shown, a process of deriving a prediction sample may be performed by the predictor of the encoding apparatus, a process of deriving reconstructed samples for a current block based on residual samples and prediction samples for the current block may be performed by the adder of the encoding apparatus, and a process of encoding prediction information on the current block may be performed by the entropy encoder of the encoding apparatus.

FIG. 19 schematically illustrates an image decoding method by a decoding apparatus according to the present disclosure. The method illustrated in FIG. 19 may be performed by the decoding apparatus illustrated in FIG. 3. Specifically, for example, S1900 to S1930 of FIG. 19 may be performed by the entropy decoder of the decoding apparatus, S1940 and S1950 may be performed by the dequantizer and the inverse transformer of the decoding apparatus, and S1960 may be performed by the adder of the decoding apparatus. Further, although not shown, a process of deriving a prediction sample may be performed by the predictor of the decoding apparatus, a process of deriving reconstructed samples for a current block based on residual samples and prediction samples for the current block may be performed by the adder of the encoding apparatus, and a process of encoding prediction information on the current block may be performed by the entropy encoder of the encoding apparatus.

The decoding apparatus receives a bitstream including residual information on the current block (S1900). The decoding apparatus may receive image information including the residual information the current block through the bitstream. Here, the current block may be a coding block (CB) or a transform block (TB). The residual information may include syntax elements for a current subblock in the current block. Here, the syntax elements may include context syntax elements and bypass syntax elements. That is, the residual information may include the context syntax elements and the bypass syntax elements for the current subblock. The context syntax elements may denote syntax elements coded based on context, and the bypass syntax elements may denote bypass-coded syntax elements (i.e., syntax elements coded based on uniform probability distribution).

For example, the residual information may include syntax elements, such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, abs_level_gt1_flag, par_level_flag, abs_level_gtX_flag, abs_remainder, coeff_sign_flag, dec_abs_level, and/or mts_idx.

Specifically, for example, the residual information may include a transform skip flag for the current block. The transform skip flag may indicate whether the transform is applied to the transform coefficients of the current block. That is, the transform skip flag may indicate whether the transform has been applied to the transform coefficients. A syntax element indicating the transform skip flag may be transform_skip_flag illustrated above.

Further, for example, the residual information may include position information indicating the position of the last non-zero transform coefficient in a transform coefficient array of the current block. That is, the residual information may include the position information indicating the position of the last non-zero transform coefficient in the scan order of the current block. The position information may include information indicating a prefix of a column position of the last non-zero coefficient, information indicating a prefix of a row position of the last non-zero coefficient, information indicating a suffix of the column position of the last non-zero coefficient, and information indicating a suffix of the row position of the last non-zero coefficient. Syntax elements for the position information may be last_sig_coeff_x_prefix, last_sig_coeff_y_prefix, last_sig_coeff_x_suffix, and last_sig_coeff_y_suffix. The non-zero transform coefficient may also be referred to as a significant coefficient.

In addition, for example, the residual information may include context syntax elements coded based on the context of a transform coefficient in the current subblock of the current block. The context syntax elements may include a significant coefficient flag indicating whether the transform coefficient is a non-zero transform coefficient, a first transform coefficient level flag indicating whether the level of the transform coefficient is greater than a first threshold, a parity level flag indicating the parity of the transform coefficient level of the transform coefficient, and a second transform coefficient level flag indicating whether the transform coefficient level of the transform coefficient is greater than a second threshold. The significant coefficient flag may be sig_coeff_flag, the first transform coefficient level flag may be abs_level_gt1_flag, the parity level flag may be par_level_flag, and the second transform coefficient level flag may be abs_level_gt3_flag or abs_level_gtx_flag.

Alternatively, for example, the context syntax elements may include a significant coefficient flag indicating whether the transform coefficient is a non-zero transform coefficient, a sign flag indicating the sign of the transform coefficient, a first transform coefficient level flag indicating whether the level of the transform coefficient is greater than a first threshold, and a parity level flag indicating the parity of the transform coefficient level of the transform coefficient. The significant coefficient flag may be sig_coeff_flag, the sign flag may be coeff_sign_flag, the first transform coefficient level flag may be abs_level_gt1_flag, and the parity level flag may be par_level_flag.

Furthermore, for example, the residual information may include a bypass syntax element coded based on a bypass for a transform coefficient in the current subblock of the current block. The bypass syntax element may include coefficient value-related information on the value of the transform coefficient. The coefficient value-related information may be abs_remainder and/or dec_abs_level.

The bitstream may include prediction information on the current block. The prediction information may include information on an inter prediction mode or an intra prediction mode performed on the current block. The decoding apparatus may perform inter prediction or intra prediction on the current block based on the prediction information received through the bitstream and may derive prediction samples of the current block.

The decoding apparatus derives a specific number for the number of context-coded bins for the context syntax elements for the current subblock of the current block (S1910). Here, the specific number may be the foregoing maximum value, and the maximum value may be the maximum value of the total number of context-coded bins for the context syntax elements for the transform coefficients related to the current subblock of the current block.

For example, the specific number may be derived by a unit of a transform block.

For example, the specific number may be set to an arbitrary value. When the size of the current subblock is 4×4, the specific number may be derived as one value of 0 to 64, and when the size of the current subblock is 2×2, the specific number may be derived as one value of 0 to 16. For example, the specific number may be set to 4.

Alternatively, for example, the specific number may be derived based on the size of the current block (or the current subblock in the current block). When the size of the current block (or the current subblock in the current block) is 4×4, the derived specific number may be derived as one value of 0 to 64, and when the current block (or the current subblock in the current block) is 2×2, the derived specific number may be derived as one value of 0 to 16.

Alternatively, for example, the specific number may be derived based on the size of the current block and the position of the current subblock.

Alternatively, for example, the specific number may be derived based on position information indicating the position of the last non-zero transform coefficient of the current block. For example, the position of the last non-zero transform coefficient may be derived based on the position information, and the length from the position of the starting transform coefficient in the scan order of the current block to the position of the last non-zero transform coefficient may be derived. The specific number may be derived based on the length. For example, the specific number may be derived as a value obtained by multiplying the length by 1.75. The length may correspond to the number of samples of the current block. That is, the length may be the number of samples of the current block. For example, when a transform coefficient having a value of 0 is not included in a transform coefficient array of the current block, the length may be the number of samples of the current block. That is, the specific number may be derived based on the number of samples of the current block. For example, the specific number may be derived as a value obtained by multiplying the number of samples of the current block by 1.75.

The decoding apparatus may decode the context syntax elements for the current subblock included in the residual information based on the specific number and, more specifically, may decode the different context syntax elements based on the specific number according to whether a transform skip is applied to the current block. For example, when the transform skip is applied to the current block, the decoding apparatus may decode preset context syntax elements, for example, sig_coeff_flag, coeff_sign_flag, abs_level_gt1_flag, par_level_flag, and abs_level_gtx_flag, based on a context model until the specific number for the transform coefficients arrives. (S1920). Subsequently, the decoding apparatus may decode remaining transform coefficients based on a bypass model (S1930).

For example, when the transform skip is applied to the current block, the decoding apparatus may decode the context syntax elements of a transform coefficient for the current subblock of the current block based on context. The context syntax elements may include a significant coefficient flag indicating whether the transform coefficient is a non-zero transform coefficient, a sign flag indicating the sign of the transform coefficient, a first transform coefficient level flag indicating whether the level of the transform coefficient is greater than a first threshold, a parity level flag indicating the parity of the transform coefficient level of the transform coefficient, and a second transform coefficient level flag indicating whether the transform coefficient level of the transform coefficient is greater than a second threshold. The significant coefficient flag may be sig_coeff_flag, the sign flag may be coeff_sign_flag, the first transform coefficient level flag may be abs_level_gt1_flag or abs_level_gtx_flag, the parity level flag may be par_level_flag, and the second transform coefficient level flag may be abs_level_gt3_flag or abs_level_gtx_flag. For example, when the second transform coefficient level flag is expressed as abs_level_gtx_flag, the flag may be encoded according to a certain iteration statement, and thus the second transform coefficient level flag is not a single value but may be a third transform coefficient level, a fourth transform coefficient level, a fifth transform coefficient level, or the like, which is different from the second transform coefficient level.

Alternatively, when the transform skip is not applied to the current block, the decoding apparatus may decode the context syntax elements of a transform coefficient for the current subblock of the current block based on context.

For example, the context syntax elements may include a significant coefficient flag indicating whether the transform coefficient is a non-zero transform coefficients, a first transform coefficient level flag indicating whether the level of the transform coefficient is greater than a first threshold, a parity level flag indicating the parity of the transform coefficient level of the transform coefficient, and a second transform coefficient level flag indicating whether the transform coefficient level of the transform coefficient is greater than a second threshold. The first transform coefficient level flag may be abs_level_gt1_flag or abs_level_gtx_flag, the parity level flag may be par_level_flag, and the second transform coefficient level flag may be abs_level_gt3_flag or abs_level_gtx_flag. For example, when the second transform coefficient level flag is expressed as abs_level_gtx_flag, the flag may be encoded according to a certain iteration statement, and thus the second transform coefficient level flag is not a single value but may be a third transform coefficient level, a fourth transform coefficient level, a fifth transform coefficient level, or the like, which is different from the second transform coefficient level.

Specifically, when the total number of context-coded bins of context syntax elements for transform coefficients preceding a transform coefficient in the scan order among the transform coefficients for the current subblock reaches the specific number (i.e., is the specific number or greater), signaling of context syntax elements for the transform coefficient may be omitted (i.e., the context syntax elements for the transform coefficient may not be signaled), a bypass syntax element that is bypass-coded for the transform coefficient may be decoded, and the value of the transform coefficient may be derived based on the decoded bypass syntax element. That is, the value of the transform coefficient may be derived based on the bypass syntax element that is bypass-coded.

For example, when the total number of context-coded bins for context syntax elements of transform coefficient 0 to transform coefficient n of the current subblock reaches the specific number, signaling of context syntax elements for transform coefficient n+1 of the current subblock may be omitted, and a bypass syntax element for the n+1th transform coefficient included in the residual information may be decoded. That is, the value of transform coefficient n+1 may be decoded based on the value of the bypass syntax element.

That is, for example, when the transform skip is applied to the current block, if the total number of context-coded bins for significant coefficient flags, sign flags, first transform coefficient level flags, parity level flags, and second transform coefficient level flags for transform coefficient 0 to transform coefficient n determined by the scan order among the transform coefficients for the current subblock reaches the specific number (i.e., is the specific number or greater), signaling of a significant coefficient flag, a sign flag, a first transform coefficient level flag, a parity level flag, and a second transform coefficient level flag for transform coefficient n+1 determined by the scan order may be omitted, a bypass syntax element that is bypass-coded for quantized transform coefficient n+1 may be decoded, and the value of quantized transform coefficient n+1 may be derived based on the value of the bypass syntax element. Here, the bypass syntax element may include abs_remainder of the absolute value of the remainder of a transform coefficient level coded at a predetermined scanning position.

In summary, in decoding the transform coefficients, the abs_remainder of the absolute value of the remainder of the transform coefficient level may refer to (1) a remaining value after coding, such as significant coefficient flags, sign flags, first transform coefficient level flags, parity level flags, a second transform coefficient level flag, a third transform coefficient level, and a fifth transform coefficient level, according to a level value when the total number of context-coded bins does not reach the specific number, or (2) the absolute value of an actual transform coefficient when the total number of context-coded bins reaches the specific number.

Alternatively, for example, when the transform skip is not applied to the current block, if the total number of context-coded bins for significant coefficient flags, first transform coefficient level flags, parity level flags, and second transform coefficient level flags for transform coefficient 0 to transform coefficient n determined by the scan order among the transform coefficients for the current subblock reaches the specific number (i.e., is the specific number or greater), signaling of a significant coefficient flag, a first transform coefficient level flag, a parity level flag, and a second transform coefficient level flag for transform coefficient n+1 determined by the scan order may be omitted, a bypass syntax element that is bypass-coded for quantized transform coefficient n+1 may be decoded, and the value of quantized transform coefficient n+1 may be derived based on the value of the bypass syntax element. Here, the bypass syntax element may include abs_remainder of the absolute value of the remainder of a transform coefficient level coded at a predetermined scanning position and dec_abs_level indicating an intermediate value coded with a Golomb-Rice code at a scanning position.

The decoding apparatus derives transform coefficients for the current subblock based on the decoded context syntax elements and bypass syntax elements (S1940).

The decoding apparatus may derive the transform coefficients based on the entropy-decoded context syntax elements for the transform coefficient. The residual information may also include a sign flag indicating the sign of the transform coefficient. The decoding apparatus may derive the sign of the transform coefficient based on the sign flag. A syntax element indicating the sign flag may be coeff_sign_flag. For example, the decoding apparatus may derive the transform coefficient based on the value of the transform coefficient and the sign.

The decoding apparatus derives residual samples for the current block based on the transform coefficients (S1950). For example, the decoding apparatus may derive the residual samples for the current block based on the transform coefficients. That is, the decoding apparatus may derive residual samples for the current subblock in the current block based on the transform coefficients.

For example, when the value of the transform skip flag for the current block is 1, the decoding apparatus may derive the residual samples for the current block based on the transform coefficients. For example, when the value of the transform skip flag for the current block is 1, the decoding apparatus may derive the residual samples for the current block by dequantizing the transform coefficients.

Alternatively, when the value of the transform skip flag for the current block is 1, the decoding apparatus may rearrange the transform coefficients and may derive the rearranged transform coefficients as the residual samples for the current block. For example, the decoding apparatus may rearrange the transform coefficients using various rearrangement methods. That is, the decoding apparatus may transfer the transform coefficients from a derived position to a different position through various rearrangement methods.

In one example, the decoding apparatus may rearrange the transform coefficients through a rearrangement method of 180-degree rotation. Specifically, for example, the decoding apparatus may rearrange the transform coefficients of the current block to symmetrical positions with respect to the center of the current block.

Alternatively, in one example, the decoding apparatus may rearrange the transform coefficients through a rearrangement method of antidiagonal mirroring. Specifically, for example, the decoding apparatus may rearrange the transform coefficients to symmetrical positions with respect to a right upward diagonal of the current block. Here, the right upward diagonal may refer to a right upward diagonal passing through the center of the current block.

Alternatively, in one example, the decoding apparatus may rearrange the transform coefficients through a rearrangement method of main diagonal mirroring. Specifically, for example, the decoding apparatus may rearrange the transform coefficients to symmetrical positions with respect to the left upward diagonal of the current block. Here, the left upward diagonal may refer to a left upward diagonal passing through the center of the current block.

Alternatively, in one example, the decoding apparatus may rearrange the transform coefficients through a rearrangement method of vertical flipping. Specifically, for example, the decoding apparatus may rearrange the transform coefficients of the current block to symmetrical positions with respect to a vertical axis of the current block. Here, the vertical axis may be a vertical line passing through the center of the current block.

Alternatively, in one example, the decoding apparatus may rearrange the transform coefficients through a rearrangement method of horizontal flipping. The decoding apparatus may rearrange the transform coefficients of the current block to symmetrical positions with respect to a horizontal axis of the current block. Here, the horizontal axis may be a horizontal line passing through the center of the current block.

Alternatively, in one example, the decoding apparatus may rearrange the transform coefficients through a method of deriving separate layers based on the distance to a reference sample of the current block and rearranging the layers according to an inverse raster order.

For example, the decoding apparatus may set layers for the current block based on distances from reference samples of the current block. Here, the reference samples may include top reference samples and left reference samples of the current block. For example, when the size of the current block is N×N and an x component of the position of a top-left sample position of the current block is 0 and the y component thereof is 0, the left reference samples may be $p[-1][0]$ to $p[-1][2N-1]$, and the top reference samples may be $p[0][-1]$ to $p[2N-1][-1]$. When the size of the current block is N×N, the layers may include a first layer to an Nth layer. The Nth layer may be the last layer, and N may be equal to the width or the height of the current block. For example, the first layer may include positions from which the distance to the nearest reference sample is 1, a second layer may include positions having from which the distance to the nearest reference sample is 2, and the Nth layer may include positions from which the distance to the nearest reference sample is N.

Subsequently, the decoding apparatus may scan the transform coefficients in the inverse raster order. That is, the decoding apparatus may scan the transform coefficients of the current block from right to left and from bottom to top. Next, the decoding apparatus may rearrange the transform coefficients in the layers in the scan order. Here, the transform coefficients may be rearranged in an order from the first layer to the Nth layer. The transform coefficients may be rearranged based on a transverse-first scan or a longitudinal-first scan in the rearranged layers.

For example, the transform coefficients may be preferentially rearranged from right to left at lateral positions of the top-left position of the rearranged layers, and when there are longitudinal positions of the top-left position of the rearranged layers, the transform coefficients may be rearranged from top to bottom at the longitudinal positions of the top-left position of the rearranged layers after being arranged at the lateral positions. Alternatively, for example, the transform coefficients may be preferentially rearranged from top to bottom at longitudinal positions of the top-left position of the rearranged layers, and when there are lateral positions of the top-left position of the rearranged layers, the transform coefficients may be rearranged from left to right at the lateral positions of the top-left position of the rearranged layers after being arranged at the longitudinal positions.

Alternatively, in one example, the decoding apparatus may rearrange the transform coefficients through a method of deriving separate layers based on a distance to a reference sample of the current block and rearranging the layers according to a diagonal scan order.

For example, the decoding apparatus may set layers for the current block based on distances from reference samples of the current block. Here, the reference samples may include top reference samples and left reference samples of the current block. For example, when the size of the current block is N×N and an x component of the position of a top-left sample position of the current block is 0 and the y component thereof is 0, the left reference samples may be p[−1][0] to p[−1][2N−1], and the top reference samples may be p[0][−1] to p[2N−1][−1]. When the size of the current block is N×N, the layers may include a first layer to an Nth layer. The Nth layer may be the last layer, and N may be equal to the width or the height of the current block. For example, the first layer may include positions from which the distance to the nearest reference sample is 1, a second layer may include positions having from which the distance to the nearest reference sample is 2, and the Nth layer may include positions from which the distance to the nearest reference sample is N.

Subsequently, the decoding apparatus may scan the transform coefficients in the diagonal scan order. That is, the decoding apparatus may scan the transform coefficients of the current block from top right to bottom left and from bottom right to top left. Next, the decoding apparatus may rearrange the transform coefficients in the layers in the scan order. Here, the transform coefficients may be rearranged in an order from the first layer to the Nth layer. The transform coefficients may be rearranged based on a transverse-first scan or a longitudinal-first scan in the rearranged layers.

For example, the transform coefficients may be preferentially rearranged from right to left at lateral positions of the top-left position of the rearranged layers, and when there are longitudinal positions of the top-left position of the rearranged layers, the transform coefficients may be rearranged from top to bottom at the longitudinal positions of the top-left position of the rearranged layers after being arranged at the lateral positions. Alternatively, for example, the transform coefficients may be preferentially rearranged from top to bottom at longitudinal positions of the top-left position of the rearranged layers, and when there are lateral positions of the top-left position of the rearranged layers, the transform coefficients may be rearranged from left to right at the lateral positions of the top-left position of the rearranged layers after being arranged at the longitudinal positions.

Alternatively, for example, the decoding apparatus may set layers for the current block based on distances from top reference samples of the current block. For example, when the size of the current block is N×N and an x component of the position of a top-left sample position of the current block is 0 and the y component thereof is 0, the top reference samples may be p[0][−1] to p[2N−1][−1]. When the size of the current block is N×N, the layers may include a first layer to an Nth layer. The Nth layer may be the last layer, and N may be equal to the width or the height of the current block. For example, the first layer may include positions from which the distance to the nearest top reference sample is 1, a second layer may include positions having from which the distance to the nearest top reference sample is 2, and the Nth layer may include positions from which the distance to the nearest top reference sample is N. That is, the first layer may be a first row of the current block, the second layer may be a second row of the current block, and the Nth layer may be an Nth row of the current block.

Subsequently, the decoding apparatus may scan the transform coefficients in the diagonal scan order. That is, the decoding apparatus may scan the transform coefficients of the current block from top right to bottom left and from bottom right to top left. Next, the decoding apparatus may rearrange the transform coefficients in the layers in the scan order. Here, the transform coefficients may be rearranged in an order from the first layer to the Nth layer. Rearrangement of the transform coefficients may be performed in the order from the first layer to the Nth layer, and the transform coefficients may be rearranged based from right to left at the positions of the rearranged layers.

Alternatively, for example, the decoding apparatus may set layers for the current block based on distances from left reference samples of the current block. For example, when the size of the current block is N×N and an x component of the position of a top-left sample position of the current block is 0 and the y component thereof is 0, the left reference samples may be p[−1][0] to p[−1][2N−1]. When the size of the current block is N×N, the layers may include a first layer to an Nth layer. The Nth layer may be the last layer, and N may be equal to the width or the height of the current block. For example, the first layer may include positions from which the distance to the nearest left reference sample is 1, a second layer may include positions having from which the distance to the nearest left reference sample is 2, and the Nth layer may include positions from which the distance to the nearest left reference sample is N. That is, the first layer may be a first column of the current block, the second layer may be a second column of the current block, and the Nth layer may be an Nth column of the current block.

Subsequently, the decoding apparatus may scan the transform coefficients in the diagonal scan order. That is, the decoding apparatus may scan the transform coefficients of the current block from top right to bottom left and from bottom right to top left. Next, the decoding apparatus may rearrange the transform coefficients in the layers in the scan order. Here, the transform coefficients may be rearranged in an order from the first layer to the Nth layer. Rearrangement of the transform coefficients may be performed in the order from the first layer to the Nth layer, and the transform coefficients may be rearranged based from top to bottom at the positions of the rearranged layers.

The decoding apparatus may determine whether to rearrange the transform coefficients based on various conditions. Alternatively, the decoding apparatus may derive a rearrangement method applied to the transform coefficients based on various conditions.

For example, the decoding apparatus may receive the transform skip flag for the current block and may determine whether to rearrange the transform coefficients based on the transform skip flag. The transform skip flag may indicate whether the transform is applied to the transform coefficients. For example, when the value of the transform skip flag is 1, it may be determined to rearrange the transform coefficients. That is, when the value of the transform skip flag is 1, the decoding apparatus may rearrange the transform coefficients. When the value of the transform skip flag is 0, it may be determined not to rearrange the transform coefficients. That is, when the value of the transform skip flag is 0, the decoding apparatus may derive the residual samples for the current block based on the transform coefficients rather than rearranging the transform coefficients.

Alternatively, in another example, whether to rearrange the transform coefficients may be determined based on the number of samples of the current block. For example, when the number of samples of the current block is less than a specific value, it may be determined to rearrange the transform coefficients. That is, when the number of samples of the current block is smaller than the specific value, the decoding apparatus may rearrange the transform coefficients. When the number of samples of the current block is the specific value or greater, it may be determined not to rearrange the transform coefficients. That is, when the number of samples of the current block is the specific value or greater, the decoding apparatus may derive the residual samples for the current block based on the transform coefficients rather than rearranging the transform coefficients. The specific value may be 64.

Alternatively, for example, when the number of samples of the current block is less than 64, the decoding apparatus may rearrange the transform coefficients through the rearrangement method of 180-degree rotation. When the number of samples of the current block is 64 or greater, the decoding apparatus may not rearrange the transform coefficients.

Alternatively, in another example, a rearrangement method for the transform coefficients may be determined based on the number of samples of the current block.

For example, when the number of samples of the current block is less than 64, the decoding apparatus may rearrange the transform coefficients through the rearrangement method of 180-degree rotation, and when the number of samples of the current block is 64 or greater, the decoding apparatus may rearrange the transform coefficients through the rearrangement method of mirroring. Alternatively, in another example, when the number of samples of the current block is less than 64, the decoding apparatus may rearrange the transform coefficients through one of the rearrangement methods described above, and when the number of samples of the current block is 64 or greater, the decoding apparatus may not rearrange the transform coefficients.

Alternatively, in another example, whether to rearrange the transform coefficients may be determined based on the shape of the current block. For example, when the current block is a square block, it may be determined to rearrange the transform coefficients. That is, when the current block is a square block, the decoding apparatus may rearrange the transform coefficients. When the current block is a non-square block, it may be determined not to rearrange the transform coefficients. That is, when the current block is a non-square block, the decoding apparatus may derive the residual samples for the current block based on the transform coefficients rather than rearranging the transform coefficients.

Alternatively, in another example, a rearrangement method for the transform coefficients may be determined based on the shape of the current block. For example, when the current block is a square block, the decoding apparatus may rearrange the transform coefficients through the rearrangement method of mirroring, and when the current block is a non-square block, the decoding apparatus may rearrange the transform coefficients through the rearrangement method of 180-degree rotation.

Alternatively, in another example, whether to rearrange the transform coefficients may be determined based on the ratio of the width of the current block to the height thereof. For example, when the ratio of the width of the current block to the height is 2 or greater or is ½ or less (i.e., when a value obtained by dividing the width of the current block by the height is 2 or greater or is ½ or less), the decoding apparatus may rearrange the transform coefficients through the rearrangement method of mirroring, and when the ratio of the width of the current block to the height is less than 2 and is greater than ½ (i.e., the value obtained by dividing the width of the current block by the height is less than 2 and is greater than ½), the decoding apparatus may derive the residual samples for the current block based on the transform coefficients rather than rearranging the transform coefficients.

Alternatively, in another example, a rearrangement method for the transform coefficients may be determined based on the ratio of the width of the current block to the height thereof. For example, when the ratio of the width of the current block to the height is 2 or greater or is ½ or less (i.e., when a value obtained by dividing the width of the current block by the height is 2 or greater or is ½ or less), the decoding apparatus may rearrange the transform coefficients through the rearrangement method of mirroring, and when the ratio of the width of the current block to the height is less than 2 and is greater than ½ (i.e., the value obtained by dividing the width of the current block by the height is less than 2 and is greater than ½), the decoding apparatus may rearrange the transform coefficients through the rearrangement method of 180-degree rotation.

Alternatively, in another example, whether to rearrange the transform coefficients may be determined based on an intra prediction mode for the current block. For example, when the prediction direction of the intra prediction mode for the current block is a horizontal direction or the intra prediction mode for the current block is an intra prediction mode in which prediction is performed mainly using a left reference sample, the decoding apparatus may rearrange the transform coefficients through the rearrangement method vertical flipping, and in other cases, the decoding apparatus may derive the residual samples for the current block based on the transform coefficients rather than rearranging the transform coefficients. Alternatively, for example, when the prediction direction of the intra prediction mode for the current block is a vertical direction or the intra prediction mode for the current block is an intra prediction mode in which prediction is performed mainly using a top reference sample, the decoding apparatus may rearrange the transform coefficients through the rearrangement method vertical flipping, and in other cases, the decoding apparatus may derive the residual samples for the current block based on the transform coefficients rather than rearranging the transform coefficients.

Alternatively, in another example, a rearrangement method for the transform coefficients may be determined based on an intra prediction mode for the current block. For example, when the prediction direction of the intra prediction mode for the current block is a horizontal direction or the intra prediction mode for the current block is an intra prediction mode in which prediction is performed mainly using a left reference sample, the decoding apparatus may rearrange the transform coefficients through the rearrangement method vertical flipping, and when the prediction direction of the intra prediction mode for the current block is a vertical direction or the intra prediction mode for the current block is an intra prediction mode in which prediction is performed mainly using a top reference sample, the decoding apparatus may rearrange the transform coefficients through the rearrangement method vertical flipping.

Alternatively, in another example, whether to rearrange the transform coefficients may be determined based on a flag indicating whether to rearrange the transform coefficients, which is received through a high-level syntax. For example, the decoding apparatus may receive the flag indicating whether to rearrange the transform coefficients through a sequence parameter set (SPS) or a picture parameter set (PPS) and may determine whether to rearrange the transform coefficients based on the flag.

Alternatively, in another example, a rearrangement method for the transform coefficients may be determined based on information indicating the rearrangement method for the transform coefficients, which is received through a high-level syntax. For example, the decoding apparatus may receive the information indicating the rearrangement method for the transform coefficients through a sequence parameter set (SPS) or a picture parameter set (PPS) and may determine whether to rearrange the transform coefficients based on the information.

Alternatively, in another example, whether to rearrange the transform coefficients may be determined based on a prediction mode for the current block. For example, when the prediction mode for the current block is intra prediction, it may be determined to rearrange the transform coefficients. That is, when the prediction mode for the current block is intra prediction, the decoding apparatus may rearrange the transform coefficients. When the prediction mode for the current block is inter prediction, it may be determined not to rearrange the transform coefficients. That is, when the prediction mode for the current block is inter prediction, the decoding apparatus may derive the residual samples for the current block based on the transform coefficients rather than rearranging the transform coefficients.

Alternatively, in another example, whether to rearrange the transform coefficients may be determined based on whether the transform coefficients are quantized. For example, when quantization has been applied to the transform coefficients, it may be determined to rearrange the transform coefficients. That is, when quantization has been applied to the transform coefficients, the decoding apparatus may rearrange the transform coefficients. When no quantization has been applied to the transform coefficients, it may be determined not to rearrange the transform coefficients. That is, when no quantization has been applied to the transform coefficients, the decoding apparatus may derive the residual samples for the current block based on the transform coefficients rather than rearranging the transform coefficients.

Alternatively, for example, when the value of the transform skip flag for the current block is 0, the decoding apparatus may derive the residual samples for the current block by inversely transforming the transform coefficients. Alternatively, for example, when the value of the transform skip flag for the current block is 0, the decoding apparatus may dequantize the transform coefficients and may inversely transform the dequantized transform coefficients, thereby deriving the residual samples for the current block.

The decoding apparatus may generate a reconstructed picture based on the residual samples (S1960). For example, the decoding apparatus may derive a prediction sample by performing an inter prediction mode or an intra prediction mode on the current block based on the prediction information received through the bitstream and may generate the reconstructed picture by adding the prediction sample and the residual sample. For example, the prediction information may include information indicating an intra prediction mode for the current block. Alternatively, the prediction information may include motion information on the current block.

Subsequently, as described above, if necessary, an in-loop filtering procedure, such as deblocking filtering, SAO, and/or ALF procedures, may be applied to the reconstructed picture in order to improve subjective/objective image quality.

Figure 20:
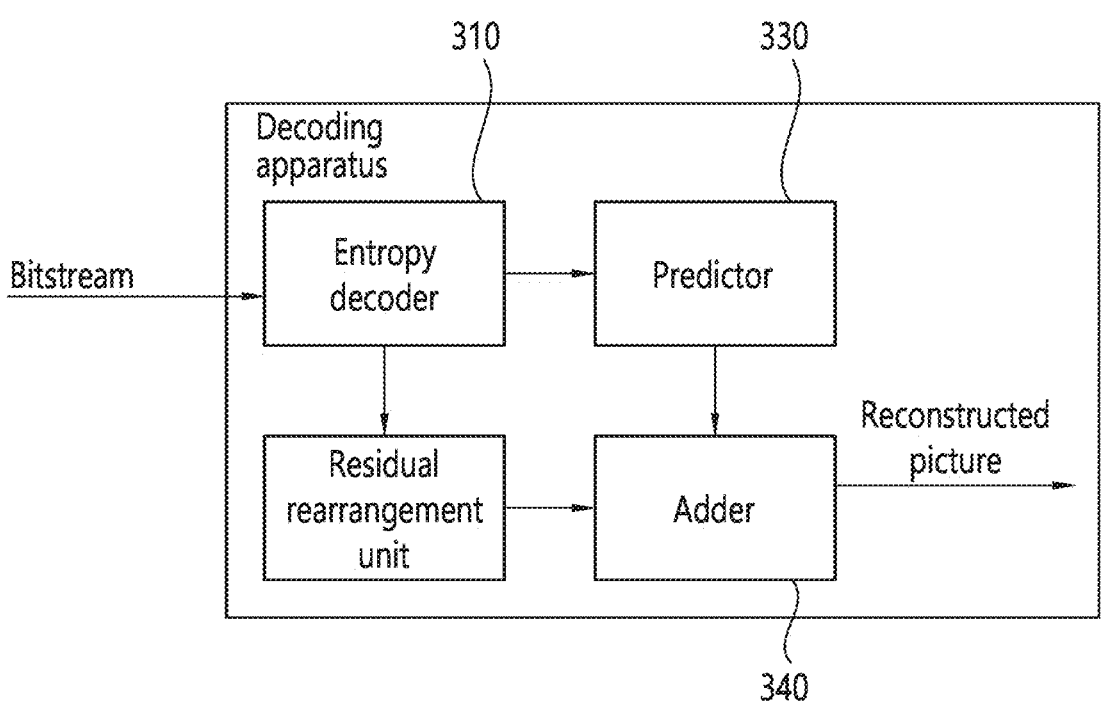
FIG. 20 schematically illustrates a decoding apparatus that performs an image decoding method according to the present disclosure.

FIG. 20 schematically illustrates a decoding apparatus that performs an image decoding method according to the present disclosure. The method illustrated in FIG. 19 may be performed by the decoding apparatus illustrated in FIG. 20. Specifically, for example, an entropy decoder of the decoding apparatus of FIG. 20 may perform S1900 to S1930 of FIG. 19, a residual rearranger of the decoding apparatus of FIG. 20 may perform S1940 and S1950 of FIG. 19, and an adder of the decoding apparatus of FIG. 20 may perform S1960 of FIG. 19. Further, although not shown, a process of obtaining the prediction information on the current block through the bitstream may be performed by the entropy decoder of the decoding apparatus of FIG. 20, and a process of deriving the prediction sample for the current block based on the prediction information may be performed by a predictor of the decoding apparatus of FIG. 20.

According to the foregoing present disclosure, it is possible to increase the efficiency of residual coding.

Further, according to the present disclosure, the total number of context-coded bins for context syntax elements for transform coefficients in a current block, which is included in residual information, may be limited to a predetermined specific number or less, thereby reducing data coded based on context.

In addition, according to the present disclosure, the number of context-coded bins for a current subblock may be adjusted considering the total number of context-coded bins for context syntax elements rather than considering coding of each context syntax element, thus reducing the complexity of residual coding and improving overall coding efficiency.

In the foregoing embodiments, although the methods are explained based on flowcharts including a series of steps or blocks, the present disclosure is not limited to the order of steps, and a certain step may be performed in order or step different from that described above or may be performed concurrently with another step. Further, it may be understood by a person having ordinary skill in the art that steps shown in a flowchart are not exclusive and that another step may be incorporated or one or more steps of the flowchart may be removed without departing from the scope of the present disclosure.

The embodiments illustrated in the present disclosure may be embodied and performed on a processor, a microprocessor, a controller, or a chip. For example, functional units shown in each drawing may be embodied and performed on a computer, a processor, a microprocessor, a controller, or a chip. In this case, information for implementation (e.g., information on instructions) or algorithms may be stored in a digital storage medium.

Further, a decoding apparatus and an encoding apparatus to which the embodiments of the present disclosure are applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video-on-demand (VoD) service providing device, an over-the-top (OTT) video device, an Internet streaming service providing device, a three-dimensional (3D) video device, a video telephony video device, a transportation terminal (e.g., an in-vehicle terminal, an airplane terminal, a vessel terminal, or the like), and a medical video device, and may be used to process a video signal or a data signal. For example, the over-the-top (OTT) video device may include a game console, a Blu-ray player, an Internet access TV, a Home theater system, a smartphone, a Tablet PC, a digital video recorder (DVR) and the like.

In addition, a processing method to which the embodiments of the present disclosure are applied may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (e.g., transmission over the Internet). In addition, a bitstream generated by the encoding method may be stored in a computer-readable recording medium or transmitted through a wired or wireless communication network.

Additionally, the embodiments of the present disclosure may be embodied as a computer program product by program codes, and the program codes may be executed on a computer by the embodiments of the present disclosure. The program codes may be stored on a computer-readable carrier.

Figure 21:
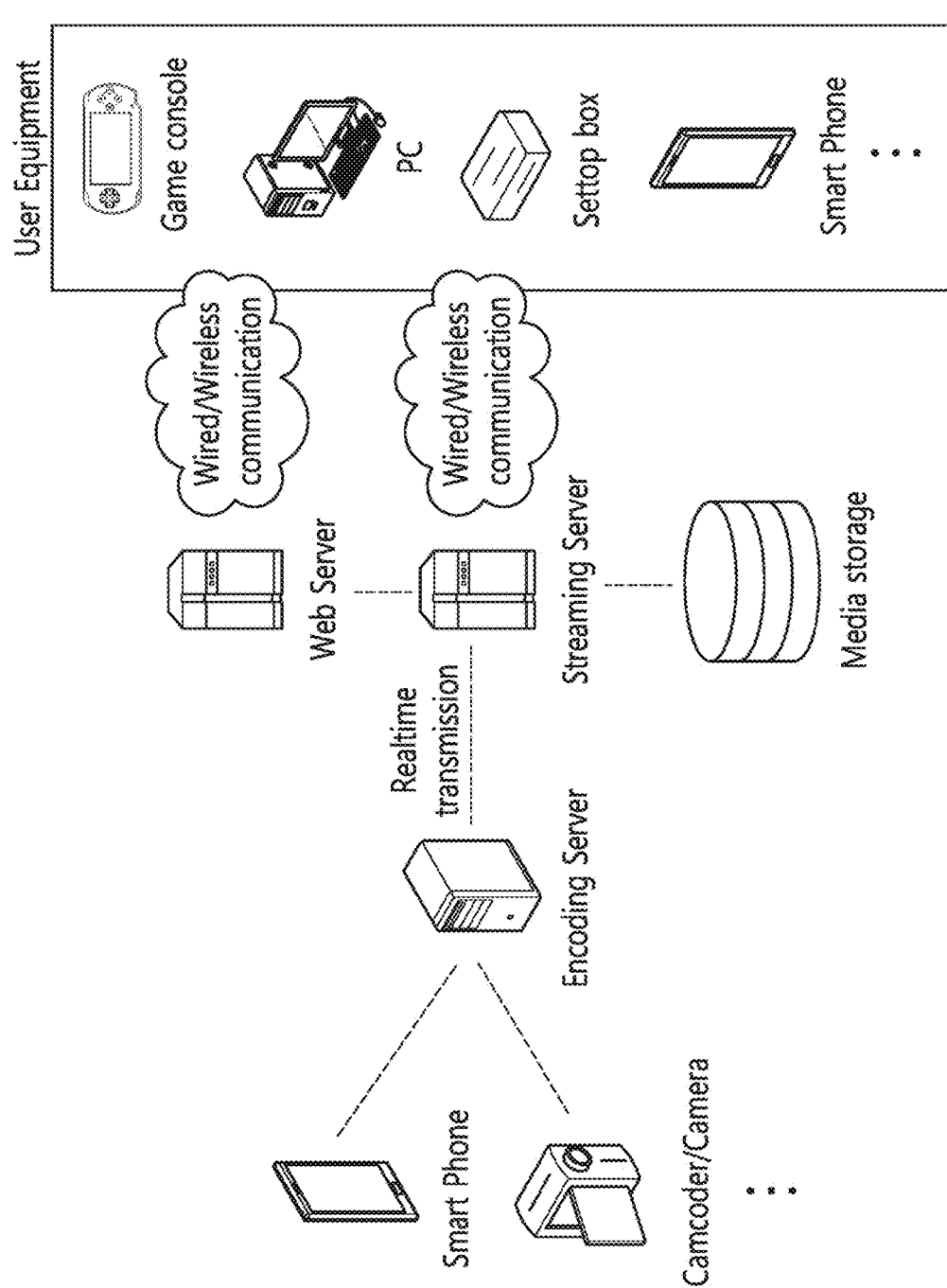
FIG. 21 illustrates the structure of a content streaming system to which the embodiments of the present disclosure are applied.

FIG. 21 illustrates the structure of a content streaming system to which the embodiments of the present disclosure are applied.

The content streaming system to which the embodiments of the present disclosure are applied may generally include an encoding server, a streaming server, a web server, a media storage, a user equipment, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present disclosure are applied, and the streaming server may temporarily store the bitstream while transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the content streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

Examples of the user equipment may include a mobile phone, a smartphone, a laptop computer, a digital broadcasting terminal, a personal digital assistant (PDA), a portable multimedia player (PMP), a navigation system, a slate PC, a tablet PC, an ultrabook, a wearable device (e.g., a watch-type terminal (smartwatch), a glass-type terminal (smart glasses), and a head-mounted display (HMD)), a digital TV, a desktop computer, a digital signage, or the like. Each server in the content streaming system may be operated as a distributed server, in which case data received by each server may be processed in a distributed manner.

What is claimed is:

1. An method for encoding an image by an encoding apparatus, the method comprising:

deriving residual samples for a current block of an image;

deriving transform coefficients in a current subblock of the current block based on the residual samples; and deriving a specific value for a number of context-coded bins for context syntax elements for the current subblock;

upon determining that transform skip is applied to the current block, encoding one or more transform coefficients for the current subblock based on context until a number of encoded transform coefficients is equal to the specific value, wherein encoding the one or more transform coefficients comprises encoding, for each transform coefficient, one or more context syntax elements comprising at least one of a significant coefficient flag for the transform coefficient, a sign flag for the transform coefficient, a first transform coefficient level flag, or a parity level flag;

encoding values of remaining transform coefficients based on values of respective bypass syntax elements; and generating a bitstream comprising residual information on the current block, the residual information comprising the encoded context syntax elements and the bypass syntax elements.

2. The method of claim 1, wherein the significant coefficient flag indicates whether the transform coefficient is a non-zero transform coefficient, and wherein encoding a significant coefficient flag comprises encoding a sig_coeff_flag of a right subblock (NB0) and a sig_coeff_flag of a left subblock (NB1) of the current subblock.

3. The method of claim 2, further comprising:

deriving a context model offset as a number of sig_coeff_flag[NB0]+sig_coeff_flag[NB1] of significant neighboring subblocks.

4. The method of claim 1, further comprising:

when a number of context syntax elements exceeds a cutoff value numGtFlags, encoding abs_remainder syntax elements using a binarization process according to a Rice parameter, wherein numGtFlags is equal to 5.

5. The method of claim 1, wherein the sign flag for the transform coefficient indicates the sign of the transform coefficient, and wherein encoding the sign flag comprises encoding a coeff_sign_flag.

6. The method of claim 1, wherein the first transform coefficient level flag indicates whether the level of the transform coefficient is greater than a first threshold, and wherein encoding the first transform coefficient level flag comprises encoding a abs_level_gt1_flag.

7. The method of claim 6, wherein the parity level flag indicates the parity of the level of the transform coefficient, and wherein encoding the parity level flag comprises encoding a par_level_flag.

8. An method for decoding an image by a decoding apparatus, the method comprising:

receiving a bitstream comprising residual information, the residual information comprising encoded context syntax elements and bypass syntax elements of one or more subblocks corresponding to a block of an image;

deriving transform coefficients for the one or more subblocks corresponding to the block based on the residual information, wherein the deriving of the transform coefficients comprises, for a current subblock of the one or more subblocks:

determining a specific value for a number of context-coded bins for context syntax elements for the current subblock;

upon determining that transform skip is applied to the block, obtaining transform coefficients for the current subblock by decoding one or more context syntax elements corresponding to each transform coefficient until a number of decoded transform coefficients is equal to the specific value, wherein the one or more context syntax elements comprise at least one of a significant coefficient flag for the transform coefficient, a sign flag for the transform coefficient, a first transform coefficient level flag, or a parity level flag;

decoding values of remaining transform coefficients based on values of respective bypass syntax elements; and deriving residual samples for the block based on the transform coefficients; and generating a reconstructed image based on the residual samples for the block.

9. The method of claim 8, wherein the significant coefficient flag indicates whether the transform coefficient is a non-zero transform coefficient, and wherein decoding a significant coefficient flag comprises decoding a sig_coeff_flag of a right subblock (NB0) and a sig_coeff_flag of a left subblock (NB1) of the current subblock.

10. The method of claim 9, further comprising:

deriving a context model offset as a number of sig_coeff_flag[NB0]+sig_coeff_flag[NB1] of significant neighboring subblocks.

11. The method of claim 8, further comprising:

when a number of context syntax elements exceeds a cutoff value numGtFlags, decoding abs_remainder syntax elements using a binarization process according to a Rice parameter, wherein numGtFlags is equal to 5.

12. The method of claim 8, wherein the sign flag for the transform coefficient indicates the sign of the transform coefficient, and wherein decoding the sign flag comprises decoding a coeff_sign_flag.

13. The method of claim 8, wherein the first transform coefficient level flag indicates whether the level of the transform coefficient is greater than a first threshold, and wherein decoding the first transform coefficient level flag comprises decoding a abs_level_gt1_flag.

14. The method of claim 13, wherein the parity level flag indicates the parity of the level of the transform coefficient, and wherein decoding the parity level flag comprises decoding a par_level_flag.

15. An image encoding apparatus comprising:

one or more processors; and memory storing instructions that, when executed, are configured to cause the one or more processors to perform operations comprising:

deriving residual samples for a current block of an image;

deriving transform coefficients in a current subblock of the current block based on the residual samples; and deriving a specific value for a number of context-coded bins for context syntax elements for the current subblock;

upon determining that transform skip is applied to the current block, encoding one or more transform coefficients for the current subblock based on context until a number of encoded transform coefficients is equal to the specific value, wherein encoding the one or more transform coefficients comprises encoding, for each transform coefficient, one or more context syntax elements comprising at least one of a significant coefficient flag for the transform coefficient, a sign flag for the transform coefficient, a first transform coefficient level flag, or a parity level flag;

encoding values of remaining transform coefficients based on values of respective bypass syntax elements; and generating a bitstream comprising residual information on the current block, the residual information comprising the encoded context syntax elements and the bypass syntax elements.

16. The image encoding apparatus of claim 15, wherein the significant coefficient flag indicates whether the transform coefficient is a non-zero transform coefficient, and wherein encoding a significant coefficient flag comprises encoding a sig_coeff_flag of a right subblock (NB0) and a sig_coeff_flag of a left subblock (NB1) of the current subblock.

17. The image encoding apparatus of claim 15, further comprising:

when a number of context syntax elements exceeds a cutoff value numGtFlags, encoding abs_remainder syntax elements using a binarization process according to a Rice parameter, wherein numGtFlags is equal to 5.

18. The image encoding apparatus of claim 15, wherein the sign flag for the transform coefficient indicates the sign of the transform coefficient, and wherein encoding the sign flag comprises encoding a coeff_sign_flag.

19. The image encoding apparatus of claim 15, wherein the first transform coefficient level flag indicates whether the level of the transform coefficient is greater than a first threshold, and wherein encoding the first transform coefficient level flag comprises encoding a abs_level_gt1_flag.

20. The image encoding apparatus of claim 19, wherein the parity level flag indicates the parity of the level of the transform coefficient, and wherein encoding the parity level flag comprises encoding a par_level_flag.

* * * * *